(12) United States Patent
Hiratsuka et al.

(10) Patent No.: US 8,947,560 B2
(45) Date of Patent: Feb. 3, 2015

(54) IMAGE PROCESSING APPARATUS, IMAGE PROCESSING METHOD, IMAGE PROCESSING PROGRAM, AND IMAGING APPARATUS

(75) Inventors: Yosuke Hiratsuka, Tokyo (JP); Saori Sugita, Tokyo (JP); Naoto Makino, Tokyo (JP)

(73) Assignee: Sony Corporation, Tokyo (JP)

( * ) Notice: Subject to any disclaimer, the term of this patent is extended or adjusted under 35 U.S.C. 154(b) by 525 days.

(21) Appl. No.: 13/404,556

(22) Filed: Feb. 24, 2012

(65) Prior Publication Data
US 2012/0249838 A1  Oct. 4, 2012

(30) Foreign Application Priority Data

Mar. 31, 2011 (JP) ................................. 2011-078928
Nov. 18, 2011 (JP) ................................. 2011-252502

(51) Int. Cl.
*H04N 5/262* (2006.01)
*H04N 5/232* (2006.01)

(52) U.S. Cl.
CPC ....... *H04N 5/23216* (2013.01); *H04N 5/23219* (2013.01); *H04N 5/262* (2013.01)
USPC .................... 348/239; 348/222.1; 348/333.02; 382/282; 382/291

(58) Field of Classification Search
USPC .......... 348/222.1, 239, 333.02; 382/190, 209, 382/282, 291
See application file for complete search history.

(56) References Cited

U.S. PATENT DOCUMENTS

| | | | | |
|---|---|---|---|---|
| 2007/0086648 A1* | 4/2007 | Hayashi | ........................ | 382/154 |
| 2009/0322897 A1* | 12/2009 | Park | ........................... | 348/222.1 |
| 2010/0290673 A1* | 11/2010 | Miyashita | ..................... | 382/103 |
| 2011/0008036 A1* | 1/2011 | Takatsuka et al. | ............ | 396/283 |

FOREIGN PATENT DOCUMENTS

| | | |
|---|---|---|
| JP | 2005-211768 | 8/2005 |
| JP | 2009-188953 | 8/2009 |

* cited by examiner

*Primary Examiner* — Paul Berardesca
(74) *Attorney, Agent, or Firm* — Oblon, Spivak, McClelland, Maier & Neustadt, L.L.P.

(57) ABSTRACT

An image processing apparatus generates a main image as an image satisfying a main composition condition indicating a condition regarding a predetermined composition. The image processing apparatus includes: a condition determining unit that determines whether a captured image obtained through imaging of an imaging unit satisfies a preliminary composition condition which is based on the main composition condition; a processing unit that executes a process of obtaining a preliminary image as an image satisfying the preliminary composition condition in accordance with the determination result of the condition determining unit; and an image processing unit that generates the main image by processing the preliminary image obtained through the process based on the main composition condition.

13 Claims, 42 Drawing Sheets

312A 312B 312A 312B

311

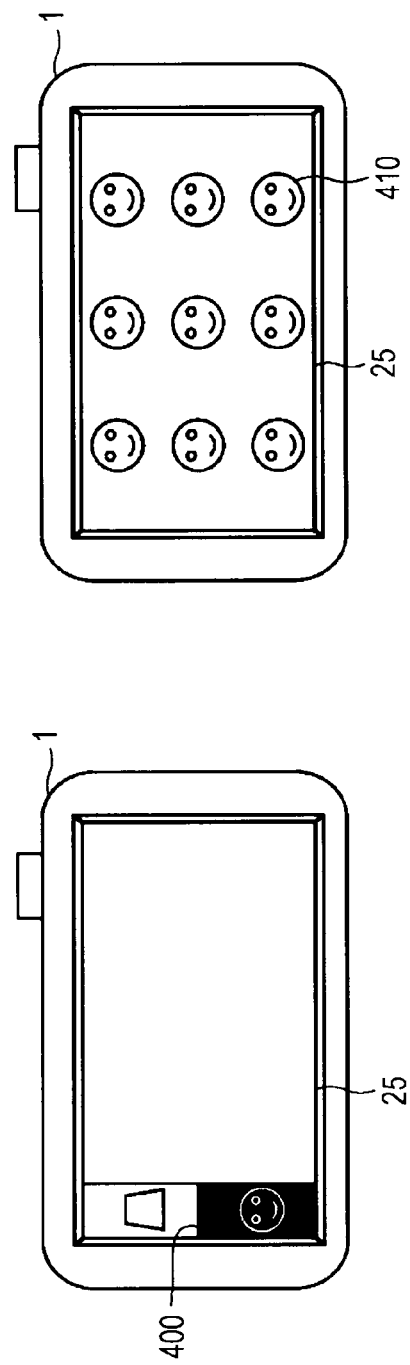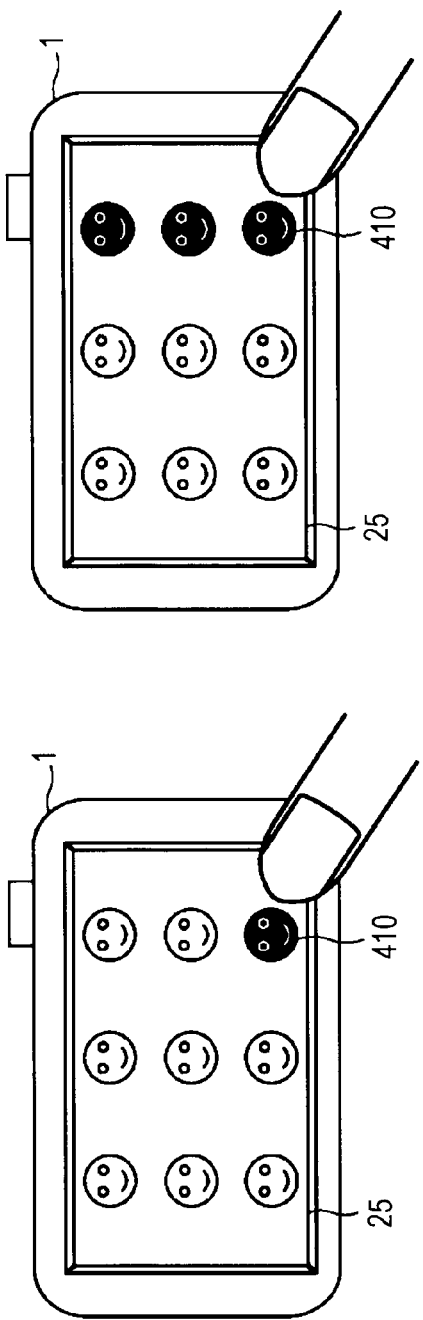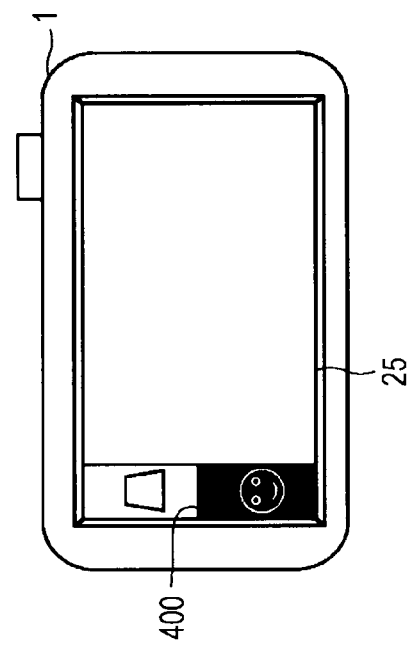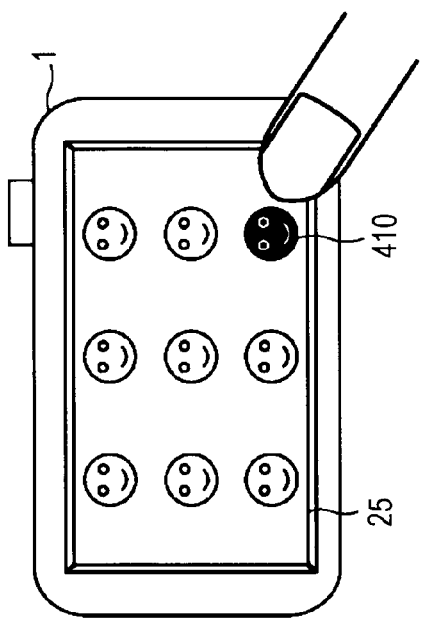

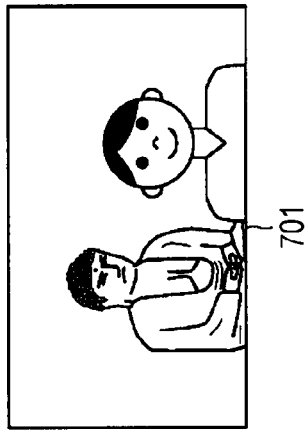
FIG. 21C
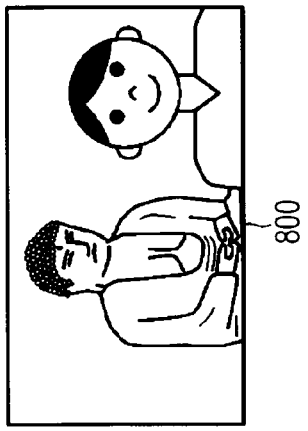
FIG. 21F
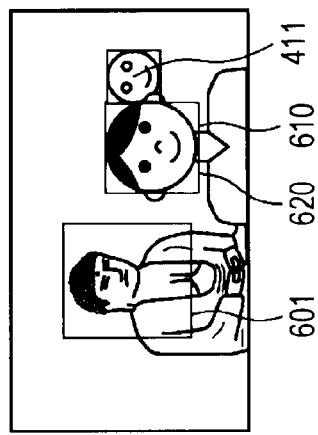
FIG. 21B
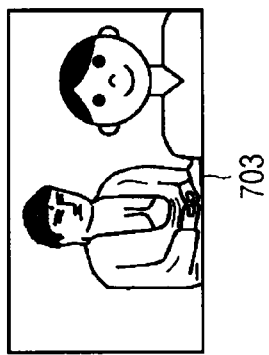
FIG. 21E
FIG. 21A
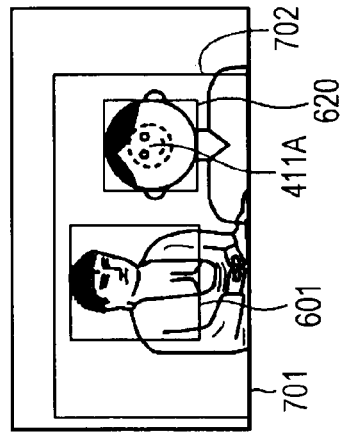
FIG. 21D

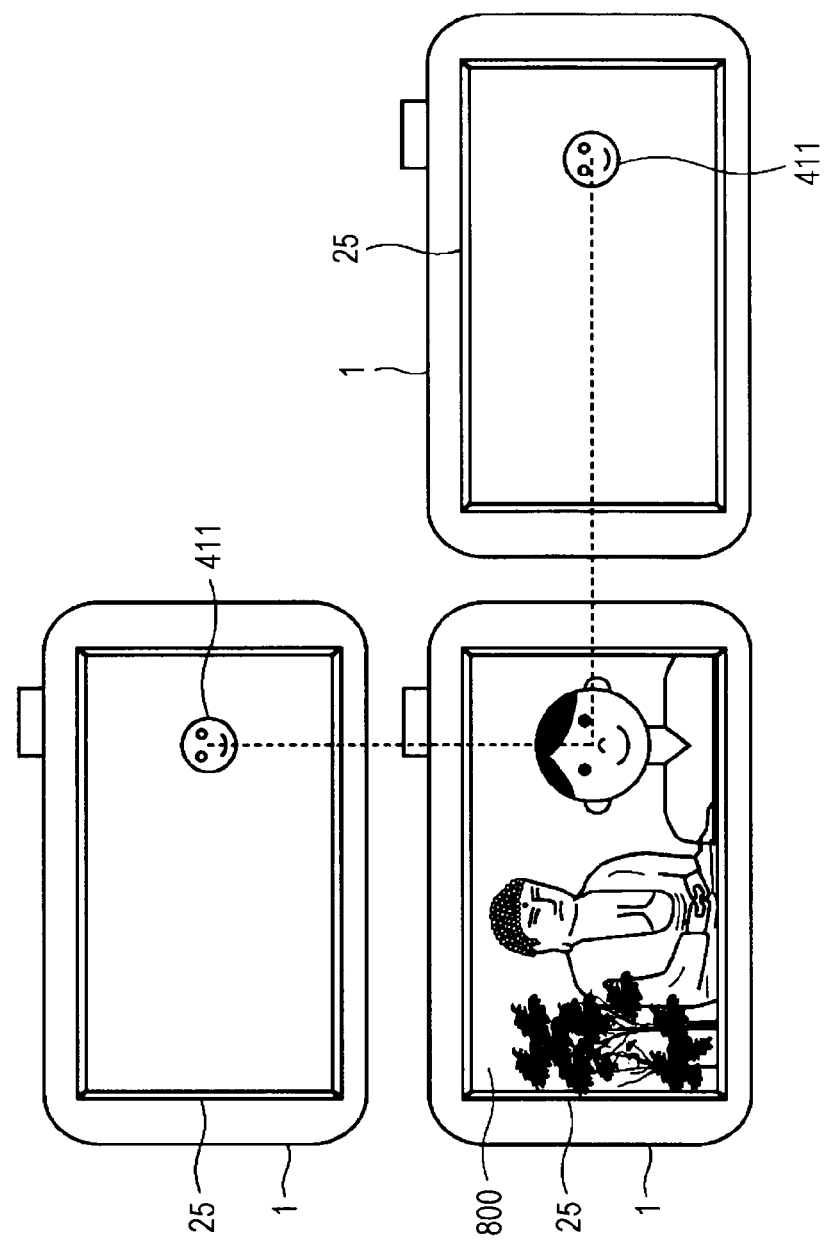

302

800

601     701

702
760

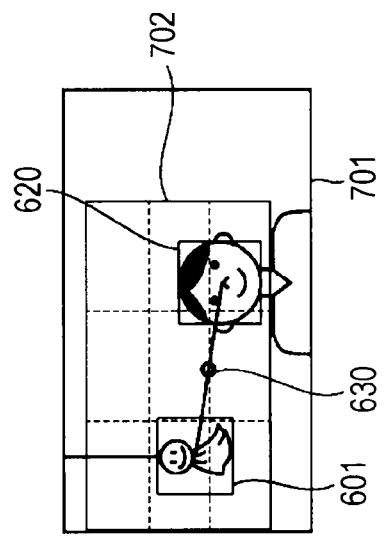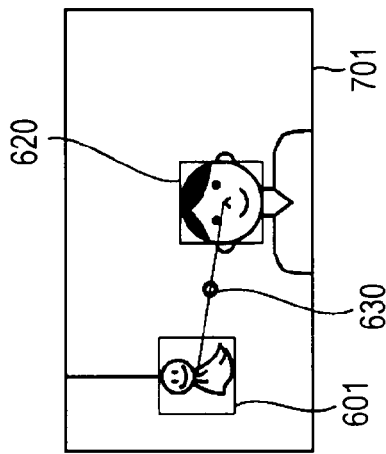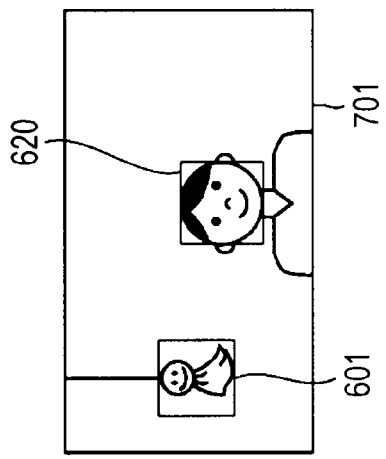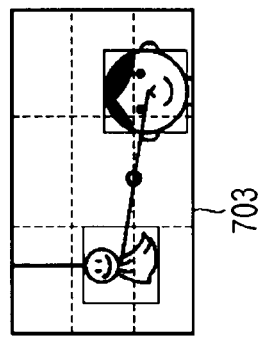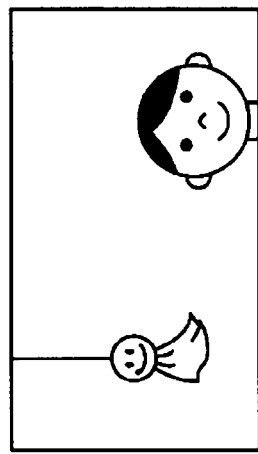

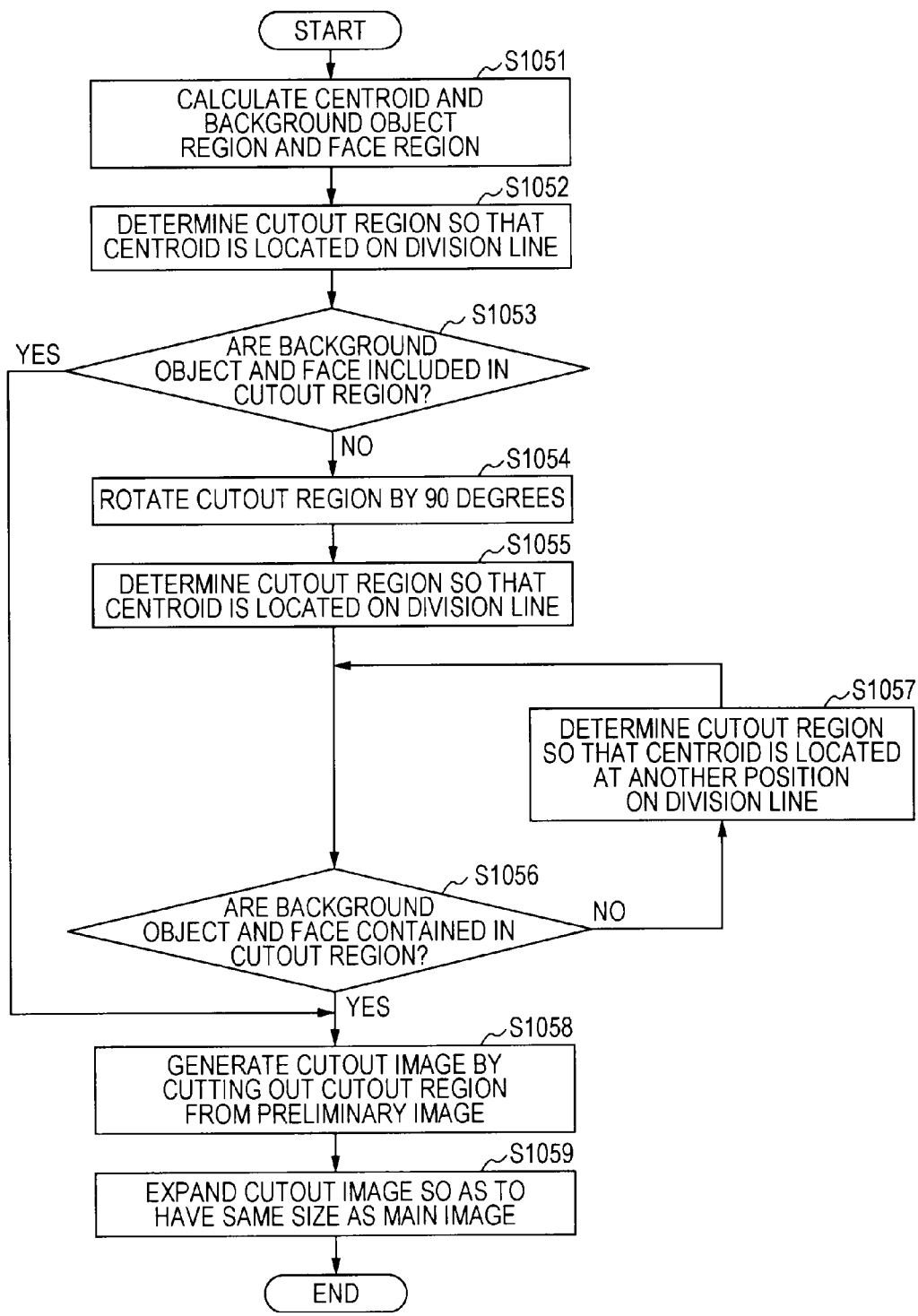

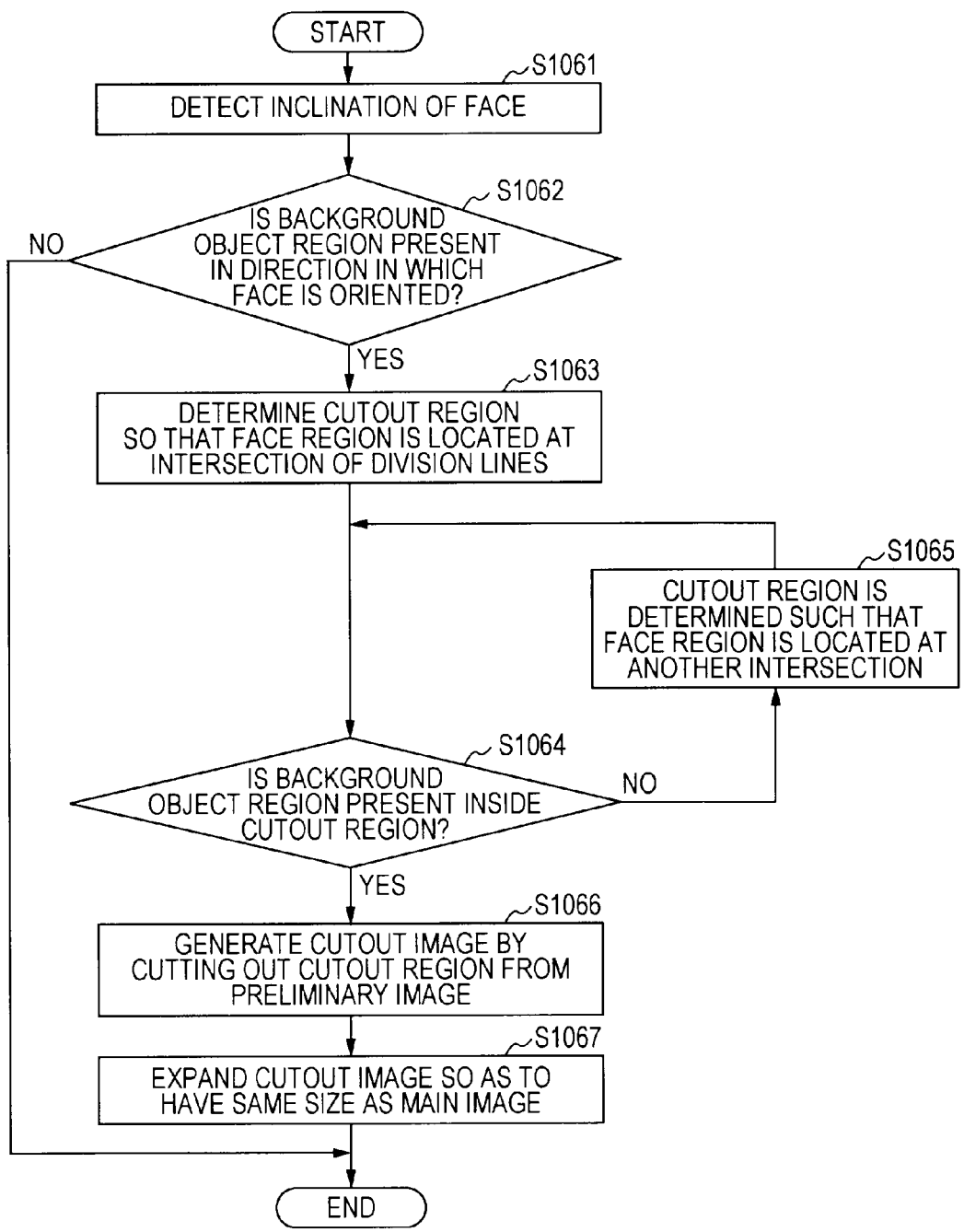

IMAGE PROCESSING APPARATUS, IMAGE PROCESSING METHOD, IMAGE PROCESSING PROGRAM, AND IMAGING APPARATUS

BACKGROUND

The present technology relates to an image processing apparatus, an image processing method, an image processing program, and an imaging apparatus.

A user sometimes executes so-called self-photographing to image himself or herself as well as imaging a desired subject with a camera. To execute the self-photographing, the user faces the lens of a camera toward himself or herself, holding the camera with his or her hands. However, since a display screen on which a through image is displayed is generally installed in an opposite direction to the direction of the lens, the user may not confirm whether the through image of the user is included within an image frame. Accordingly, it is difficult to locate the position of the his or her face of the user at a desired position within the image frame to image the user himself or herself.

When executing the self-photographing, the user sometimes wants to include not only himself or herself but also a background such as a building or a natural object within the image frame to execute imaging.

Accordingly, an imaging apparatus has been suggested in which the self-photographing is executed so as to include a desired background by photographing a scenery as a background to acquire first image data, photographing a user himself or herself against the background to acquire second image data, and determining the degree of matching between the first image data and the second image data (Japanese Unexamined Patent Application Publication No. 2009-188953).

SUMMARY

In the above-described imaging apparatus disclosed in Japanese Unexamined Patent Application Publication No. 2009-188953, the degree of matching between the first image data obtained by photographing the background and the second image data obtained by photographing the user himself or herself against the background is determined in the range of the entire image frame based on a motion vector. Therefore, since the background of the first image data and the background of the second image data have to match each other, a difficult level of the adjustment of the image range may be high and it may not be easy to execute the self-photographing so as to include a desired background.

In general, it is considered that a user does not want to include the entirety of a background in an image, but to include a desired object in the background within the image in many cases. Accordingly, it is not necessary to match the entirety of the background using the first image data and the second image data, as in the technology disclosed in Japanese Unexamined Patent Application Publication No. 2009-188953.

It is desirable to provide an image processing apparatus, an image processing method, an image processing program, and an imaging apparatus capable of executing self-photographing so as to easily include a desired background within an image frame.

According to an embodiment of the present technology, there is provided an image processing apparatus which generates a main image as an image satisfying a main composition condition indicating a condition regarding a predetermined composition. The image processing apparatus includes: a condition determining unit that determines whether a captured image obtained through imaging of an imaging unit satisfies a preliminary composition condition which is based on the main composition condition; a processing unit that executes a process of obtaining a preliminary image as an image satisfying the preliminary composition condition in accordance with the determination result of the condition determining unit; and an image processing unit that generates the main image by processing the preliminary image obtained through the process based on the main composition condition.

According to another embodiment of the present technology, there is provided an image processing method of generating a main image as an image satisfying a main composition condition indicating a regarding a predetermined composition. The image processing method includes: determining whether a captured image obtained through imaging of an imaging unit satisfies a preliminary composition condition which is based on the main composition condition; executing a process of obtaining a preliminary image as an image satisfying the preliminary composition condition in accordance with the determination result; and generating the main image by processing the preliminary image obtained through the process based on the main composition condition.

According to still another embodiment of the present technology, there is provided an image processing program causing a computer to execute an image processing method of generating a main image as an image satisfying a main composition condition indicating a condition regarding a predetermined composition, the image processing method including determining whether a captured image obtained through imaging of an imaging unit satisfies a preliminary composition condition which is based on the main composition condition, executing a process of obtaining a preliminary image as an image satisfying the preliminary composition condition in accordance with the determination result, and generating the main image by processing the preliminary image obtained through the process based on the main composition condition.

According to further still another embodiment of the present technology, there is provided an imaging apparatus including: a lens that is installed on one surface of a casing; an imaging element that receives light via the lens and converts the light into an image signal; and a display unit that is installed on the other surface on the rear side of the one surface of the casing on which the lens is installed and displays an image in accordance with the image signal. The imaging apparatus generates a main image satisfying a main composition condition indicating a condition regarding a predetermined composition from a captured image obtained by the imaging element. The imaging apparatus further includes: a condition determining unit that determines whether the captured image satisfies a preliminary composition condition which is based on the main composition condition; a processing unit that executes a process of obtaining a preliminary image as an image satisfying the preliminary composition condition in accordance with the determination result of the condition determining unit; and an image processing unit that generates the main image by processing the preliminary image obtained through the process of the processing unit based on the main composition condition.

According to the embodiments of the present technology, it is possible to easily obtain an image with a desired composition.

BRIEF DESCRIPTION OF THE DRAWINGS

FIGS. 11A to 11D are diagrams illustrating a face position designation screen displayed on the display unit;

FIGS. 21A to 21F are diagrams illustrating a face position adjustment process;

FIG. 23 is a diagram illustrating a main image generated through the face position adjustment process;

FIGS. 32A to 32E are diagrams illustrating another example of the optimum composition adjustment process;

FIG. 35 is a flowchart illustrating the flow of the horizontal and vertical conversion process;

FIG. 37 is a flowchart illustrating the flow of the face direction correspondence adjustment process;

DETAILED DESCRIPTION OF EMBODIMENTS

Figure 1:
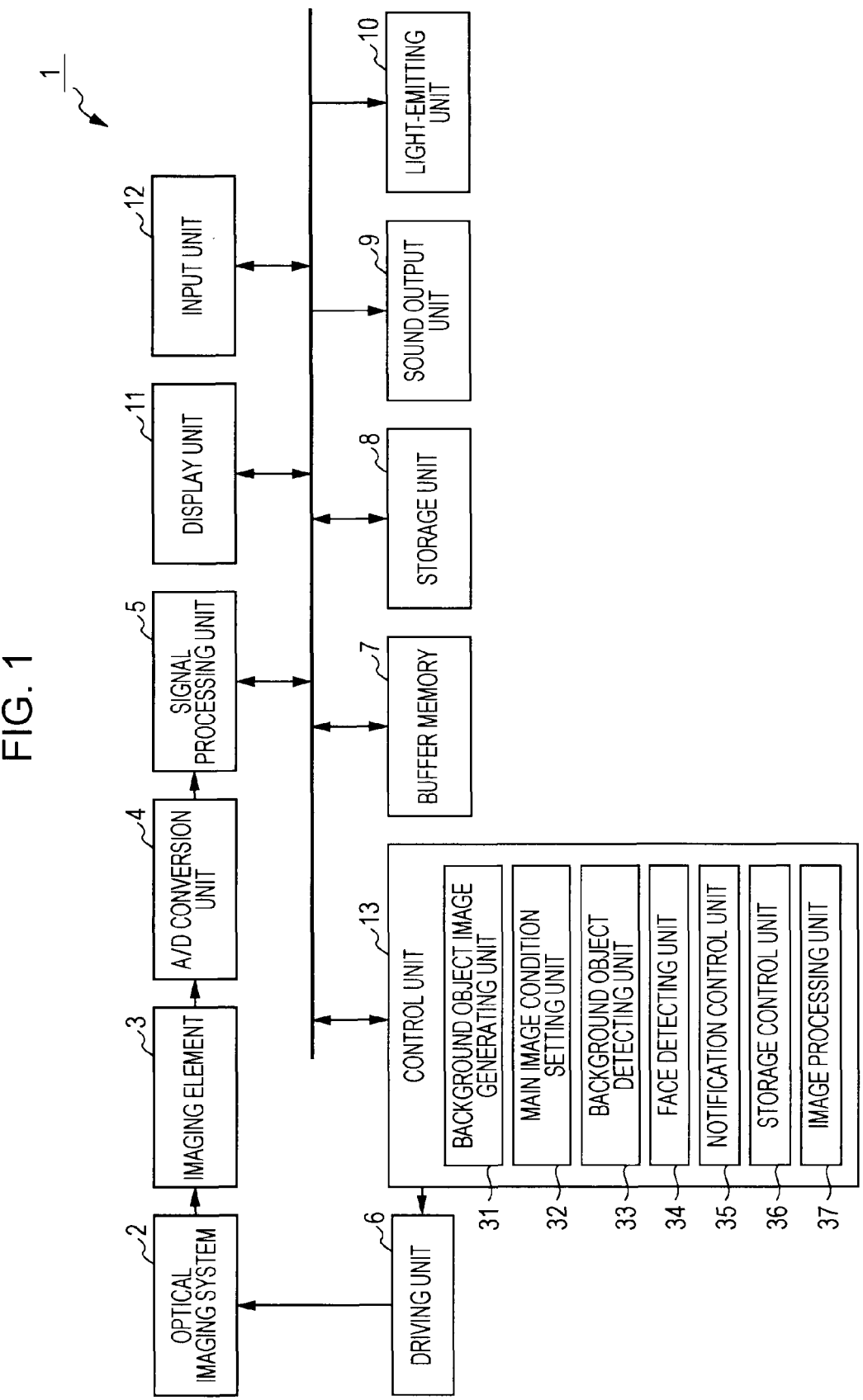
FIG. 1 is a block diagram illustrating the overall configuration of an imaging apparatus.

Hereinafter, embodiments of the present technology will be described with reference to the drawings. The description thereof will be made in the following order.
1. Definition of Terminologies
2. First Embodiment
2-1. Configuration of Imaging Apparatus
2-2. Processes Executed By Imaging Apparatus
2-2-1. Setting of Background Object Condition
2-2-2. Setting of Main Image Condition
2-2-3. Process Executed In Self-photographing
2-3. Image Processing
2-3-1. Face Position Adjustment Process
2-3-2. Inclination Correction Process
2-3-3. Background Object Size Adjustment Process
2-3-4. Optimum Composition Adjustment Process
2-3-5. Horizontal and Vertical Conversion Process
2-3-6. Face Direction Correspondence Adjustment Process
2-3-7. Expansion Process Based on Golden Ratio
3. Second Embodiment
3-1. Configurations of Image Processing Apparatus and Imaging Apparatus
3-2. Processes of Imaging Processing Apparatus

1. DEFINITION OF TERMINOLOGIES

First, the definition of terminologies used in the specification will be described before each embodiment of the present technology is described.

A "self-photographing" means an action of photographing a user himself or herself as a subject by facing the lens of an imaging apparatus toward the user himself or herself. The self-photographing includes a photographing action when the user photographs himself or herself holding the imaging apparatus with his or her hands and a photographing action when the user photographs himself or herself, putting the imaging apparatus in a place. Further, the self-photographing includes not only a photographing action when a user includes a photographing action when the user executing photographing alone, but also a photographing action when one of a plurality of users as subjects executes photographing holding an imaging apparatus with his or her hands and a photographing action when a plurality of users as subjects photograph themselves, putting the imaging apparatus in a place.

"Imaging" means receiving light indicating an image and converting the light into an electric signal by an imaging element. An "image frame" means the entire region imaged by a valid region of an imaging element or a region slightly smaller than the entire region. "Composition" means a state where a subject is disposed at a position determined by a predetermined algorithm, that is, a disposition state of a subject with respect to the image frame.

A "preliminary image" means an image which is stored when a condition (background object condition) for a background object and a condition (face condition) for a face are satisfied before image processing is executed. A "main image" means an image which is finally obtained by executing image processing apparatus on a preliminary image.

A "background object" means a subject which is included except for a user within the image frame when the user executes the self-photographing and forms a background, such as a person, an architectural structure, or a natural object, which is behind the user. A "background object detection image" means an image which is captured in a state where a background object is included in an image frame to detect the background object. The background object detection image is a template image when a background object is detected through template matching in self-photographing.

2. FIRST EMBODIMENT

2-1. Configuration of Imaging Apparatus

FIG. 1 is a block diagram illustrating the overall configuration of an imaging apparatus 1. The imaging apparatus 1 is a so-called digital still camera which is capable of imaging a still image. The imaging apparatus 1 includes an optical imaging system 2, an imaging element 3, an A/D conversion unit 4, a signal processing unit 5, a driving unit 6, a buffer memory 7, a storage unit 8, a sound output unit 9, a light-emitting unit 10, a display unit 11, an input unit 12, and a control unit 13.

For example, the optical imaging system 2 includes an imaging lens, a zoom lens, a focus lens, a diaphragm. An optical image of a subject is incident on the optical imaging system 2. The optical image of a subject obtained via the optical imaging system 2 is formed on an imaging element 3 serving as an imaging device.

The imaging element 3 executes photoelectric conversion to convert the formed optical image into a charge amount and outputs the charge amount as an analog image signal. The analog image signal output from the imaging element 3 is output to the A/D conversion unit 4. A CCD (Charge Coupled Device), a CMOS (Complementary Metal Oxide Semiconductor), or the like is used as the imaging element 3. The A/D conversion unit 4 converts the analogy imaging element supplied from the imaging element 3 into a digital image signal and outputs the digital image signal to the signal processing unit 5.

The signal processing unit 5 executes predetermined signal processing on the digital image signal output from the A/D conversion unit 4, and also converts the digital image signal into image data formed by, for example, a luminance signal and a color difference signal and outputs the image data. Examples of the signal processing executed by the signal processing unit 5 includes a linear matrix process, a white balance adjusting process, a gamma correcting process, and a Y/C converting process.

The driving unit 6 controls the zoom lens, the focus lens, the diaphragm, and the like of the optical imaging system 2 based on control signals from the control unit 13.

The buffer memory 7 is configured by, for example, an SDRAM (Synchronous Dynamic Random Access Memory). The buffer memory 7 temporarily stores the image data, a preliminary image, a background object detection image 311, and a background object generation image 312 output from the signal processing unit 5, information, and the like. These images and the information will be described in detail later.

The storage unit 8 is a large-capacity storage medium such as a hard disk, a memory stick (registered trademark of Sony Corporation), or an SD memory card. The storage unit 8 stores an image captured by the imaging apparatus 1. The image is compressed in accordance with, for example, JPEG (Joint Photographic Experts Group) and is stored. Further, EXIF (Exchangeable ImageFile Format) data including information regarding the stored image and additional information such as a photograph date are stored in correspondence with the image.

The sound output unit 9 has a sound output function of outputting various sounds such as sound messages used to instruct a user to follow a guide and to deliver a message under the control of a notification control unit 35. The light-emitting unit 10 is configured by, for example, an LED (Light Emitting Diode). The light emitting unit 10 has a light-emitting function of instructing a user to follow a guide and delivering a message by emitting light or not emitting light under the control of the notification control unit 35.

The display unit 11 is configured by, for example, an LCD (Liquid Crystal Display), a PDP (Plasma Display Panel), or an organic EL (Electro Luminescence) panel. A through image is displayed on the display unit 11 at the imaging time. As described above, the signal processing unit 5 executes a predetermined process on the image signal to generate image data corresponding to one still image. When the image data corresponding to one still image keeps being generated, image data corresponding to frame images of a moving image are sequentially generated. Then, when the sequentially generated image data are output to the display unit 11, images of a still image unit continue to be sequentially displayed on the display unit 11. In this way, the through images are displayed.

Images stored in the storage unit 8 are also displayed on the display unit 11. The control unit 13 reads the image data instructed via the input unit 12 by a user from the storage unit 8 and outputs the image data to the display unit 11 to reproduce the image. In this way, the user can view the image stored in the storage unit 8.

Further, the display unit 11 displays user interface images such as descriptive icons of soft buttons on a touch panel serving as an input function and various hard buttons or menu screens configured to execute various settings of the imaging apparatus 1. The control unit 13 generates image data as a necessary user interface image in accordance with an operation state, a mode, or the like of the imaging apparatus 1 and outputs the generated image data to the display unit 11. In this way, the user interface image is displayed on the display unit 11. The user interface image may be displayed so as to overlap on the through image or the image data being reproduced and displayed.

The input unit 12 includes a key, a button, a dial, a touch panel, a power button used to conversion between power ON and OFF, a release button used to give an instruction to start recording a captured image, and a zoom adjustment operator. The input unit 12 has an input function on a touch panel configured to receive various inputs. When an input is executed using the input unit 12, a control signal is generated in accordance with the input and is output to the control unit 13. Then, the control unit 13 executes a calculation process or a control corresponding to the control signal.

For example, the control unit 13 includes a CPU (Central Processing Unit), a RAM (Random Access Memory), and a ROM (Read Only Memory). Programs or the like read and operated by the CPU are stored in the ROM. The RAM is used as a work memory of the CPU. The CPU executes various processes in accordance with the programs stored in the ROM and controls the entire imaging apparatus 1 by issuing commands. Further, the control unit 13 executes predetermined programs to function as a background object image generating unit 31, a main image condition setting unit 32, a background object detecting unit 33, a face detecting unit 34, a notification control unit 35, a storage control unit 36, and an image processing unit 37.

The background object image generating unit 31 displays a background object condition screen on the display unit 11. The background object image generating unit 31 generates a background object detection image when the user designates a background object. In this way, the background object is set. The generated background object detection image is used when the background object detecting unit 33 detects the background object.

The main image condition setting unit 32 displays a main image condition screen on the display unit 11. When the user designates a target face position, the main image condition setting unit 32 sets the designated target face position as a main image condition. The main image condition indicates where the user wants to locate a face on a main image finally generated by the user. In a Face Position Adjustment Process, which is one of the image processings described below, an image is processed so that the main image condition is satisfied.

The background object detecting unit 33 detects a background object through template matching executed by the use of the background object detection image generated by the background object image generating unit 31 and detects whether the background object is included in an image frame in the self-photographing. Whether the background object is included in the image frame is defined as a background object condition. The determination of the background object detecting unit 33 will be described in detail later.

The face detecting unit 34 detects whether the face of the user is included in the image frame in the self-photographing through, for example, template matching. The face detecting unit 34 determines whether the detected face satisfies the face condition. The face condition is a condition for the position of a face within the image frame in the self-photographing, but is a condition which is looser than the main image condition as the target face position in a main image. In this embodiment, imaging is executed when the above-described background object condition is satisfied and the face condition is satisfied. The face condition and the determination of the face detecting unit 34 will be described in detail later.

The notification control unit 35 controls a sound output from a speaker 22 and notification of guide information through lighting or the like of the LED 23 so that the position of the face detected by the face detecting unit 34 satisfies the face condition. Further, when the background object detecting unit 33 determines that the background object condition is satisfied and the face detecting unit 34 determines that the face condition is satisfied, the notification control unit 35 also controls the notification thereof to the user in accordance with the determination results. The notification control will be described in detail later.

In the self-photographing, when the background object detecting unit 33 determines that the background object condition is satisfied and the face detecting unit 34 determines that the face condition is satisfied, the storage control unit 36 executes a control so that the image data output from the signal processing unit 5 is stored as a preliminary image in the buffer memory.

Figure 2:
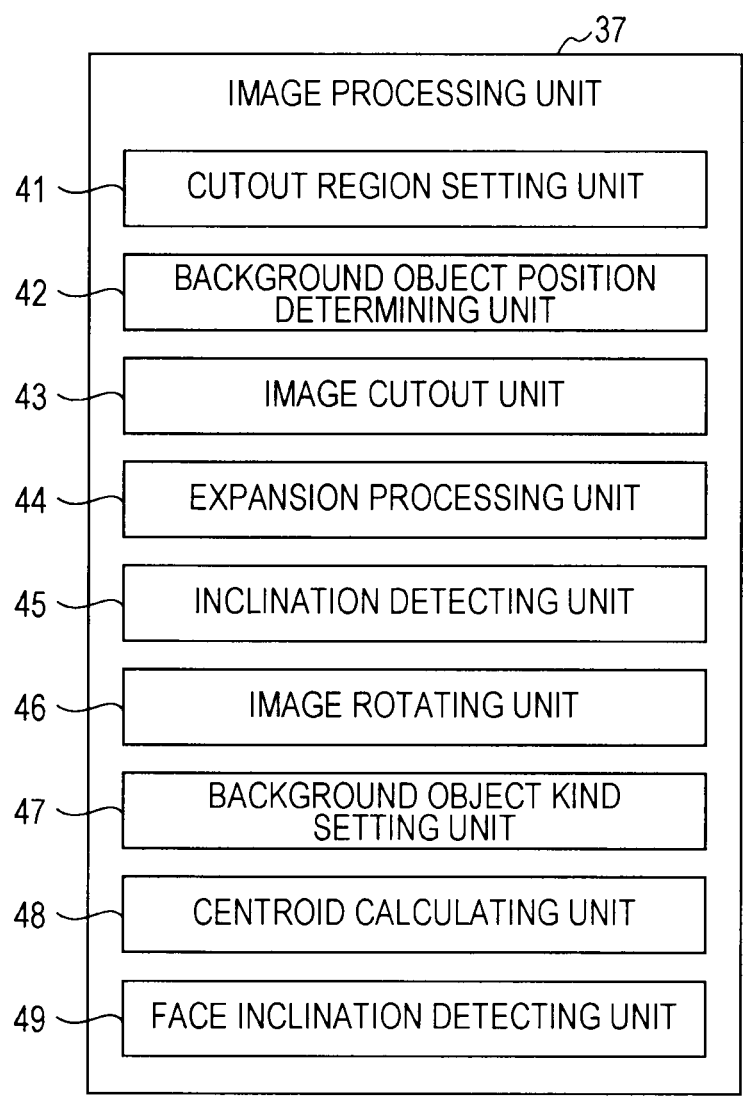
FIG. 2 is a block diagram illustrating the overall configuration of an image processing unit.

The image processing unit 37 executes predetermined image processing on the preliminary image generated through the self-photographing to generate a main image. FIG. 2 is a block diagram illustrating the detailed functions of the image processing unit 37 realized by the control unit 13 executing predetermined programs. The image processing unit 37 includes a cutout region setting unit 41, a background object position determining unit 42, an image cutout unit 43, an expansion processing unit 44, an inclination detecting unit 45, an image rotating unit 46, a background object kind setting unit 47, a centroid calculating unit 48, and a face direction detecting unit 49. The respective units of the image processing unit 37 and image processing executed by the image processing unit 37 will be described in detail later.

Figure 3A:
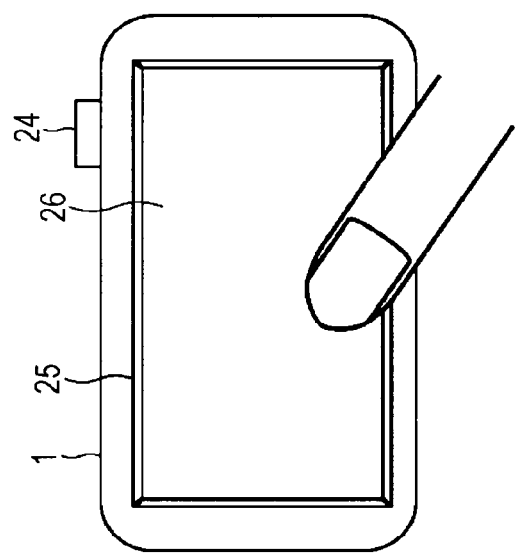
FIGS. 3A to 3C are diagrams illustrating the outer appearance configuration of the imaging apparatus.
Figure 3B:
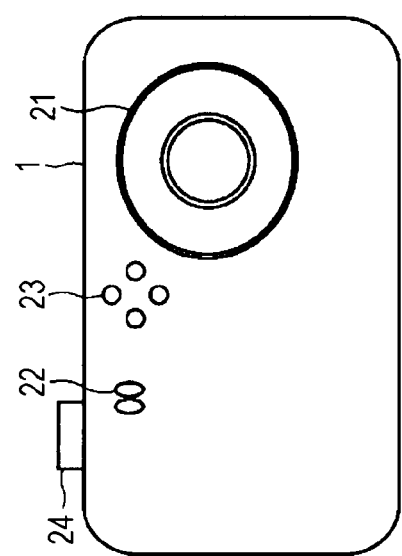
Figure 3C:
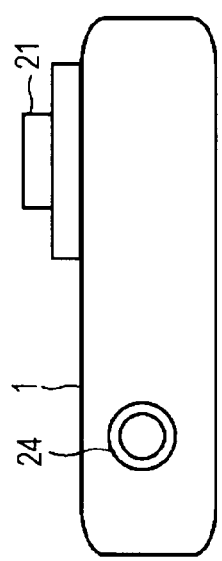

FIGS. 3A to 3C are diagrams illustrating the outer appearance configuration of the imaging apparatus 1 according to the embodiment of the present technology. FIG. 3A is a front view, FIG. 3B is a rear view, and FIG. 3C is a top view. The imaging apparatus 1 has a substantially rectangular shape which is flat and horizontally long.

An imaging lens 21 is installed on the front surface of the imaging apparatus 1. The user executes the self-photographing by facing the imaging lens 21 toward the user himself or herself. The speaker 22 is also installed on the front surface of the imaging apparatus 1. The speaker 22 corresponds to the sound output unit 9 in the block diagram. The speaker 22 has a sound output function of outputting various sounds such as a sound used to give a guide instruction to the user. The LED 23 is also installed on the front surface of the imaging apparatus 1. The LED 23 corresponds to the light-emitting unit 10 in the block diagram. The LED 23 is a unit that gives a guide instruction to the user and delvers various messages by emitting light or not emitting light.

A release button 24 pressed down by the user at the imaging time is installed on the upper surface of the imaging apparatus 1. The release button 24 has input functions for auto focus, a detection instruction to detect a subject, release instruction input, and other instructions. For example, when the user halfway presses down the release button 24 (half-pressing), a detection instruction is input. When the user fully presses down the release button 24 (full-pressing), a release instruction is input. The release button 24 is included in the input unit 12 in the block diagram.

A monitor 25 is installed on the rear surface of the imaging apparatus 1. The monitor 25 corresponds to the display unit 11 in the block diagram and is configured by, an LCD, a PDP, an organic EL panel, or the like. The monitor 25 displays a through image, an image obtained through imaging, a user interface image, and the like.

A touch panel 26 integrally formed with the monitor 25 is installed on the rear surface of the imaging apparatus 1. For example, the touch panel 26 is an electrostatic capacitance type touch panel. The touch panel 26 has an input function of executing various inputs in the imaging apparatus 1, when the user touches the touch panel 26 with his or her finger. The touch panel 26 is included in the input unit 12 in the block diagram.

The touch panel 26 detects operations simultaneously executed at a plurality of positions on an operation surface and outputs coordinate data indicating each of the touch positions. Further, the touch panel 26 can detect each of the operations repeatedly executed on the operation surface and output the coordinate data indicating each touch position.

In this way, the touch panel 26 can receive and detect various input operations, such as a so-called tap input operation, a double tap input operation, a drag operation, a pinch operation, and a flick operation, from the user.

The tap input is an input operation of touching the operation surface once in a short time with the finger of the user or the like. The double tap input operation is an input operation of touching the operation surface twice in succession at a short interval with the finger of the user or the like. The double tap input operation is mainly used to input determination.

The drag operation is an input operation of moving the finger of the user or the like while the user touches the operation surface with his or her finger or the like. For example, an instruction to move the frame of a region displayed on the monitor 25 can be input through the drag operation. The flick operation is an input operation of designating one point on the operation surface with the finger of the user or the like and swiftly flicking the finger in an arbitrary direction. For example, images can be switched through the flick operation when the user views the plurality of images stored on the storage unit 8 on the monitor 25.

The pinch operation is an input operation of simultaneously touching the operation surface with two fingers of the user or the like, and then opening or closing the two fingers or the like. For example, the frame of a region displayed on the monitor 25 can be expanded, reduced, or the like through the pinch operation. Further, a pinch operation of opening the two touched fingers of the user or the like is referred to as a pinch-out operation and a pinch operation of closing the two touched fingers of the user or the like is referred to as a pinch-in operation.

2-2. Processes Executed By Imaging Apparatus

Figure 4:
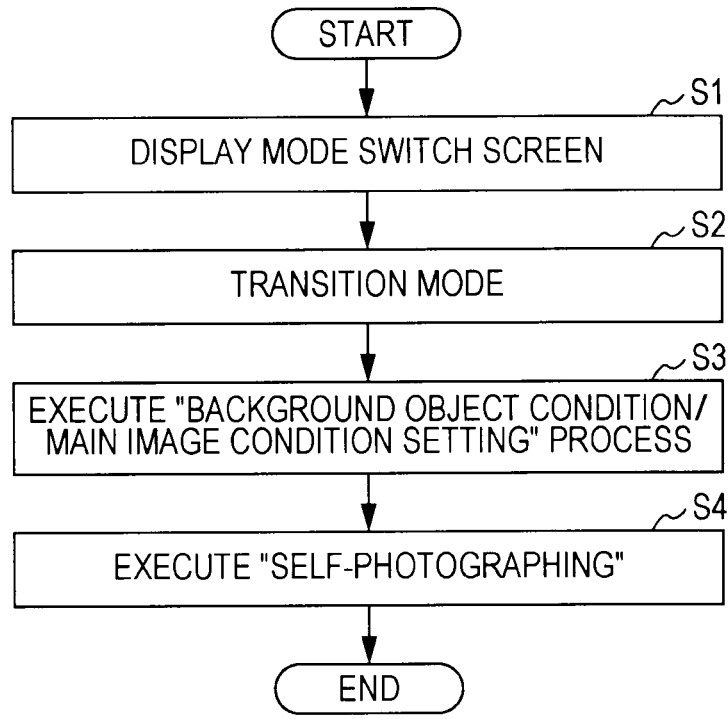
FIG. 4 is a flowchart illustrating the overall flow of self-photographing.
Figure 5:
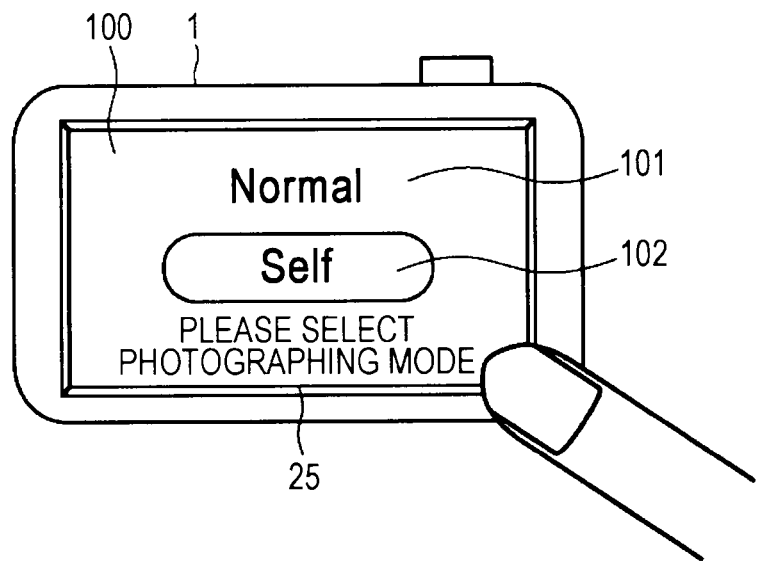
FIG. 5 is a diagram illustrating a mode conversion screen displayed on a display unit.

The imaging apparatus 1 has the above-described configuration. Next, processes executed in the self-photographing will be described. FIG. 4 is a flowchart illustrating the entire flow of the self-photographing. First, in step S1, a mode conversion screen 100 shown in FIG. 5 is displayed on the monitor 25. In an example shown in FIG. 5, the monitor 25 displays two soft buttons, that is, a "Normal" button 101 indicating a normal mode of executing normal imaging in the imaging apparatus 1 and a "Self" button 102 indicating a photographing mode of executing the self-photographing. The "normal mode" is a mode in which the user faces the lens toward a subject other than other than the user himself or herself and images the subject, viewing a through image displayed on the monitor 25.

When the user selects one soft button of the "Normal" button 101 and the "Self" button 102 by touching the one soft button with his or her finger, a mode is subsequently transitioned to the selected mode in step S2. When the mode is transitioned, the imaging apparatus 1 then executes a display process or the like based on the selected mode. Hereinafter, the description will be made on the assumption that the "Self" mode (self-photographing mode) is selected by the user.

When the "Self" mode (self-photographing mode) is selected, "background object condition/main image condition setting" processes is executed in step S3 and a "self-photographing process" is then executed in step S4. The "background object condition/main image condition setting" processes of step S3 and the "self-photographing process" of step S4 will be described in detail with reference to separate flowcharts.

Figure 6:
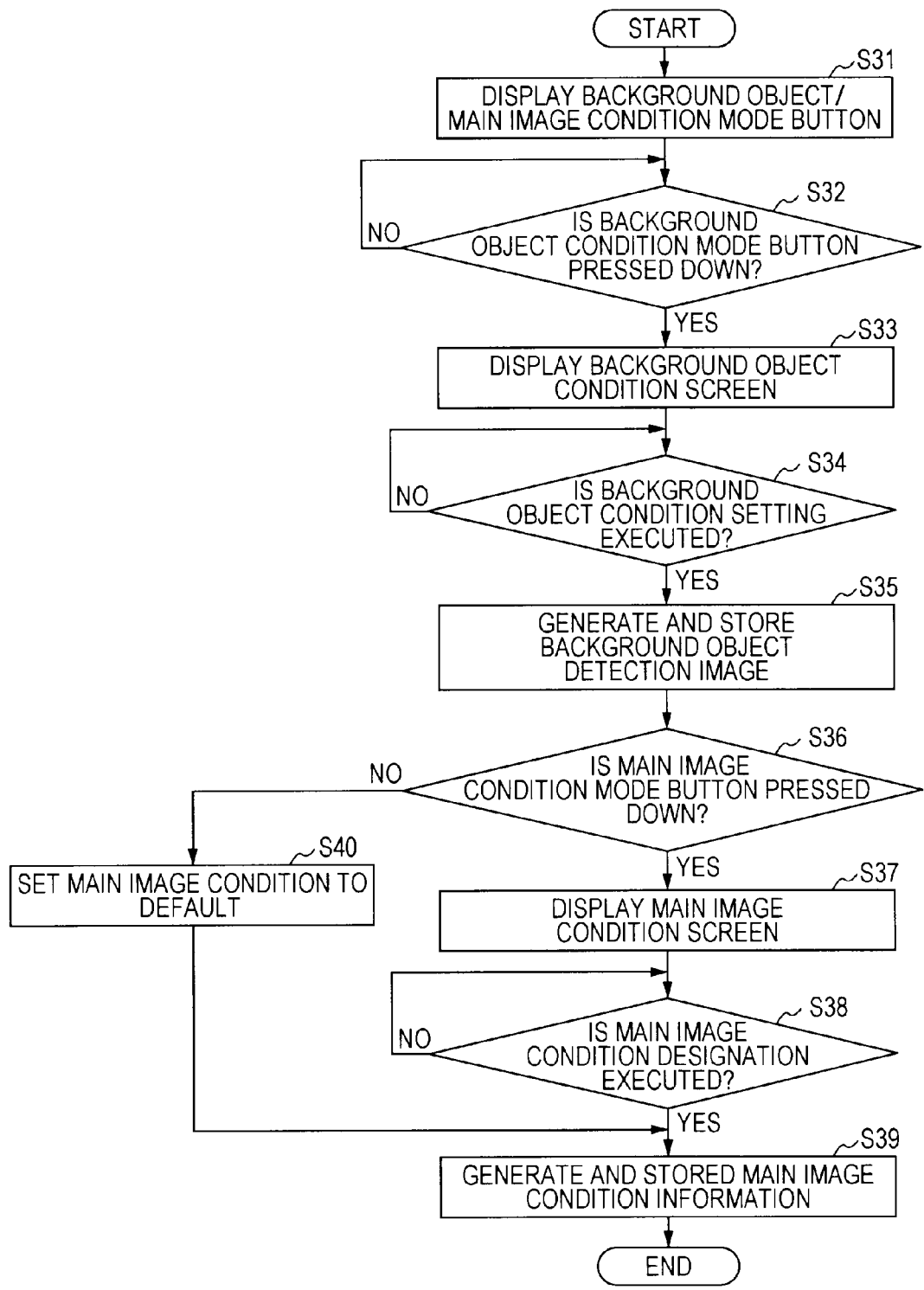
FIG. 6 is a flowchart illustrating the flow of a background object/target face position designating process.
Figure 7:
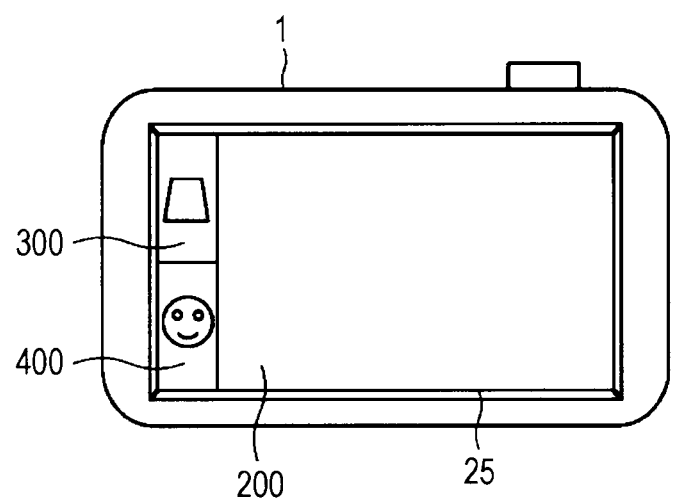
FIG. 7 is a diagram illustrating a background object/face designation selection screen displayed on the display unit.

FIG. 6 is a flowchart illustrating the details of the "background object condition/main image condition setting" processes of step S3 in the flowchart of FIG. 4. First, in step S31, a background object condition/main image condition selection screen 200 shown in FIG. 7 is displayed on the monitor 25. In the background object condition/main image condition selection screen 200, a background object condition mode button 300 used for the user to select a background condition mode and a main image condition mode button 400 used for the user to select a main image condition mode are displayed.

Here, the background object condition setting process is a process of designating a subject (background object) that the user wants to include within the finally generated image frame among various subjects forming the background behind the user at the self-photographing time. Inclusion of the designated background object within the image frame is the background object condition. Further, the main image condition setting process is a process of designating a position, at which the user wants to locate his or her face in the main image, by the user. Matching the face with the designated position is the main image condition.

2-2-1. Setting of Background Object Condition

Figure 8A:
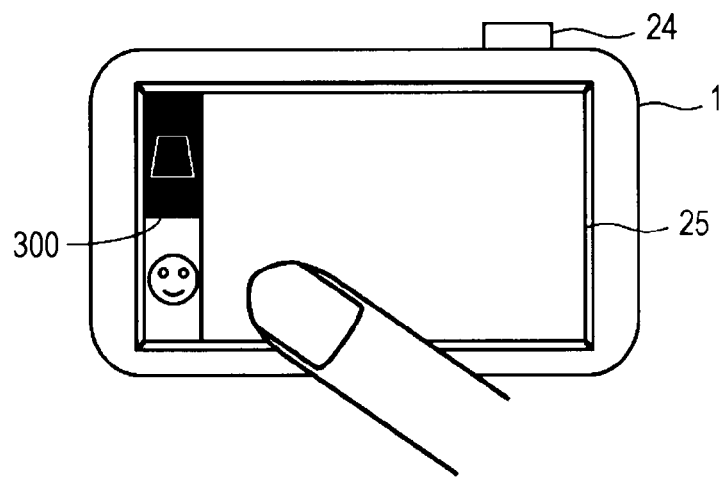
FIGS. 8A to 8C are diagrams illustrating an example of a background designation screen displayed on the display unit.
Figure 8B:
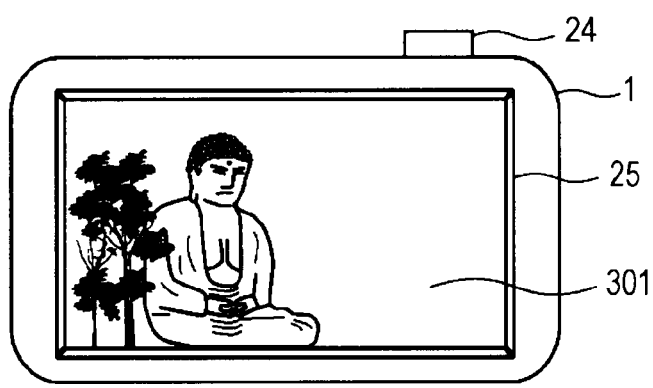
Figure 8C:
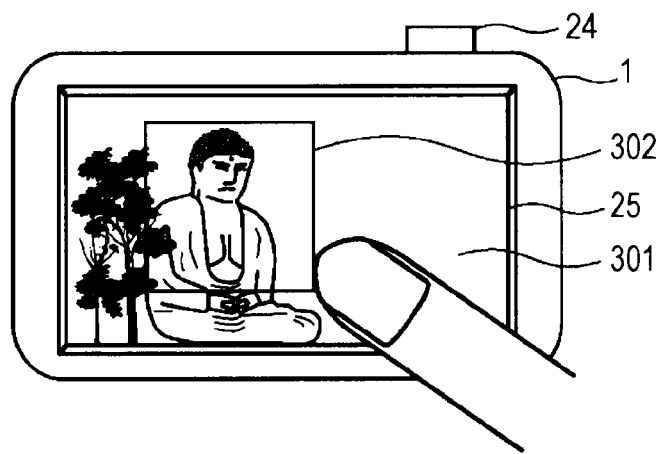
Figure 9:
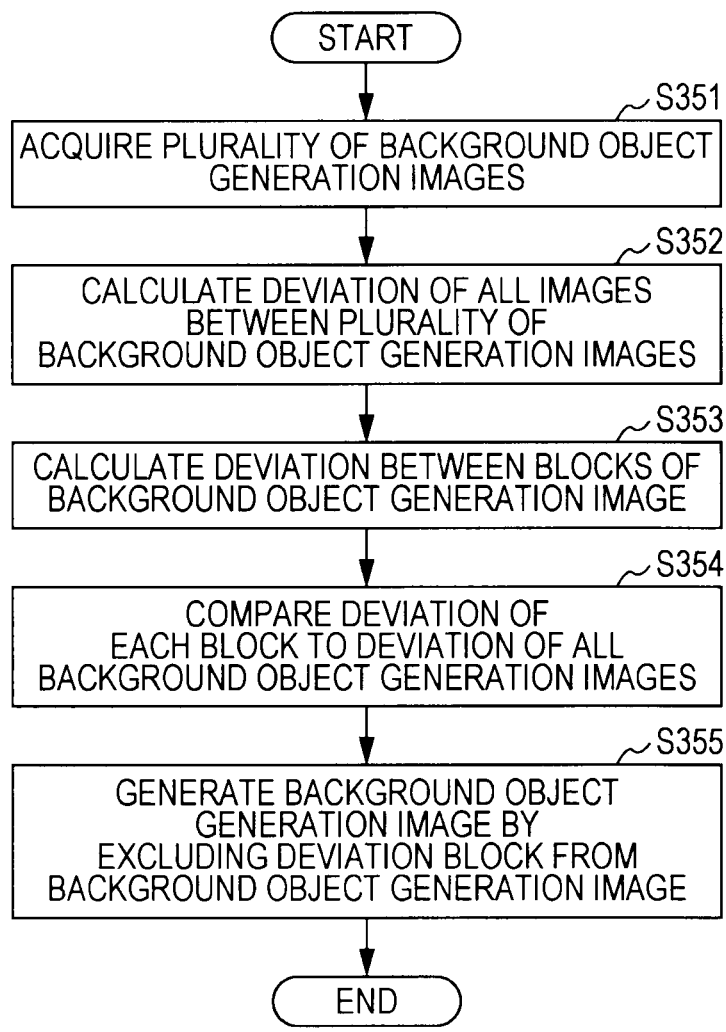
FIG. 9 is a flowchart illustrating the flow of a background object detection image generation process.

Hereinafter, a background object condition setting process will be described. In step S32, it is determined whether an input is executed using a background object condition mode button 300. When the input is executed using the background object condition mode button 300 (Yes in step S32), the process proceeds to step S33 and a background object condition screen is displayed on the monitor 25. For example, the background object condition screen is shown in FIGS. 8A to 8C. First, the background object condition mode button 300 is reversely displayed on the background object condition screen, as shown in FIG. 8A, to display the fact that a background object condition mode is selected. Thereafter, a through image 301 is displayed, as shown in FIG. 8B. Next, in step S34, it is determined whether the background object condition is set.

When the user touches his or her finger on the operation surface of the touch panel 26 corresponding to an arbitrary location in the background being displayed as the through image 301 to execute an input, as shown in FIG. 8C, a rectangular frame (hereinafter, referred to as a background object designation frame 302) which centers the touch position and has a predetermined size is displayed on the through image 301 in an overlapping manner. An image within a range surrounded by the background object designation frame 302 is designated as a background object.

The background object designation frame 302 can be changed in position, shape, and size. For example, when the user touches the inside of the background object designation frame 302 with his or her finger and executes a drag operation in the touch state, the position of the background object designation frame 302 can be changed. Further, when the user touches one of the sides of the background object designation frame 302 with his or her finger and executes a drag operation in the touch state, the background object designation frame 302 can be expanded in a direction of the vicinity so as to be changed in shape. Furthermore, when the user touches the background object designation frame 302 with two of his or her fingers and executes a pinch-out operation, the background object designation frame 302 can be expanded in size. When the user touches the background object designation frame 302 with two his or her fingers and executes a pinch-in operation, the background object designation frame 302 can be reduced in size. The user can accurately designate the background object by executing the various operations to adjust an arbitrary position, the shape, and the size of the background object designation frame 302. For example, the user may tap the inside of the background object designation frame 302 to focus the background object.

When the user decides the position, the shape, and the size of the background object designation frame 302, that is, decides the designated background object, the user inputs the determination of the background object destination by executing a double tap operation on the inside of the background object designation frame 302. Further, a method of halfway pressing down the release button 24 may be used as the method of inputting the determination of the background object designation. Inclusion of the designated background object within the image frame in the self-photographing is the background object condition. That is, in the background object designation and the self-photographing, the entirety of the background may not match, but only the background object as a constituent of the background may match. Accordingly, the user photographing himself or herself may not precisely adjust the direction of the lens of the imaging apparatus 1, and thus can easily execute the self-photographing when a desired background object is located behind the user.

When the determination is input, the background object condition is set and the process proceeds to step S35 (Yes in step S34). In step S35, the background object detection image 311 is generated based on the image within the background object designation frame 302 and is stored in the buffer memory 7. The background object detection image 311 is used for the background object detecting unit 33 to execute the determination in the self-photographing.

In this embodiment, the background object existing within the background object designation frame 302 is not recognized and the image within the background object designation frame 302 is recognized as the background object detection image 311. However, the background object may be recognized. For example, the background object may be designated by executing object recognition through template matching or the like. The background object may be designated more precisely by executing the object recognition.

Figure 10A:
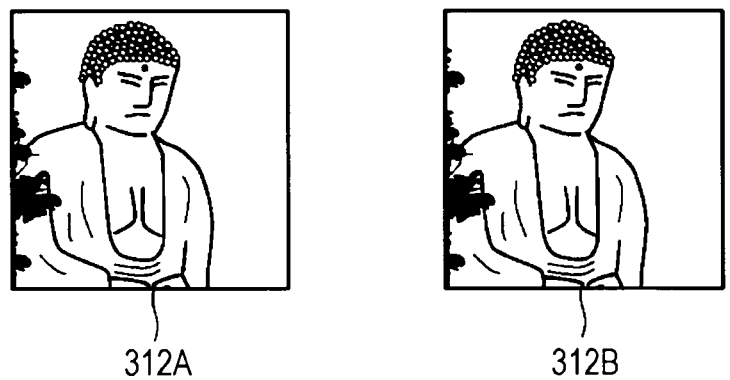
FIGS. 10A to 10C are diagrams illustrating generation of a background detection image.

Hereinafter, the generation of the background object detection image 311 in step S35 will be described with reference to the flowchart of FIG. 9 and FIGS. 10A to 10C. First, in step S351, high-speed continuous shooting is executed when the determination of the background object is input through the above-described double tap operation or the like. Then, a plurality (in this embodiment, two) of images (hereinafter, referred to as background object generation images 312) used to generate the background object detection image 311 are acquired. FIG. 10A shows two background object generation images 312A and 312B obtained in this way.

Next, in step S352, the deviation of all the images is calculated between the two background object generation images 312A and 312B. This deviation can be calculated by calculating a motion vector in all the images of the two background object generation images 312A and 312B. For example, a pixel deviation corresponding to the motion vector is calculated by executing a matching process between the two background object generation images 312A and 312B and calculating the degree of matching between the two background object generation images 312A and 312B. Alternatively, the deviation of all the images between the two background object generation images 312A and 312B is calculated by detecting a plurality of feature points of each of the two background object generation images 312A and 312B and matching the feature points between the two background object generation images 312A and 312B.

Figure 10B:
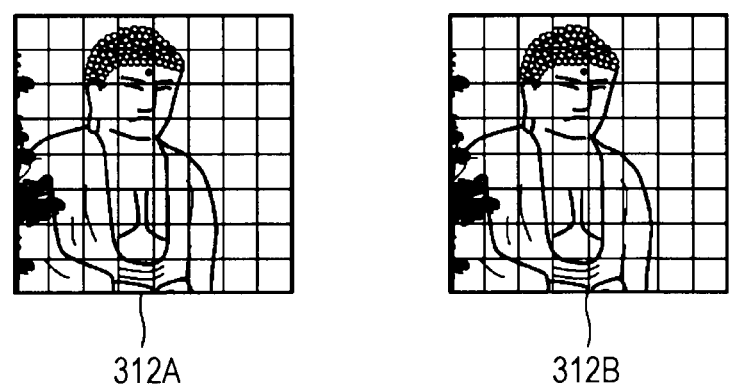
Figure 10C:
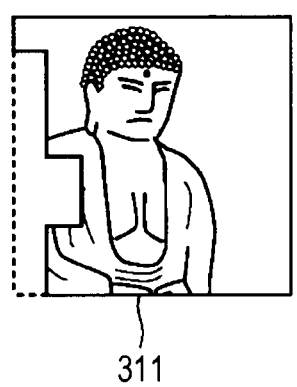

Next, in step S353, as shown in FIG. 10B, both the two background object generation images 312A and 312B are divided into blocks with a predetermined size and a motion vector is calculated as a deviation of each of the corresponding blocks. Next, in step S354, the deviation of each block calculated in step S353 is compared to the deviation, which is calculated in step S352, in all the images between two background object generation images 312A and 312B. In this comparison process, a block of which the deviation is different from the deviation of all the images between the two background object generation images 312A and 312B is obtained as a "deviation block" among the blocks. In the process of comparing the deviations to each other, the motion vector calculated as the deviation of all the images between the background object generation images 312A and 312B is compared to the motion vector calculated as the deviation of each block.

Next, in step S355, the background object detection image 311 is generated by excluding a portion corresponding to the "deviation block" from one of the two background object generation images 312A and 312B. The generated background object detection image 311 is stored in the buffer memory 7. FIG. 10O shows an example of the background object detection image 311 generated in this way. A portion in which leaves are exhibited in the left side of the background object detection image 311 is missed. The missed portion is a portion corresponding to the excluded "deviation block."

Further, since the two background object generation images 312A and 312B are not used later, the two background object generation images 312A and 312B may not be stored and may be erased. In this way, for example, a dynamic portion such as leaves is excluded and the background object detection image 311 is formed only in inactive static portions. Accordingly, it is possible to reduce the noise of the dynamic portion and improve the precision of the background object detection executed by the use of the background object detection image 311.

The case has hitherto been described in which the background objection detection object is generated using two background object generation images, but the number of background object generation images to be used is not limited to two. More background object generation images may be acquired by high-speed continuous shooting and the background object detection image may be generated using the more background object generation images. Alternatively, only one image may be acquired and used as the background object generation image.

Next, referring back to the flowchart of the "background object condition/main image condition setting" processes of FIG. 6, the description will be made. In the "background object condition/main image condition setting" processes, next, it is determined whether an input is executed using the main image condition mode button 400 in step S36. When the input is executed using the main image condition mode button 400 (Yes in step S36), the process proceeds to step S37 to display the main image condition screen.

2-2-2. Setting of Main Image Condition

Hereinafter, the main image condition setting process will be described. In step S37, the main image condition screen is displayed on the monitor 25. For example, the main image condition screen is displayed in FIGS. 11A to 11D. First, the main image condition mode button 400 is reversely displayed on the main image condition screen, as shown in FIG. 11A, to display the fact that a main image condition mode is selected. Next, as shown in FIG. 11B, a plurality of face icons 410 indicating a designation position are displayed. In the example of FIG. 11B, three horizontally arranged face icons by three vertical arranged face icons, that is, a total of nine face icons 410 are displayed on the monitor 25. The center of each face icon 410 is set as a target face position 411. As described above, matching of a face with the target face position in the finally generated main image is the main image condition.

Next, in step S38, it is determined whether the target face position is designated as the main image condition. The target face position is designated when the user touches an arbitrary face icon 410 among the plurality of face icons 410 displayed on the monitor 25 with his or her finger. The designated face icon 410 is reversely displayed, as shown in FIG. 11C. When the target face position 411 is designated (Yes in step S38), the process proceeds to step S39 to store the position corresponding to the designated face icon 410 as the main image condition in the buffer memory 7.

The main image condition screen used to prompt the user to designate the target face position is not limited to the main image condition screen shown in FIGS. 11A to 11D. FIGS. 11A to 11D show the example in which the three horizontally arranged face icons by the three vertically arranged face icons, that is, a total of nine face icons 410 are displayed. However, the number of face icons 410 is not limited thereto. For example, two horizontally arranged face icons by two vertically arranged face icons, that is, a total of four face icons may be displayed or four horizontally arranged face icons by four vertically arranged face icons, that is, a total of sixteen face icons may be displayed.

Further, it may be configured that the user can designate the plurality of face icons 410. In the example of FIG. 11D, the three vertically arranged face icons 410 on the right side are designated. For example, when the user wants to locate his or her face on the right side of the image frame and is allowed to locate his or her face vertically, the user may designate the plurality of face icons, as shown in FIG. 11D.

Figure 12A:
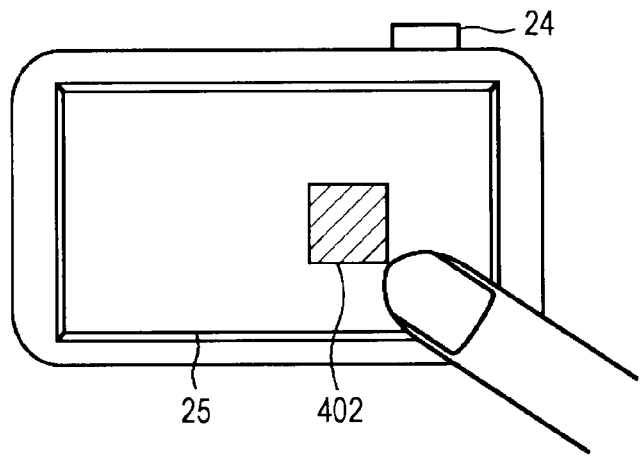
FIGS. 12A to 12C are diagrams illustrating another example of the background object designation screen.

Further, for example, when the user touches an arbitrary position on the operation surface of the touch panel 26 with his or her finger to execute an input without displaying the face icons 410, as shown in FIG. 12A, a face position designation frame 402 which centers the touch position and has a predetermined size may be displayed. The inside of the range surrounded by the face position designation frame 402 is designated as the target face position.

The face position designation frame 402 can be changed in position and size. For example, the position of the face position designation frame 402 can be changed by touching the inside of the face position designation frame 402 with the finger of the user and executing a drag operation in the touch state. Further, the size of the face position designation frame 402 can be expanded by touching the face position designation frame 402 with two fingers of the user and executing a pinch-out operation. The size of the face position designation frame 402 can be reduced by touching the face position designation frame 402 with two fingers of the user and executing a pinch-in operation.

The user can designate an arbitrary face position by adjusting the face position designation frame 402 so as to be located at an arbitrary position and have arbitrary size. When the user decides the position and the size of the face position designation frame 402, the user inputs the determination of the face region, for example, by executing a double tap operation in the face position designation frame 402. Further, a method of halfway pressing down the release button 24 may be used as the method of inputting the determination of the face region.

Figure 12B:
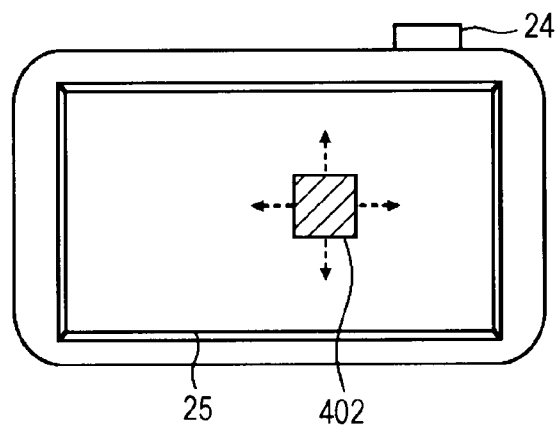

As shown in FIG. 12B, the face position designation frame 402 may be moved in response to an input of the user on a cross key (not shown) or the like serving as an input function of the imaging apparatus 1.

Figure 12C:
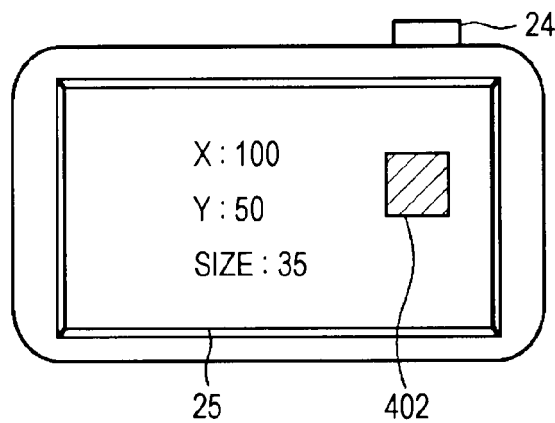

As shown in FIG. 12C, the position and the size of the face position designation frame 402 may be changed by inputting numbers. In the example of FIG. 12C, the X and Y coordinates and the size of the face position designation frame 402 can be input, and thus the face position designation frame 402 is moved and the size of the face position designation frame 402 is changed in accordance with the input values. The examples of FIGS. 12B and 12C are considered to be effective when the input function is not the touch panel 26 but a button, a cross key, or the like.

On the other hand, when the input is not executed using the main image condition mode button 400 in step S36, the process proceeds to step S40 (Yes in step S36). Then, in step S40, the main image condition is set as a predetermined default condition. An example of the default condition is the entire inside of the image frame. When the user considers his or her face to be included within the image frame irrespective of the position of his or her face in the main image, the entire inside of the image frame may be set as the main image condition. Further, the center of the image frame may be set as the default condition.

Then, the "background object condition/main image condition setting" processes are ended. The case has hitherto been described in which the background object condition setting process is executed, and then the main image condition setting process is executed. However, the order is not limited thereto, but the main image condition setting process may be first executed and the background object condition setting process may be then executed.

Figure 13A:
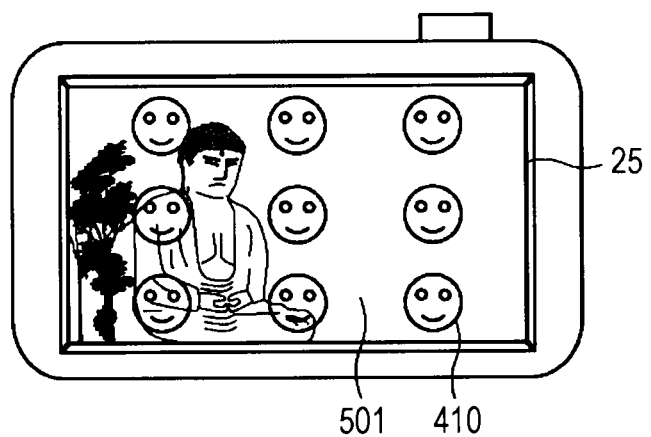
FIGS. 13A and 13B are diagrams illustrating modifications of the background object designation screen and the face position designation screen.

When the background object condition setting process is first executed and the main image condition setting process is then executed, an image (hereinafter, referred to as an image 501 in the background object condition setting) of the entire image frame may be generated and stored in the buffer memory 7. As shown in FIG. 13A, the image 501 in the background object condition setting may be displayed on the monitor 25 and may be face icons 410 may be displayed on the image 501 in the background object condition setting in an overlapping manner. In this way, the face position can be designated in consideration of the position, the size, and the like of the background object.

Figure 13B:
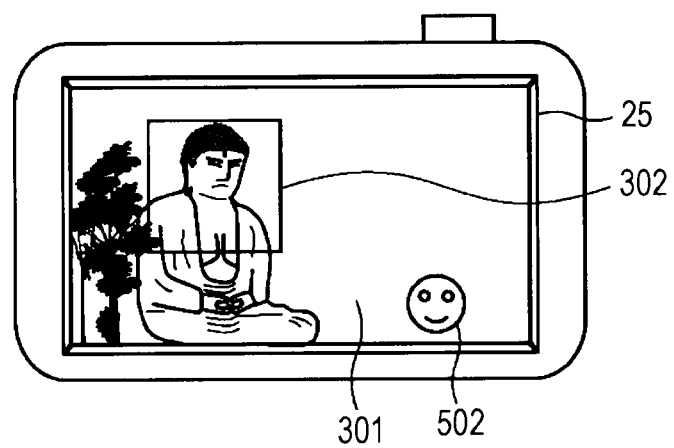

On the contrary, when the main image condition setting process is first executed and the background object condition setting process is then executed, as shown in FIG. 13B, a designated position icon 502 may be displayed so that a previously designated face position is displayed on the through image 301 in an overlapping manner. In this way, since the user can normally recognize the face position designated by the user himself or herself in the setting of the background object designation frame 302, it is possible to easily comprehend a position relation between the face and the background object.

2-2-3. Process Executed In Self-photographing

Figure 14:
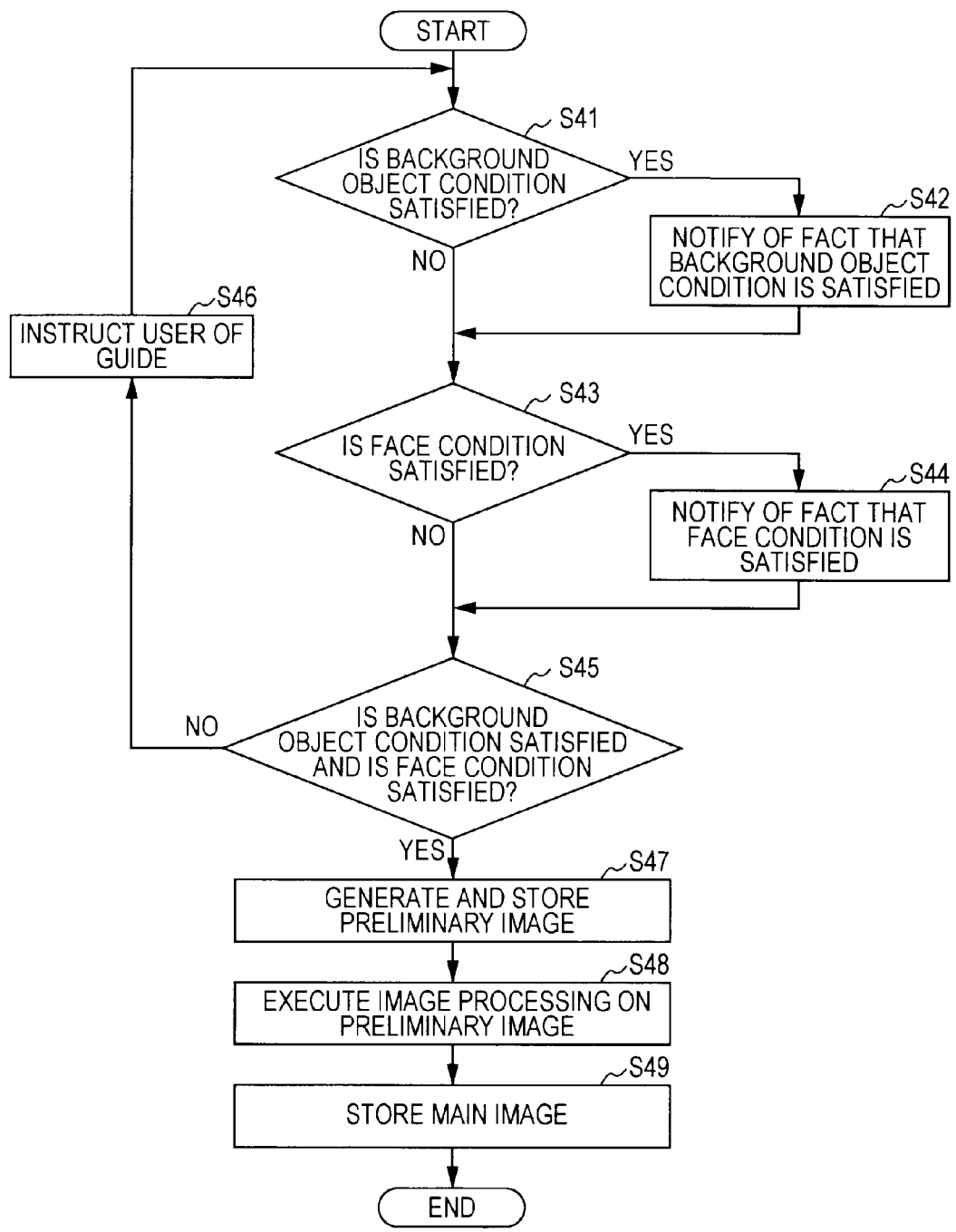
FIG. 14 is a flowchart illustrating the flow of a process in the self-photographing.

Next, the details of the "self-photographing" process of step S4 in the entire flow of FIG. 4 will be described with reference to the flowchart of FIG. 14. Further, for example, a message of "PLEASE FACE CAMERA TO YOURSELF" or the like may be output as a voice from the speaker 22, before the "self-photographing" process starts (when the "background object condition/main image condition setting" processes end). Alternatively, a character string of "PLEASE FACE CAMERA TO YOURSELF" or the like may be displayed on the monitor 25. In this way, the user may be notified of the fact that the self-photographing can be executed since the "background object condition/main image condition setting" processes end.

First, in step S41, the background object detecting unit 33 determines whether the background object condition is satisfied. As described above, the background object condition is inclusion of the background object in the image frame. Accordingly, the determination of step S41 is executed based on whether the background object is detected within the image frame of the through image. The background object is detected through template matching. The background object detection image generated by the background object image generating unit 31 is used as a template image which is used in the template matching.

Figure 15A:
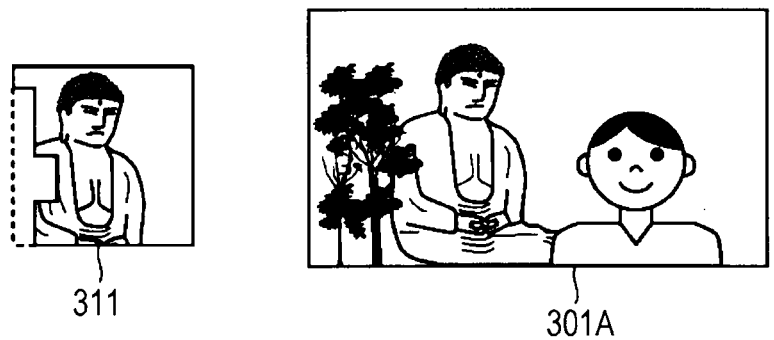
FIGS. 15A to 15C are diagrams illustrating a background object detection process.

Specifically, as shown in FIG. 15A, the background object detection image 311 used as the template image is read from the buffer memory 7. A search region used to execute matching with the background object detection image 311 which is the template image is set in a through image 301A to be detected. When the template matching is executed on all of the through images, the template matching may be overburdened. Accordingly, images with an update frequency lower than that of the through image may be prepared as through images and the template matching may be executed on the images.

Figure 15B:
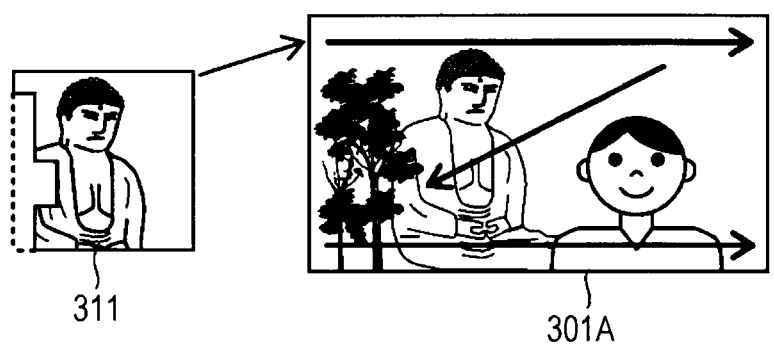

As shown in FIG. 15B, a similarity between an image in the search region and the background object detection image 311 is calculated at each position while the position of the search region set in the through image 301A is moved by each predetermined amount such as one pixel in the image to be detected. The similarity is calculated using a method such as a residual method or a mutual correlation method. The background object is detected by calculating the similarity in the entire image and determining that the background object is present in the search region with the maximum similarity.

Figure 15C:
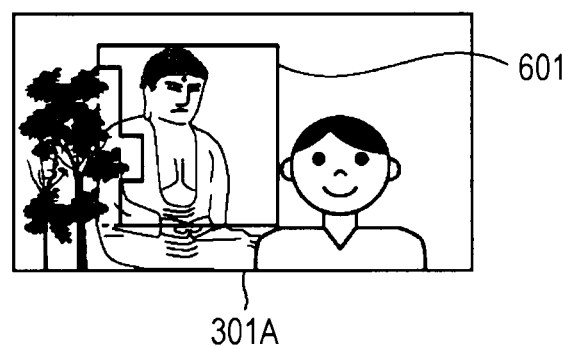

In this way, when the background object is present in the through image 301A, as shown in FIG. 15C, the background object is detected. The frame with the same shape as that of the background object detection image 311 shown in FIG. 15C indicates a region (hereinafter, referred to as a background object region 601) detected as the background object. Further, it may be determined that the background object condition is satisfied, when the entire background object is not included in the image frame and a part of the background object is included in the image frame and the similarity is the maximum in a relation between the image in the search region and a predetermined area (for example, 75%) of the background object detection image 311.

When the background object detecting unit 33 detects the background object and determines that the background object is satisfied, the position and the size of the background object region and an inclination of the background region with respect to the image frame can be stored as background object region information in the buffer memory 7 in association with the preliminary image generated in the self-photographing. Further, the size of the background object designation frame 302 at the designation time of the background object can be also stored as background object designation frame size information in association with the preliminary image. The background object region information and the background object designation frame size information are used in image processing described below.

When the background object is detected in the image frame in step S41, that is, it is determined that the background object condition is satisfied, the user is notified of the fact that the background object condition is satisfied under the control of the notification control unit 35 in step S42. Then, the user can know that the previously designated background object is included in the image frame. As the notification method, a method of outputting a voice of a predetermined tone or outputting a voice message of "BACKGROUND IS INCLUDED" from the speaker 22 can be used. As a method other than the voice method, the user may be notified by lighting the LED 23 with a predetermined color.

When it is determined that the background object condition is not satisfied in step S41 (No in step S41) and the user is notified in step S42 (Yes in step S41), the face detecting unit 34 determines whether the face condition is satisfied in step S43. To determine whether the face condition is satisfied, a face condition range having a predetermined size and including the target face position set as the main image condition is first set and it is determined whether the face overlaps the face condition range. When the face partially overlaps the face condition range, it is determined that the face condition is satisfied. In the determination of step S43, the face detecting unit 34 first detects the face of the user from the through image.

The detection of the face by the face detecting unit 34 is executed through, for example, template matching, as in the detection of the background object. Specifically, a rectangular frame used to execute matching with the face detection template image is first set as a search region in the through image to be detected. Next, a similarity between the image in the search region and the template image is calculated at each position while the position is moved by each predetermined amount in the image in the search region. Then, the face is detected by calculating the similarity in the entire image and determining that the face is present in the search region with the maximum similarity. As the method of detecting the face, a method of matching with a template in which face luminance distribution information is recorded can be used. Further, a method of detecting the face based on the feature amount of a flesh color included in an image or a human face can be used. Further, the face detection precision may be improved by combining these methods.

The face of a user or a person who frequently uses the imaging apparatus 1 may be registered in advance as a template image by executing a predetermined registration process and the face may be detected in the template matching executed using the template image.

The position and the size of a region (hereinafter, referred to as a face region) detected as a face by the face detecting unit 34 is stored as face region information in the buffer memory 7 in association with a preliminary image generated in the self-photographing.

Then, it is determined whether the detected face region satisfies the face condition. Hereinafter, a process of determining whether the face condition is satisfied will be described with reference to FIGS. 16A to 18B.

Figure 16A:
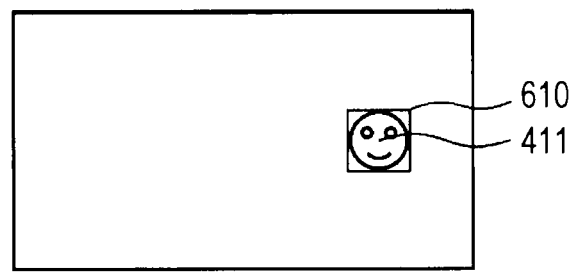
FIGS. 16A to 16C are diagrams illustrating a face position determination process.
Figure 16B:
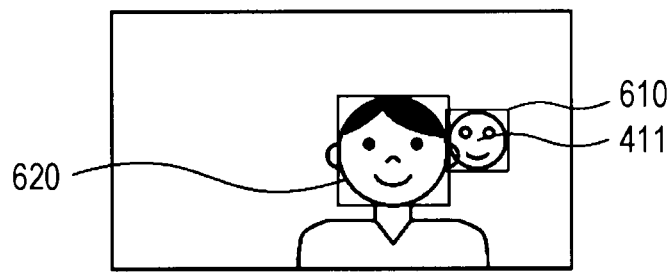
Figure 16C:
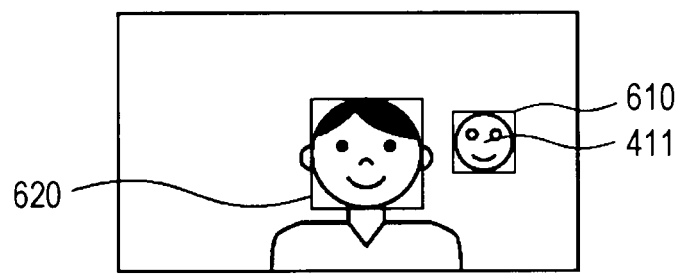

FIGS. 16A to 16C are diagrams illustrating a first determination method executed by the face detecting unit 34. The center of a face icon shown in FIG. 16A is a target face position 411 as the main image condition set by the main image condition setting unit 32. A rectangular face condition range 610 centering the target face position 411 is set. Further, the face condition range 610 may have a circular shape with the same size as the face icon.

In this embodiment, it is determined that the face condition is satisfied, even when the detected face region 620 slightly overlaps the face condition range 610, as shown in FIG. 16B. Further, it is determined that the face condition is satisfied, even when the entire face region 620 overlaps the face condition range 610. It may be determined that the face condition is satisfied, when the center of the face region 620 is located inside the face condition range 610. On the other hand, it is determined that the face condition is not satisfied, when the face region 620 and the face condition range 610 are distant from each other, as shown in FIG. 16C.

In the imaging apparatus according to the embodiment of the present technology, it is determined that the face condition is satisfied, not when the face region 620 completely overlaps with the face condition range 610 or most of the face region 620 overlaps the face condition range 610, but when the face region 620 slightly overlaps with the face condition range 610. Thus, the user may not accurately match his or her face with the target face position 411 in the self-photographing. When the face condition range 610 is set as a face condition looser than the target face position 411 as the main image condition, the face is imaged in a state where the face is deviated from the target face position 411. Accordingly, in the embodiment of the present technology, image processing described below is executed to satisfy the main image condition by matching the face with the target face position 411. The image processing will be described in detail later.

Figure 17A:
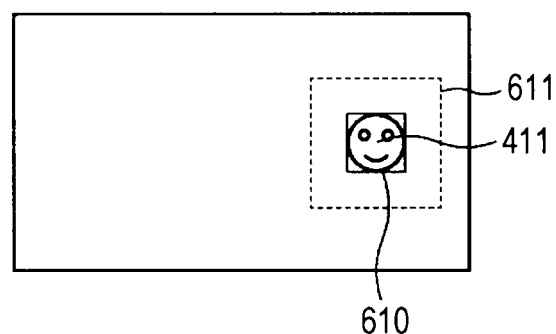
FIGS. 17A and 17B are diagrams illustrating another example of the face position determination process.
Figure 17B:
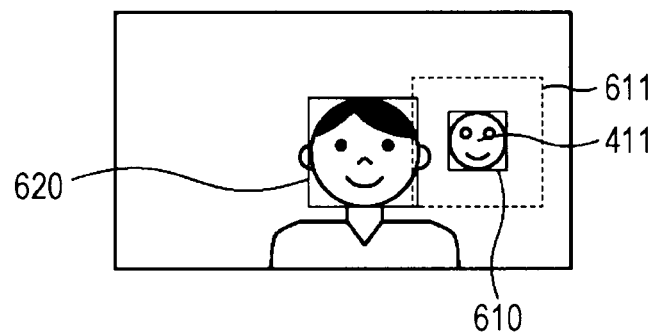

Next, a second determination method executed by the face detecting unit 34 will be described. In the second determination method, as shown in FIG. 17A, a preliminary face condition range 611 larger than the face condition range 610 in size is set with reference to the target face position 411. Then, as shown in FIG. 17B, it is determined that the face condition is satisfied, when the face region 620 does not overlap the face condition range 610 but slightly overlaps the preliminary face condition range 611.

In the self-photographing, the user does not view the through image, and thus it is difficult for the user to approach the face of the user to the target face position 411 or the face condition range 610. Accordingly, by setting the preliminary face condition range 611 larger than the face condition range 610 in size, it is possible to take a more opportunity of determining that the face condition is satisfied. Further, a method of matching the face with the target face position 411 through the image processing after acquiring the preliminary image is the same as the first determination method.

The face condition range 610 and the preliminary face condition range 611 are not set by the user, but are automatically set when the user designates the target face position 411 as the main image condition. However, the user may set the sizes of the face condition range 610 and the preliminary face condition range 611 with reference to the target face position 411.

Figure 18A:
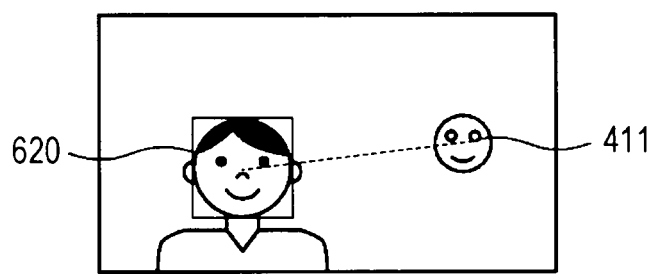
FIGS. 18A and 18B are diagrams illustrating still another example of the face position determination process.
Figure 18B:
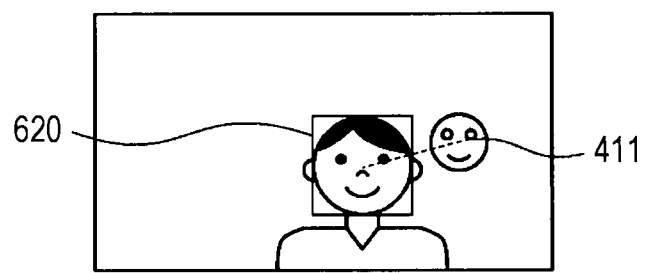

Next, a third determination method executed by the face detecting unit 34 will be described. In the third determination method, the distance between the target face position 411 and the center of the detected face region 620 is calculated, as shown in FIGS. 18A and 18B. It is determined whether the face condition is satisfied by determining whether the distance is equal to or greater than a predetermined threshold value.

In the state shown in FIG. 18A, it is determined that the face condition is not satisfied, since the calculated distance is greater than the threshold value. On the other hand, in the state shown in FIG. 18B, it is determined that the face condition is satisfied, since the distance is equal to or less than the threshold value. The threshold value used as a reference of this determination may be set as a predetermined value as a default or may be set to an arbitrary value by the user.

On the other hand, when the target face position 411 is not designated as the main image condition, the target face position 411 is set to a default position. For example, in a case where the default position is the entire image frame, it is determined that the face condition is satisfied when a face enters the image frame.

When it is determined that the face condition is satisfied in step S43 (Yes in step S43), the user is notified of the fact that the face condition is satisfied in step S44 under the control of the notification control unit 35. Thus, the user can know that the previously designated face condition is satisfied and the face approaches the target face position 411.

As the notification method, for example, a method of outputting a voice of a predetermined tone or outputting a voice message of "FACE MATCHES WITH TARGET POSITION" from the speaker 22 can be used. As a method other than the voice method, the user may be notified by lighting the LED 23 with a predetermined color. However, to distinguish this notification from the notification that the background object condition is satisfied, the tone of the voice, the color of the LED 23, and the lighting method may be different from those in the notification that the background object condition is satisfied. Further, a notification function and notification contents may correspond to each other by giving the notification by the voice from the speaker 22 for the background object condition, whereas giving the notification by the LED 23 for the face condition.

When it is determined that the face condition is satisfied in step S43 (No in step S43) and the user is notified in step S44 (Yes in step S43), it is determined in step S45 whether the background object condition is satisfied and the face condition is satisfied. This is a step determining whether the self-photographing is prepared.

When it is determined that the background object condition is satisfied and the face condition is not satisfied in step S45, that is, it is determined that the self-photographing is not prepared (No in step S45), the process proceeds to step S46. Then, in step S46, the user is notified of the guide information so as to satisfy the face condition under the control of the notification control unit 35.

As the method of notifying the user of the guide information, for example, a voice stored in advance in a ROM or the like can be output from the speaker 22, the LED 23 emits light, or a vibrator (not shown) vibrates. Further, the voice contents may be changed in accordance with the distance between the detected face and the face condition range 610. For example, in a case of the voice notification, for example, a voice of "RIGHT MORE" is output when the face is distant from the target face position 411, whereas a voice of "RIGHT A LITTLE" is output when the face is close to the target face position 411.

Figure 19A:
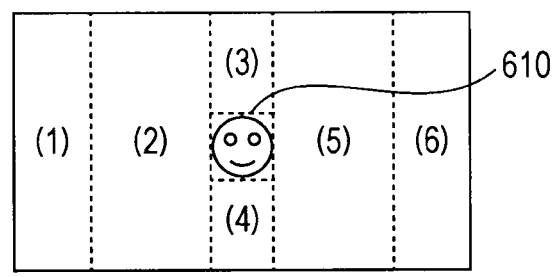
FIGS. 19A and 19B are diagrams illustrating a guide notification method.
Figure 19B:
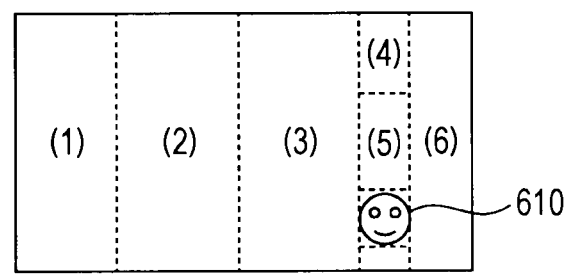

The notification method will be described with reference to FIGS. 19A and 19B. In the example shown in FIG. 19A, the image frame is divided into the face condition range 610 and six regions (hereinafter, referred to as nontarget regions) in the vicinity of the face condition range 610. Another guide voice is made to correspond to each nontarget region. For example, a voice of "LEFT (RIGHT) MORE" is assigned to regions (1) and (6) distant from the target face position 411 and a voice "LEFT (RIGHT) A LITTLE" is assigned to nontarget regions (2) and (5). Further, a voice of "UPWARD MORE" is assigned to a nontarget region (3) and a voice of "DOWNWARD MORE" is assigned to a nontarget region (4). The guide voice assigned to each nontarget region is output in accordance with the position of the detected face region. In this way, the user can be notified of the guide information in accordance with the position of the face.

Of course, the method of dividing the region is changed depending on the position of the face condition range 610. For example, when the target face position 411 is located in the right lower side, the image frame is divided, as in FIG. 19B. Further, the nontarget regions shown in FIGS. 19A and 19B are not examples. The division method, the division number, and the assignment of the voice to each nontarget region may be modified in various patterns.

When a target face size is designated together with the target face position 411, guide voices of "FRONT MORE", "FRONT A LITTLE", "REAR MORE", and "REAR A LITTLE" may be output.

A beep sound may be assigned to each nontarget region, instead of the guide voice. When a beep sound is assigned, beep sounds having different magnitudes, lengths, output intervals, and the like may be assigned to respective nontarget regions. For example, in FIG. 19A, guides are executed with the beep sound with high tone in a case of horizontal guides of the nontarget regions (1), (2), (5), and (6), whereas the guides are executed with the beep sound with low tone in a case of vertical guides of the nontarget regions (3) and (4). Then, the beep sound with a long output interval is assigned to the nontarget regions (1) and (6) distant from the face condition range 610 and the beep sound with a short output interval is assigned to the nontarget regions (2) and (5). Thus, since the output interval of the beep sound becomes short when the face approaches the face condition range 610, the user can sensually recognize that the face approaches the face condition range 610.

Further, it can be considered that a beep sound, such as a long beep, with a long sound time is output as the notification that the face condition is satisfied, when the output interval of the beep sound is shortened from a long beep to a short beep as the face approaches the face condition range 610. Thus, it is considered that the user can sensually recognize that the face condition is satisfied. The assignment of the beep sound to the above-described region is just an example, but may be modified in various patterns.

Figure 20B:
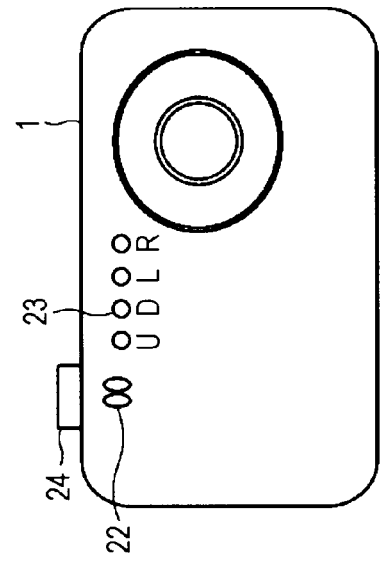
FIGS. 20A to 20C are diagrams illustrating modifications of the outer appearance configuration of an imaging apparatus.
Figure 20A:
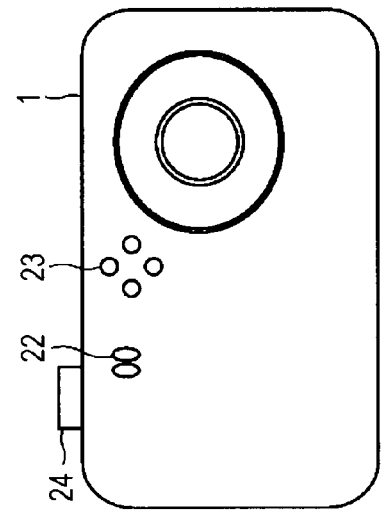
Figure 20C:
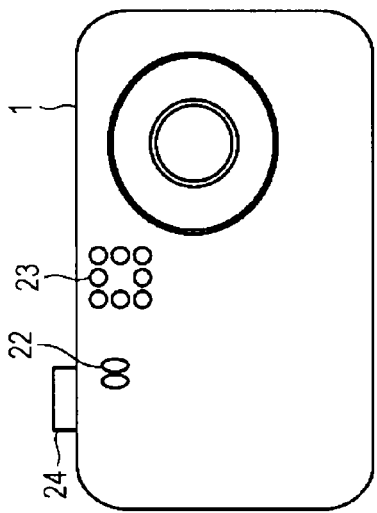

Further, the guide information can be notified by emitting light from the LED 23. For example, the screen may be divided into a plurality of nontarget regions and different colors may be assigned to the nontarget regions, as in the guide by the sound. As shown in FIGS. 20A to 20C, the imaging apparatus 1 may include a plurality of LEDs 23 and each LED 23 may correspond to a guide direction. In the example of FIG. 20A, four LEDs 23 are arranged in a quadrangle form. In this example, when the user is guided in an inclination direction, the user may be notified by emitting light from two LEDs 23. For example, when the user is guided in the right upper direction, the upper LED 23 and the right LED 23 are made to emit light.

In FIG. 20B, LEDs 23 are arranged in one horizontal line and the LEDs 23 are made to correspond to directions by characters of U (UP), D (DOWN), L (LEFT) and R (RIGHT). Further, in FIG. 20C, eight LEDs 23 are arranged in a quadrangle form. The number and arrangement of the above-described LEDs 23 are just examples. More LEDs 23 may be installed. Further, other arrangement patterns may be used.

Until the background object condition is satisfied and the face condition is satisfied in step S45, step S41 to step S46 are repeated, and the guide instruction and the notification are given in accordance with the adjustment of the user. Even when the background object comes out of the image frame, the user may be notified. In this case, a boody sound may be used since the boody sound delivers a warning reason to the user.

When the notification of the guide information is repeated in step S46, step S41 to step S46 are repeated until the background object condition is satisfied and the face condition is satisfied in step S45. When it is determined that background object condition is satisfied and the face condition is satisfied in step S45, that is, it is determined that a self-photographing condition is satisfied, the process proceeds to step S47 (Yes in step S45). Next, in step S47, the imaging apparatus 1 executes imaging to generate a preliminary image. The generated preliminary image is stored in the buffer memory 7.

It is considered that the imaging is executed at various timings. For example, the imaging is automatically executed when the self-photographing condition is satisfied (it is determined that the background object condition is satisfied and the face condition is satisfied), the imaging is automatically executed. Alternatively, the user is prompted to press down the release button 24 by outputting a sound or/and emitting light from the LED 23 when the self-photographing condition is satisfied. According to this method, the user can execute the imaging at the timing that the user desires.

Further, when the self-photographing condition is satisfied, the countdown may begin by voices of "5", "4", "3". "2", and "1", and then the imaging may be automatically executed when he countdown ends. According to this method, the user can exhibit an expression during a predetermined time, since there is the predetermined time between the time at which the self-photographing condition is satisfied and the imaging time. Further, since the user himself or herself may not press down the release button 24, it is possible to prevent the position of the face from being deviated since the user erroneously moves the imaging apparatus 1 when the user attempts to press down the release button 24.

The image obtained through the image in step S47 is stored as a preliminary image in the buffer memory 7. When the generated preliminary image is stored in the buffer memory 7, the position, size, angle, and the like of the background object region 601 are stored as background object region information in association with the preliminary image so that the position, size, angle, and the like of the background object region 601 are used in an image processing described below. Further, the position, size, and the like of the face region detected by the face detecting unit 34 are also stored as face region information in association with the preliminary image.

Next, in step S48, the image processing is executed on the preliminary image to finally generate a main image. Then, in step S49, the generated main image is stored in the storage unit 8. Further, the preliminary image used to generate the main image may be also stored in the storage unit 8 so as to be reproducible.

2-3. Image Processing

Hereinafter, image processing will be described. The image processing executed by the imaging apparatus 1 according to this embodiment includes a face position adjustment process, an inclination correction process, a background object size adjustment process, an optimum composition adjustment process, a horizontal and vertical conversion process, a face direction correspondence adjustment process, and an expansion process based on a golden ratio. Further, the processes other than the face position adjustment process, that is, the inclination correction process, the background object size adjustment process, the optimum composition adjustment process, the horizontal and vertical conversion process, the face direction correspondence adjustment process, and the expansion process based on a golden ratio are processes executed when the main image condition is not set by the user.

2-3-1. Face Position Adjustment Process

First, a face position adjustment process will be described with reference to FIGS. 21A to 24B. In the embodiment of the present technology, since it is difficult for a user to match his or her face with a target face position, the imaging is executed not when the face matches with the target face position, but when the face slightly overlaps a face condition range with a predetermined area and it is considered that the face condition is satisfied. In the preliminary image, it is assumed that the user does not completely match with the target face position that the user desires. Accordingly, the face position adjustment process is a process of processing an image so that the face matches with the target face position in the main image, that is, the main image condition is satisfied. The face position adjustment process is executed by the cutout region setting unit 41, the background object position determining unit 42, the image cutout unit 43, and the expansion processing unit 44.

The cutout region setting unit 41 sets a cutout region of the preliminary image so that the face matches with the target face position in the preliminary image. The cutout region setting unit 41 sets the cutout region so that the center of a region detected as the face matches with the target face position. The background object position determining unit 42 determines whether a background image is included in the cutout region set by the cutout region setting unit 41. For example, referring to the position and the size of the background region indicated by the background object region information, this determination is executed depending on whether the entire background object region detected as the background object is included in the cutout region in the preliminary image. In this embodiment, it is determined that the background object is included in the cutout region, only when the background object region is included in the cutout region.

The image cutout unit 43 generates a cutout image by cutting the cutout region set by the cutout region setting unit 41 from the preliminary image. The expansion processing unit 44 generates the main image by expanding the cutout image generated by the image cutout unit 43. In this embodiment, the expansion processing unit 44 expands the cutout image so as to be suitable for the size of the main image. The size of the main image is the same as that of the preliminary image.

The process of expanding the image can be executed by a nearest neighbor method of setting the pixel value of a pixel closest to an interpolated pixel as an interpolation pixel value. Further, the process of expanding the image can be executed by a bi-linear interpolation method of calculating an interpolation pixel value through primary approximation in which the pixel values of four pixels around a pixel to be interpolated are used. Furthermore, the process of expanding the image can be executed by a bi-cubic convolution method of setting, as an interpolation pixel value, a value calculated from the pixel values of sixteen pixels around a pixel to be interpolated by the use of a cubic function.

FIG. 21A is a diagram illustrating the target face position 411 as the main image condition designated by the user. FIG. 21B shows a state where the face region 620 and the face condition range 610 overlap each other and it is determined that the face condition is satisfied in the imaging of the self-photographing. In this state, a preliminary image 701 is generated. The generated preliminary image 701 is shown in FIG. 21C. When FIGS. 21A and 21C are compared to each other, it can be understood that a deviation occurs between the position of the face in the preliminary image 701 and the target face position 411.

Figure 22:
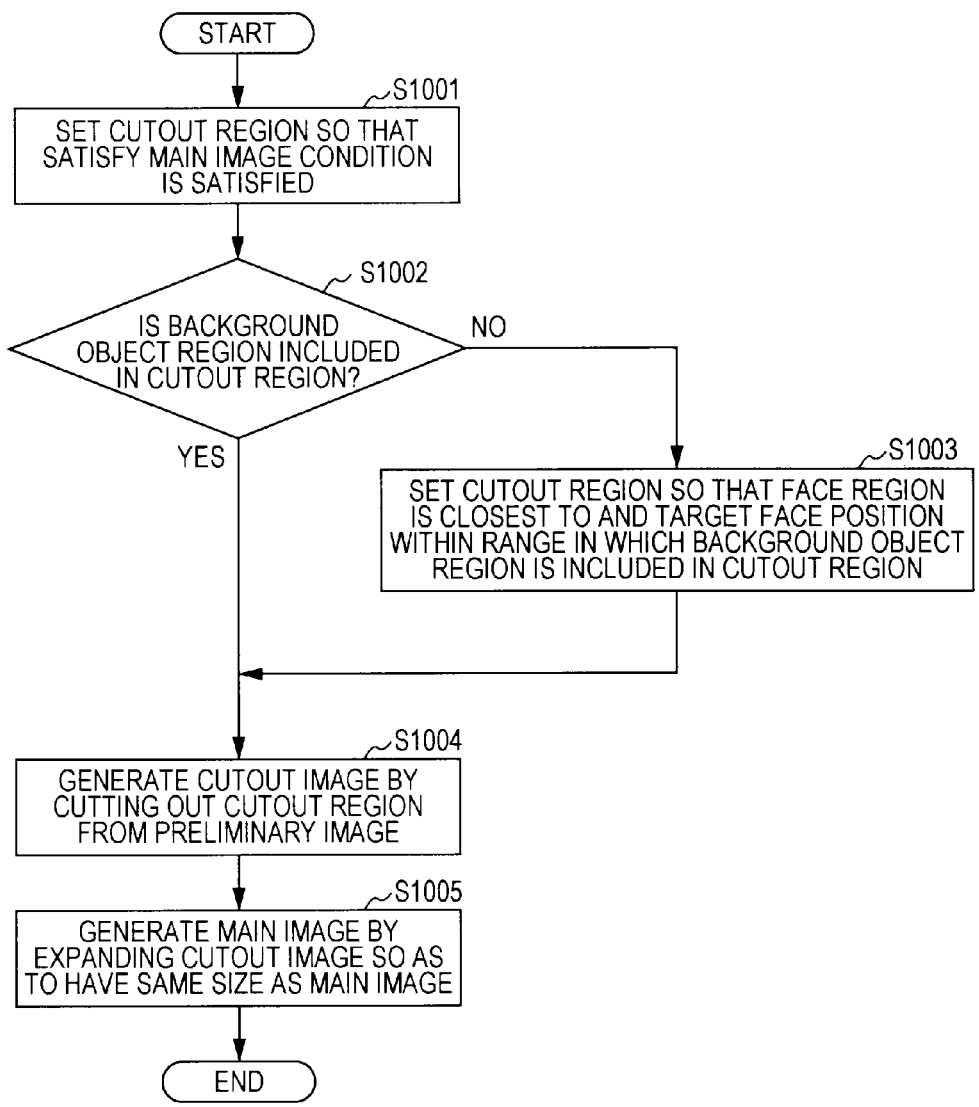
FIG. 22 is a flowchart illustrating the flow of the face position adjustment process.

FIG. 22 is a flowchart illustrating the flow of the face position adjustment process. In step S1001 of the face position adjustment process, the cutout region setting unit 41 first sets a cutout region 702 in the main image subjected to the face position adjustment process so that the face matches with the target face position 411 (so that the main image condition is satisfied). FIG. 21D shows the cutout region 702 set in this way. The aspect ratio of the cutout region 702 is the same as that of the preliminary image 701. When the cutout region 702 is expanded so as to have the same size as the preliminary image 701, a target face position 411A in the cutout region 702 is configured to match with the target face position 411. In the cutout region 702, the face region 620 matches with the target face position 411A. Further, in FIG. 21D, the neck, noise, mouth of the face are not illustrated to easily view the drawing.

Next, in step S1002, it is determined whether the background object region 601 is included in the cutout region 702. When it is determined that the background object region 601 is included in the cutout region 702 in step S1002, the process proceeds to step S1004 (Yes in step S1002). On the other hand, when it is determined that the background object region 601 is not included in the cutout region 702 in step S1002, the process proceeds to step S1003 (No in step S1002).

In step S1003, the cutout region 702 is reset so that the face region 620 is the closest to the target face position 411A within a range in which the background object region 601 is included in the cutout region 702. However, when the face region 620 is preferentially made to match with the target face position 411A, the determination of step S1002 and the setting of the cutout region 702 in step S1003 may not be executed.

Next, in step S1004, a cutout region 703 shown in FIG. 21E is generated by cutting out the cutout region 702 from the preliminary image. Then, in step S1005, a main image 800 shown in FIG. 21F is generated by expanding the cutout image 703 so as to have the same size as the main image.

FIG. 23 is a diagram illustrating a state where the main image 800 generated in this way is displayed on the monitor 25 of the imaging apparatus 1. In the main image 800, it can be understood that the face matches with the target face position 411. In the face position adjustment process, the user may not accurately match the face with the target face position 411 in the imaging of the self-photographing. Therefore, it is possible to easily execute the imaging of the self-photographing and it is possible to match the face with the target face position 411 in the finally generated main image. Further, when FIGS. 21C and 21F are compared to each other, it can be understood that the upper and right margins of the preliminary image 701 are cut out through the face position adjustment process. Therefore, it is possible to obtain the advantage of cutting out unnecessary margins and setting a proper composition.

Figure 24A:
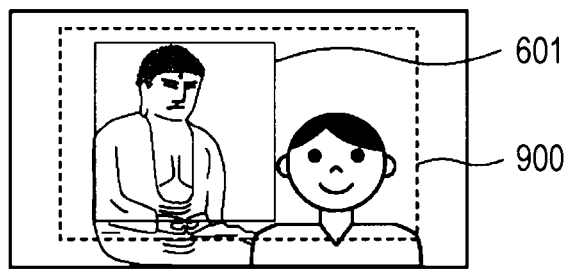
FIGS. 24A and 24B are diagrams illustrating a background object detection region.
Figure 24B:
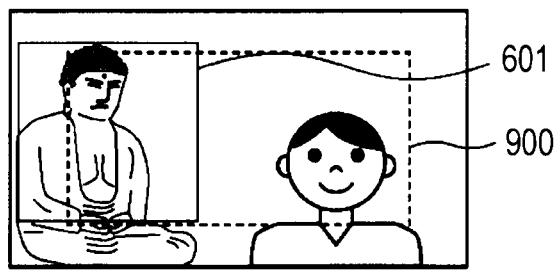

Further, the face position adjustment process is a process of cutting a part of the preliminary image 701. Accordingly, when a background object is located at the corner of the preliminary image 701, the background object is cut out through the face position adjustment process, and thus the background object may not consistently be included in the cutout region 702 by matching the face with the target face position 411. Accordingly, as shown in FIGS. 24A and 24B, a background object search range 900 is set so as to be narrower than the image frame. It is determined that the background object is included in the image frame only when the background object region 601 is detected within the background search range 900 through template matching in the determination step executed by the above-described background object detecting unit 33. Thus, even when a region outside the background object search range 900 is cut out in the face position adjustment process, the background object is not cut out.

In the example shown in FIG. 24A, it is determined that the background object condition is satisfied since the detected background object region 601 is located within the background object search range 900. On the other hand, in the example shown in FIG. 24B, the background object region 601 is detected, but it is determined that the background condition is not satisfied since the background object region 601 is not included in the background object search range 900.

When the user can designate a plurality of target face positions 411, the face may be set so as to match with the target face position 411 which is the closest to the face in the preliminary image among the plurality of target face positions 411. Further, the face may be set so as to match with the substantial middle of the target face position 411.

2-3-2. Inclination Correction Process

Next, an inclination correction process will be described. The inclination correction process is a process of generating the main image in which the background object becomes substantially horizontal by rotating the preliminary image when the background object is inclined in the preliminary image. The inclination correction process is executed by the inclination detecting unit 45, the image rotating unit 46, the cutout region setting unit 41, the image cutout unit 43, and the expansion processing unit 44.

The inclination detecting unit 45 detects the inclination of a background object in a preliminary image. For example, the inclination detecting unit 45 detects the inclination of a background object by comparing the inclination of a region detected as a background object indicated by the background object region information to the horizontal axis of the image frame. The image rotating unit 46 rotates the preliminary image by the inclination detected by the inclination detecting unit 45 so that the upper and lower sides among the sides of the frame indicating the background object region are substantially parallel to the upper and lower sides of the image frame. For example, the rotation process is executed through affine transform.

The cutout region setting unit 41 sets the cutout region 702 so that the size of the cutout region 702 is the largest in the preliminary image by excluding a blank portion 750 occurring in the rotation process from the preliminary image subjected to the rotation process. The image cutout unit 43 generates a cutout image 703 by cutting out the cutout region 702 from the preliminary image. The expansion processing unit 44 generates the main image by expanding the cutout image 703.

Figure 25A:
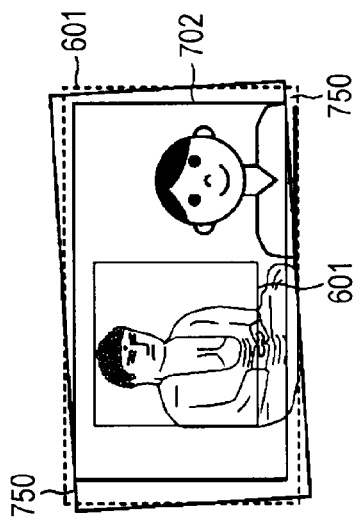
FIGS. 25A to 25E are diagrams illustrating an inclination correction process.
Figure 25B:
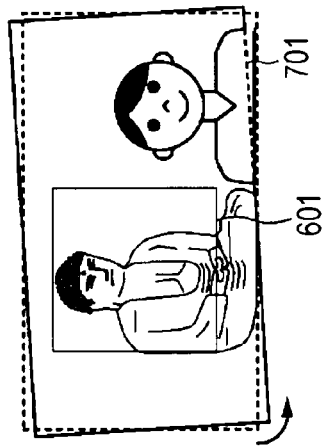

FIG. 25A shows the preliminary image 701 obtained through the self-photographing. In step S1011, the inclination of the background region 601 is detected. In the preliminary image 701 shown in FIG. 25A, the background object region 601 is not parallel to the image frame. That is, the background object is inclined with respect to the image frame. Next, in step S1012, the process of rotating the preliminary image 701 is executed based on the detected inclination of the background object, as shown in FIG. 25B.

Figure 25C:
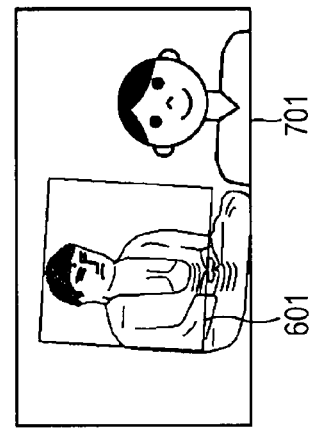
Figure 25D:
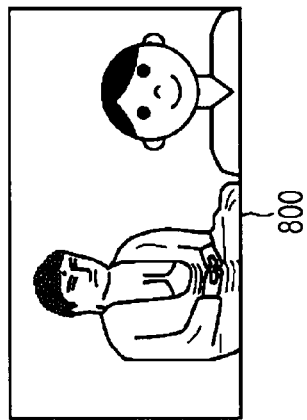
Figure 25E:
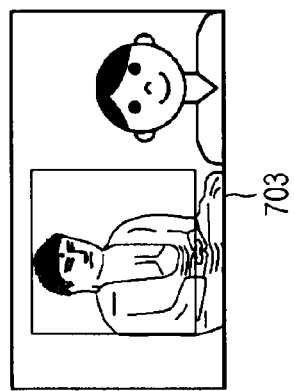
Figure 26:
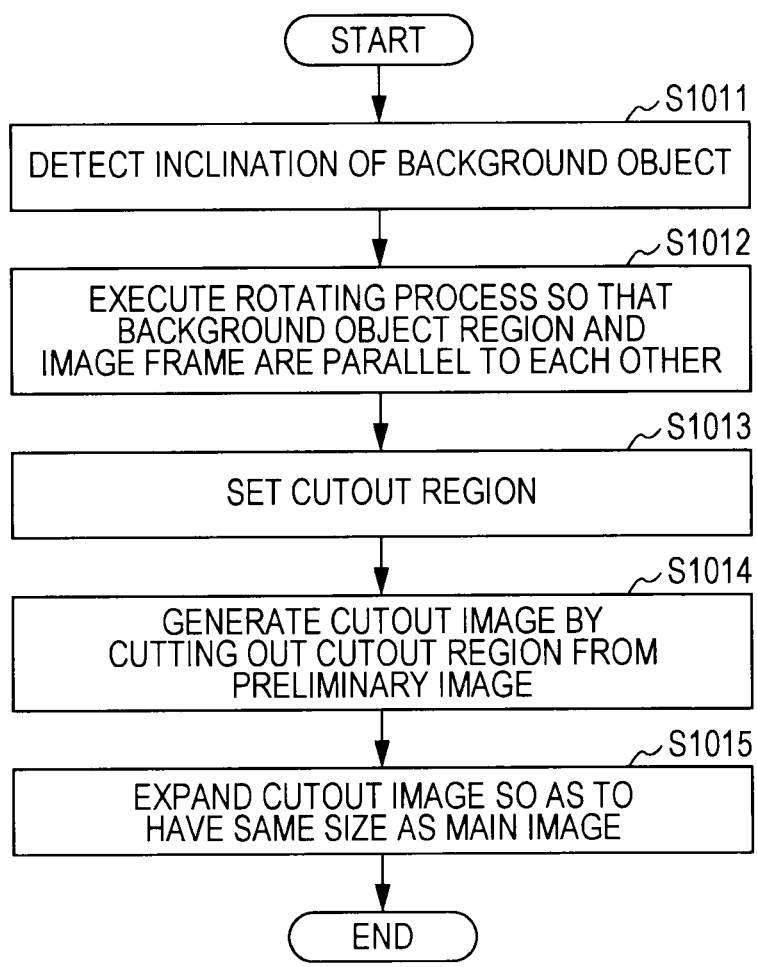
FIG. 26 is a flowchart illustrating the flow of the inclination correction process.

Next, in step S1013, the cutout region 702 is set such that the size of the cutout region 702 is the largest in the preliminary image 701 while excluding the blank portion from the preliminary image 701, as shown in FIG. 25C. Next, in step S1014, the cutout image 703 shown in FIG. 25D is generated by cutting out the set cutout region 702. In step S1015, the main image 800 shown in FIG. 25E is finally generated when the size of the cutout image 703 is expanded so as to have the same size as the main image.

In general, it is considered that the user executes the self-photographing, extending his or her hand and holding the imaging apparatus 1 with one hand. Accordingly, there is a concern that the imaging apparatus 1 may be inclined at the self-photographing time. On the other hand, since the user holds the imaging apparatus 1 with both hands, as in normal photographing, and designates the background object while viewing the through image, it is considered that it is easy to keep the imaging apparatus 1 horizontal at the time of designating the background object. In general, it is considered that the user keeps the imaging apparatus 1 substantially horizontal when the user designates the background object. Accordingly, it is considered that the background object region is suitable for a horizontal reference. Accordingly, in this embodiment, the rotation process is executed so that the background object region and the image frame are substantially parallel to each other. The reason for setting the background object as a rotation reference is that the user may incline the imaging apparatus 1 to photograph the user himself or herself to obtain an image in which the face of the user is obliquely shown.

2-3-3. Background Object Size Adjustment Process

Next, a background size adjustment process will be described. The background size adjustment process is a process of expanding the preliminary image so that the size of the background object designation frame in the setting of the background object condition indicated by the size information of the background object designation frame 302 matches with the size of the background object region in the preliminary image when the size of the background object designation frame is different from the size of the background object region. Thus, the size of the background object in the main image can be made to be substantially the same as the size in the setting of the background object condition. The background size adjustment process is executed by the expansion processing unit 44, the cutout region setting unit 41, and the image cutout unit 43.

The expansion processing unit 44 expands the preliminary image so that the size of the background object designation frame 302 in the setting of the background object condition is substantially the same as the size of the background object region in the preliminary image. The image expanded by the expansion processing unit 44 is referred to as an expanded image.

The cutout region setting unit 41 sets the cutout region with the same size as the main image in the expanded image. In the setting of the cutout region, for example, the coordinates of the center of the background object region in the preliminary image are identical with the coordinates of the center of the background object region in the cutout image. The image cutout unit 43 generates the main image by cutting out the cutout region from the preliminary image.

Figure 27A:
FIGS. 27A to 27D are diagrams illustrating a background object size adjustment process.
Figure 27D:
Figure 27B:

FIG. 27A shows the background object designation frame 302 in the setting of the background object condition. FIG. 27B shows the preliminary image 701 acquired through the imaging and the background object region 601 in the preliminary image 701. When FIGS. 27A and 27B are compared to each other, the background object region 601 in the preliminary image 701 is smaller than the background object designation frame 302 in the setting of the background object condition. This is because the distance between the background object and the imaging apparatus 1 is changed between the setting of the background object condition and the self-photographing.

Figure 27C:
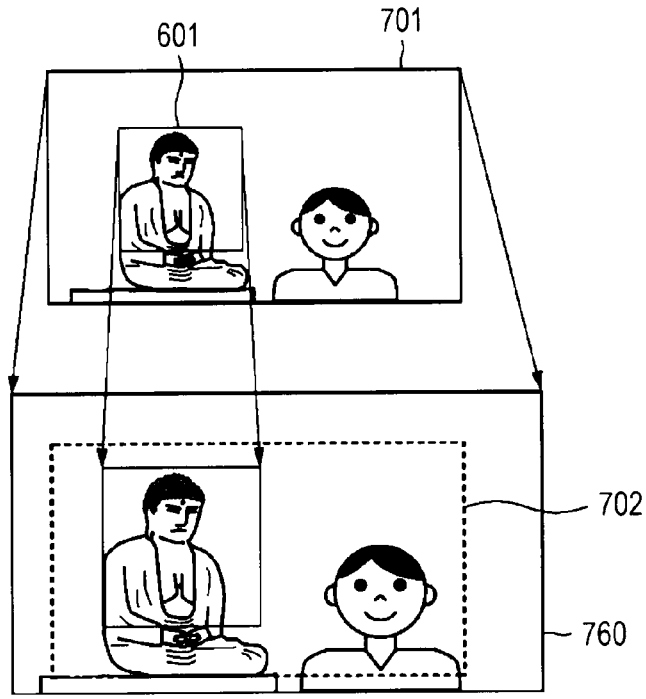
Figure 28:
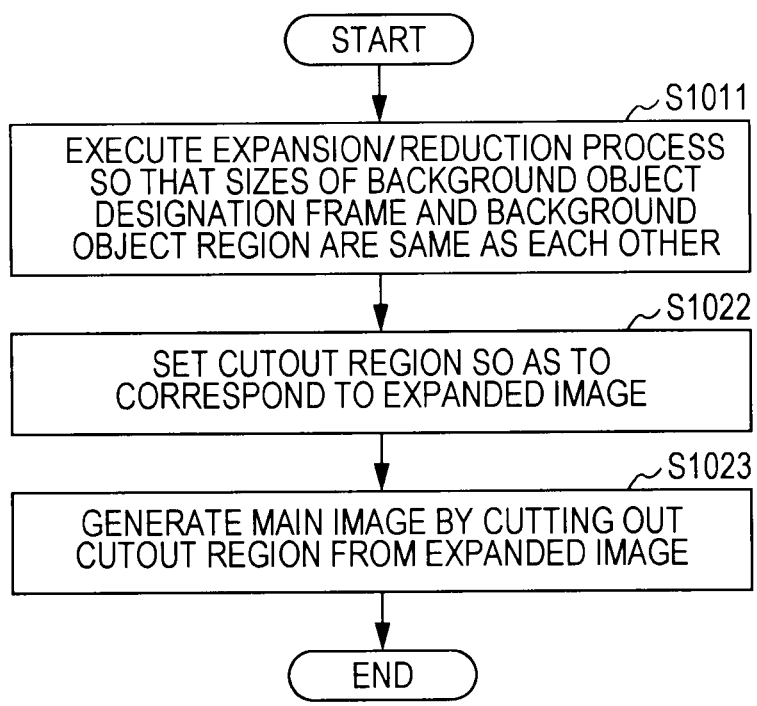
FIG. 28 is a flowchart illustrating the flow of the background object size adjustment process.

In step S1021, the preliminary image 701 is first expanded so that the size of the background object designation frame 302 in the setting of the background object condition is substantially the same as the size of the background object region 601 in the preliminary image 701, as shown in FIG. 27C. In this way, an expanded image 760 is generated. Next, in step S1022, a cutout region 702 is set in the expanded image 760, as shown in FIG. 27C. Then, in step S1023, a main image 800 shown in FIG. 27D is generated by cutting out the cutout region 702 from the expanded image 760.

It is considered that the user sometimes adjusts the background object designation frame 302 in consideration of not only the selection of a background object but also the size of the background object. However, when the user moves the position of his or her body or switches the imaging apparatus 1 from one hand to the other hand in the self-photographing, it is difficult to include the background in the image frame so that the size of the background object is substantially the same as that in the setting of the background object condition. Accordingly, by executing the background object size adjustment process, the size of the background object in the main image can be set to the size that the user desires.

2-3-4. Optimum Composition Adjustment Process

Next, an optimum composition adjustment process will be described. The optimum composition adjustment process is a process of generating a main image with an optimum composition causing the user to provoke a sense of beauty by dividing the main image by two horizontal lines and two vertical lines (hereinafter, referred to as division lines) and locating a face on the division lines or intersections between the division lines. Further, the main image with an optimum composition is generated by locating the centers of the face and the background object on the division lines or the intersections between the division lines. As the method of dividing the main image by the division lines, a golden ratio division method and a three-division method can be used. The optimum composition adjustment process is executed by the background object kind setting unit 47, the centroid calculating unit 48, the cutout region setting unit 41, the background object position determining unit 42, an image cutout unit 43, and the expansion processing unit 44.

The background object kind setting unit 47 determines whether the designated background object is "scenery" or "object" based on an input of the user or the like. The case where the background object is "scenery" means a case where scenery such as Mount Fuji is designated as a background object. Further, the case where the background object is "object" means a case where a doll, a decorative object, or a signboard is designated as a background object. Background object kind information set by the background object kind setting unit 47 is output to the centroid calculating unit 48 and the cutout region setting unit 41.

Figure 29A:
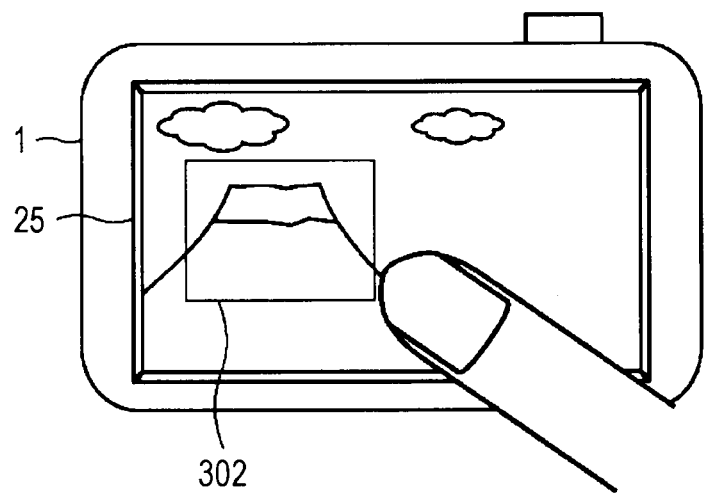
FIGS. 29A and 29B are diagrams illustrating an example of a background object kind designation screen displayed on the display unit.
Figure 29B:
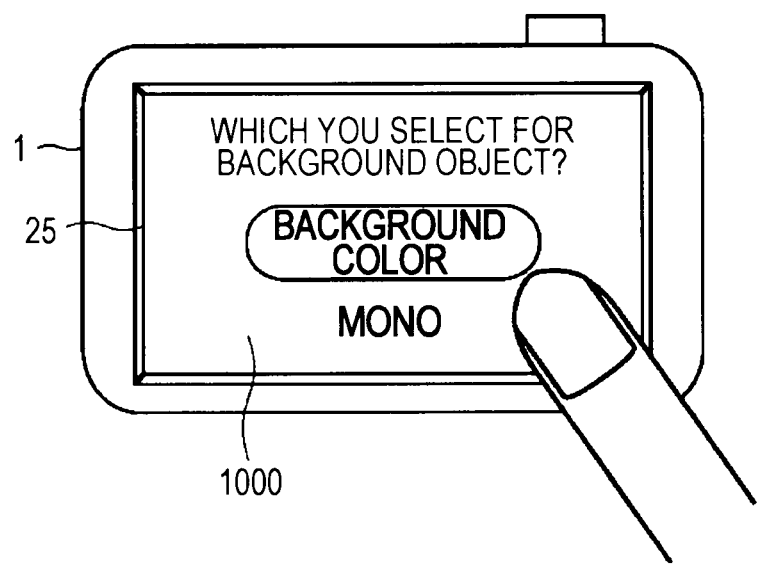

In this embodiment, when the "scenery" mode is selected for the background object, the process is executed to locate the face region on the division lines or the intersections of the division lines. On the other hand, when the "object" mode is selected for the background object, the process is executed to locate the face region and the center of the background object region on the division lines or the intersections of the division lines. For example, when the "scenery" mode or the "object" mode is selected for the background object, the user may select the mode of the background object by displaying a predetermined input screen 1000 shown in FIG. 29B on the monitor 25 after the input designation of the background object shown in FIG. 29A. The background object kind setting unit 47 sets the "scenery" mode or the "object" mode for the background object based on the input of the user.

For example, the centroid calculating unit 48 calculates the entire centroid between the face region and the background object region based on the coordinates of the center of the face region and the coordinates of the center of the background object. The centroid calculating unit 48 calculates the centroid when acquiring the background object kind information indicating that the "object" mode is set for the background object from the background object kind setting unit 47.

The cutout region setting unit 41 sets the cutout region in the preliminary image so that the face region is located on the division lines or the intersections of the division lines, when the background object kind information acquired from the background object kind setting unit 47 indicates the "scenery" mode for the background object. On the other hand, the cutout region setting unit 41 sets the cutout region in the preliminary image so that the centroid calculated by the centroid calculating unit 48 is located on the division lines or the intersections of the division lines, when the background object kind information indicates the "object" mode for the background object.

The background object position determining unit 42 determines whether the background object region is included in the cutout region based on the position and the size of the background object region indicated by the background object region information. The image cutout unit 43 generates the cutout region 703 by cutting out the cutout region 702 from the preliminary image. The expansion processing unit 44 generates the main image by expanding the cutout image.

Figure 30B:
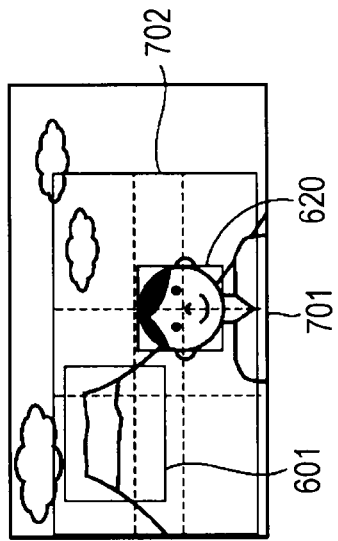
FIGS. 30A to 30D are diagrams illustrating an example of an optimum composition adjustment process.
Figure 30D:
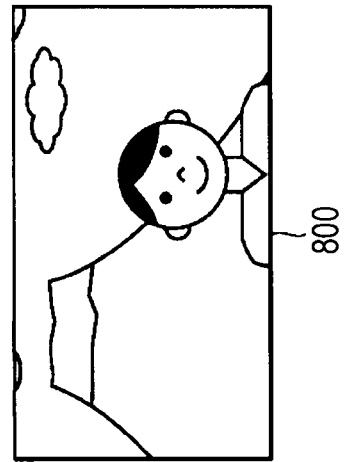

As an example, referring to FIGS. 30A to 31, a case will be described in which the main image is divided based on a golden ratio and a face is located at an intersection of the division lines. This case is a case where the "scenery" mode is selected for the background object.

Figure 30A:
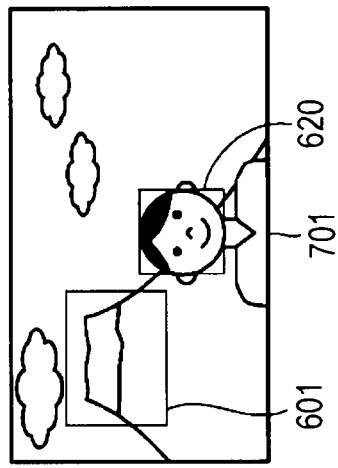
Figure 31:
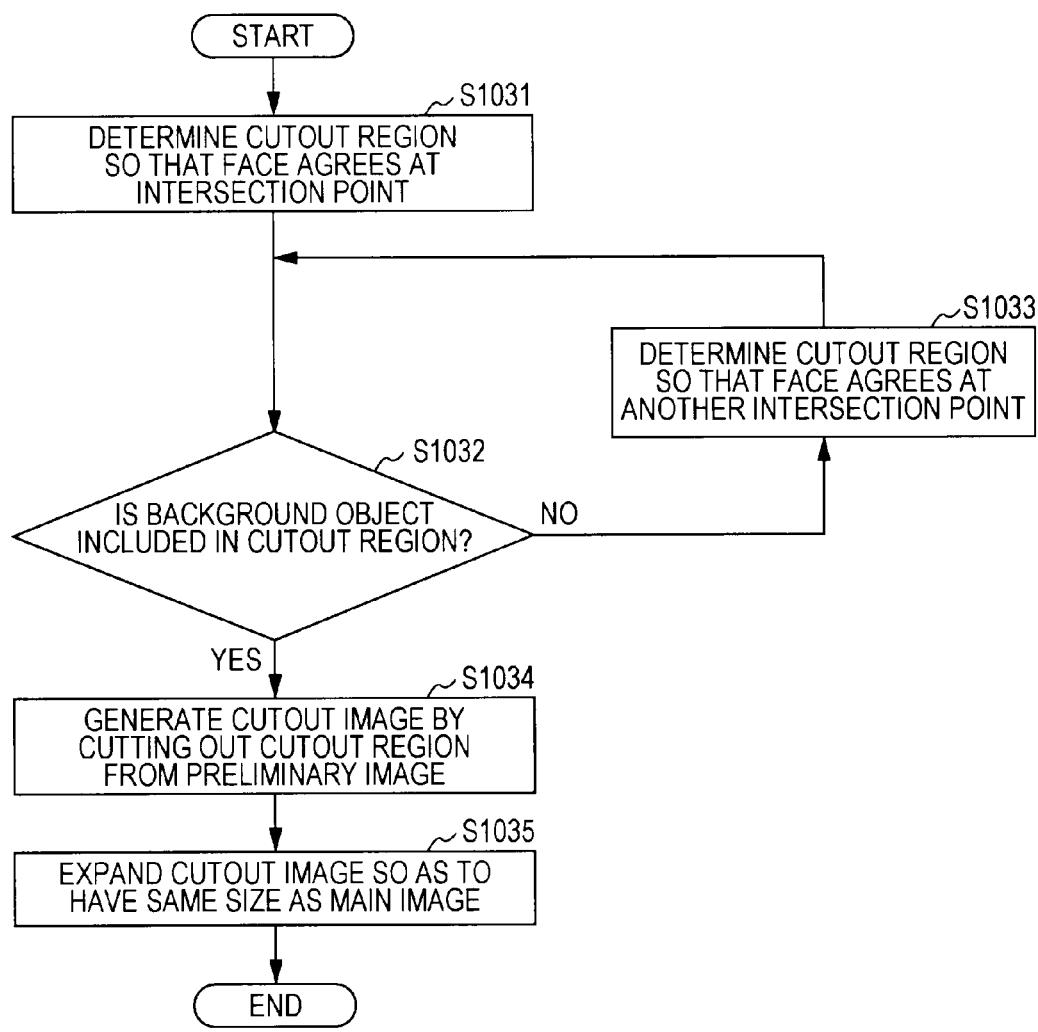
FIG. 31 is a flowchart illustrating the flow of the optimum composition adjustment process.

FIG. 30A shows a preliminary image 701 acquired through the self-photographing. Mount Fuji is designated as a background object of the "scenery" mode. In step S1031, the cutout region 702 is first set such that the cutout region 702 has the largest size in the preliminary image 701 and the face region 620 is located at an intersection of the division lines dividing the cutout region 702, as shown in FIG. 30B. The number of intersections of the division lines is four. The intersection at which the face is located among the four intersections can be determined based on various references. For example, the preliminary image 701 is divided based on a golden ratio and the face is located at the intersection closest to the face. When the face is inclined to the right, the face may be located at the intersection closest to the face between two intersections on the left side. When the face is inclined to the left side, the face may be located at the intersection closes to the face between two intersections on the right side.

Next, in step S1032, it is determined whether the background object region 601 is included in the cutout region 702. When it is determined that the background object region 601 is included in the cutout region 702, the process proceeds to step S1033 (No in step S1032). In step S1033, the cutout region 702 is determined so that the face is located at another intersection. Then, in step S1032, it is determined whether the background object region 601 is included in the cutout region 702. When it is determined that the background object region 601 is included in the cutout region 702, the process proceeds to step S1034 (Yes in step S1032).

Figure 30C:
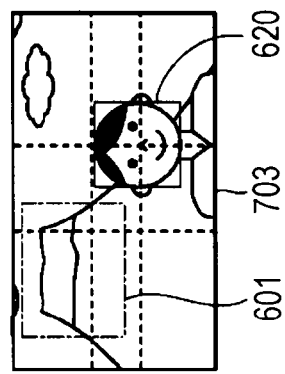

Next, in step S1034, a cutout region 703 shown in FIG. 30C is generated by cutting out the cutout region 702 from the preliminary image 701. Then, in step S1035, a main image 800 shown in FIG. 30D is generated by expanding the cutout region 703 so as to have the same size as the main image.

In the preliminary image 701 shown in FIG. 30A, the face of the user is located substantially at the middle, and thus a so-called rising sun flag composition considered generally to be undesirable is set. Accordingly, by executing the optimum composition adjustment process on the preliminary image 701, it is possible to easily generate the main image 800 with a composition based on a golden ratio, as shown in FIG. 30D.

When the face is located at a given intersection but the background object region 601 is not included in the cutout region 702, the face may be located near the intersection within the range in which the background object region 601 is included in the cutout region 702. The case has hitherto been described in which the face region 620 is located at the intersection of the division lines dividing the cutout region based on the golden ratio. However, the optimum composition adjustment process may be executed so that the face is located at an intersection of three division lines through the same method.

Figure 33:
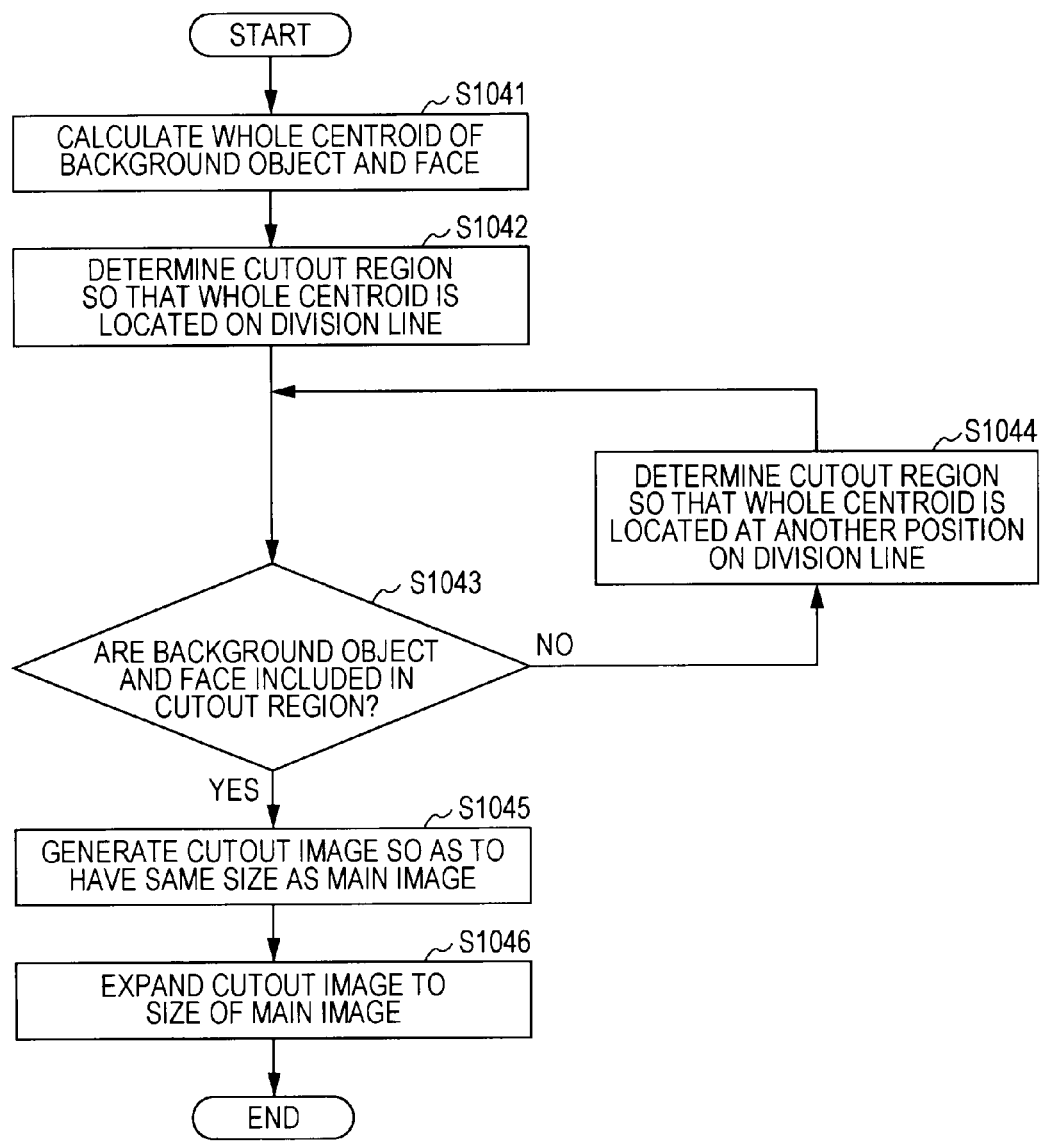
FIG. 33 is a flowchart illustrating another exemplary flow of the optimum composition adjustment process.

Next, as another example, an optimum composition adjustment process of dividing the image frame through a three-division method and arranging the background object and the whole centroid of the face on the division lines will be described with reference to FIGS. 32A to 33. As described above, the process of locating the whole centroid of the background object region and the face region on the division line or the intersection of the division lines is executed when the "object" mode is designated for the background object.

FIG. 32A shows a preliminary image 701 acquired through the self-photographing. A background object region 601 and a face region 620 are detected in the preliminary image 701. In step S1041, a whole centroid 630 of the background object region 601 and the face region 620 is first calculated. For example, the whole centroid 630 is calculated based on the coordinates of the center of the background object region 601 and the coordinates of the center of the face 620. Specifically, on the assumption that (Xb, Yb) is the coordinates of the center of the background object region 601 and (Xf, Yf) is the coordinates of the center of the face region 620, the coordinates (Xc, Yc) of the whole centroid can be calculated to Xc=(Xb+Xf)/2 and Yc=(Yb+Yf)/2. FIG. 32B shows the whole centroid 630 calculated in this way. The reason for calculating the whole centroid based on the coordinates of the center of the background object region is that it is considered that the user generally designates a background object by locating a subject that the user desires to designate as the background object substantially at the middle of the background object designation frame 302.

Next, in step S1042, a cutout region 702 is set such that the cutout region 702 has the largest size in the preliminary image 701 and the centroid is located on the division line dividing the cutout region 702, as shown in FIG. 32C. Next, in step S1043, it is determined whether the background object region 601 and the face region 620 are included in the cutout region 702. When it is determined that the background object region 601 and the face region 620 are not included in the cutout region 702, the process proceeds to step S1044 (No in step S1043).

Next, in step S1044, the cutout region 702 is determined so that the whole centroid 630 is located at another position on the division line. Then, in step S1043, it is determined whether the background object region 601 and the face region 620 are included in the cutout region 702. When it is determined that the background object region 601 and the face region 620 are included in the cutout region 702, the process proceeds to step S1045 (Yes in step S1043). Next, in step S1045, the cutout region 703 shown in FIG. 32D is generated by cutting out the cutout region 702 from the preliminary image 701. Then, in step S1046, a main image 800 shown in FIG. 32E is generated by expanding the cutout region 703 so as to have the same size as the main image. The main image has a composition based on three divisions, and thus the centroid of the background object and the face is located on the lower horizontal line.

2-3-5. Horizontal and Vertical Conversion Process

Next, a horizontal and vertical conversion process will be described. The horizontal and vertical conversion process is a process which is executed when the a face is located on the division line or at the intersection of the division lines in a horizontally long rectangular cutout region having a horizontal size longer than a vertical size and when the background object region is not included in the cutout region in the above-described optimum composition adjustment process. By rotating the cutout region by 90 degrees to set the cutout region having a vertically long rectangular shape in which the vertical size is longer than the horizontal size, the background object region can be included in the cutout region while locating the face on the division line or at the intersection of the division lines. The horizontal and vertical conversion process is executed by the centroid calculating unit 48, the cutout region setting unit 41, the background object position determining unit 42, and the image cutout unit 43, and the expansion processing unit 44.

Figure 34A:
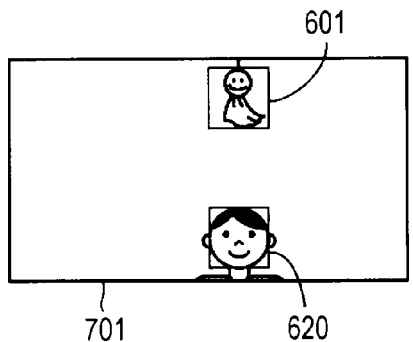
FIGS. 34A to 34F are diagrams illustrating a horizontal and vertical conversion process.

FIG. 34A shows a preliminary image 701 acquired through the self-photographing. A background object region 601 and a face region 620 are detected in the preliminary image 701. In step S1051, the centroid calculating unit 48 calculates a centroid 630 of the background object region 601 and the face region 620, as shown in FIG. 34B. A method of calculating the centroid 630 is the same as the above-described optimum composition adjustment process. Next, in step S1052, a cutout region 702A is determined such that the centroid 630 is located on a division line or at an intersection of the division lines dividing the cutout region 702 and the cutout region 702A has the largest size in the preliminary image 701. Next, in step S1053, it is determined whether the background object region 601 and the face region 620 are included in the cutout region 702A. When it is determined that the background object region 601 and the face region 620 are included in the cutout region 702A in step S1053, the process proceeds to step S1058 (Yes in step S1053).

In step S1058, a cutout image 703 is generated by cutting out the cutout region 702A from the preliminary image. In step S1059, a main image is generated by expanding the cutout region 703 so as to have the same size as the main image. The processes of step S1051 to step S1053, step S1058, and step S1059 are the same as the optimum composition adjustment process.

On the other hand, when it is determined that the background object region 601 and the face region 620 are not included in the cutout region 702A in step S1053, the process proceeds to step S1054 (No in step S1053). In FIG. 34C, the background object region 601 protrudes from the cutout region 702A. In this case, in step S1053, it is determined that the background object region 601 and the face region 620 are not included in the cutout region 702A.

Then, in step S1054, the cutout region is rotated by 90 degrees. That is, the cutout region is set to have a vertically long rectangular shape. Next, in step S1055, a cutout region 702B is determined such that the centroid 630 is located on the division line or at the intersection of the division lines and the cutout region 702B has the largest size in the preliminary image 701. Next, in step S1056, it is determined whether the background object region 601 and the face region 620 are not included in the cutout region 702B. When it is determined that the background object region 601 and the face region 620 are not included in the cutout region 702B in step S1056, the process proceeds to step S1057 (Yes in step S1056) and the cutout region 702B is set again.

Figure 34D:
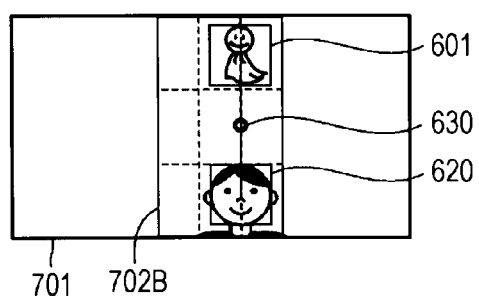
Figure 34B:
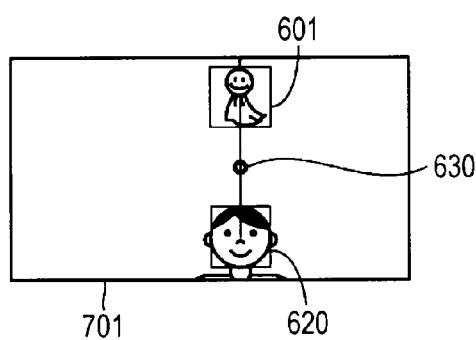

FIG. 34D shows the cutout region 702B having a vertically long rectangular shape by rotating the cutout region 702B by 90 degrees. Therefore, the centroid 630 can be located on the division line and the background object region 601 and the face region 620 can be included in the cutout region 702B.

Figure 34E:
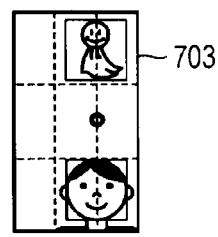
Figure 34C:
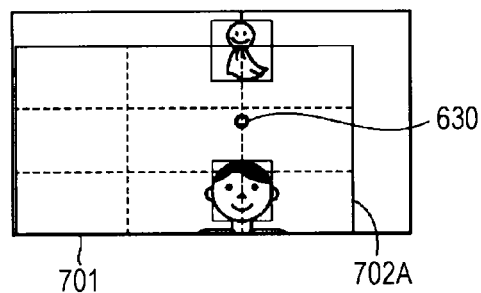
Figure 34F:
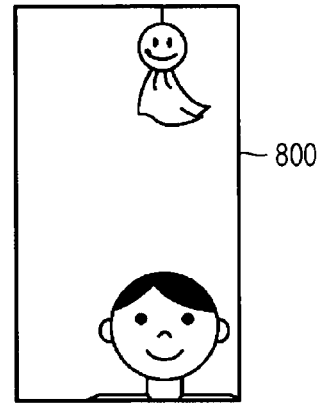

Next, in step S1058, a cutout image 703 shown in FIG. 34E is generated by cutting out the cutout region 702B from the preliminary image 701. Then, in step S1059, a main image 800 shown in FIG. 34F is generated by expanding the cutout image 703 so as to have the same size as the main image.

2-3-6. Face Direction Correspondence Adjustment Process

Next, a face direction correspondence adjustment process will be described. The face direction correspondence adjustment process is a process of generating a main image having an optimum composition by forming a space in the main image in accordance with the face direction of the user. The face direction correspondence adjustment process is executed by the face direction detecting unit 49, the background position determining unit 42, the cutout region setting unit 41, the image cutout unit 43, and the expansion processing unit 44.

The face direction detecting unit 49 detects a face direction in a preliminary image. For example, the detected face direction is a "right direction" or a "left direction." For example, both end positions and the center position (a line passing through the tip of a nose) of the face are detected in the preliminary image and the face direction is detected based on both end positions and the center position of the face by using an edge detection method or the like. Any other method may be used as long as the face direction can be detected. For example, a method of using the shape features of the face parts such as a neck, a nose, and a mouth can be used or a detection method of using a difference value between the luminance values of two points of a face to be detected can be used.

The background position determining unit 42 determines whether a background object is present in a direction the face detected by the face direction detecting unit 49 is oriented. This determination is executed by determining whether a background object region is present in the direction in which the face detected by the face direction detecting unit 49 is oriented, for example, with reference to the center of a face region by referring to the background object region information indicating the position, size, or the like of the background object region. The background position determining unit 42 determines whether the background object is included in the set cutout region. This determination is executed by referring to the background object region information indicating the position, size, or the like of the background object region. The image cutout unit 43 generates a cutout image by cutting out the cutout region from the preliminary image. The expansion processing unit 44 generates a main image by expanding the cutout image.

Figure 36A:
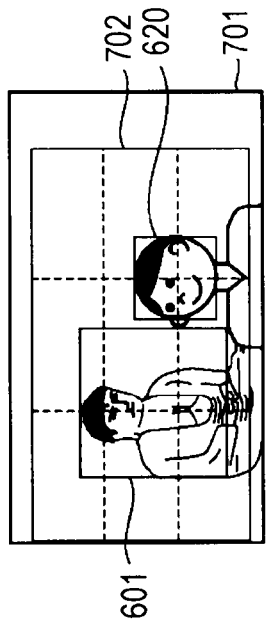
FIGS. 36A to 36D are diagrams illustrating a face direction correspondence adjustment process.

FIG. 36A shows a preliminary image 701 acquired through the self-photographing. A background object region 601 and a face region 620 are detected in the preliminary image 701. In step S1061, the face direction detecting unit 49 first detects the face direction. The face direction in the preliminary image 701 shown in FIG. 36A is a "left direction."

Next, in step S1062, it is determined whether the background object region 601 is present in the direction in which the face is oriented. When it is determined that the background object region 601 is not present in the direction in which the face is oriented as the determination result of step S1062, the process ends (No in step S1062). In this embodiment, only when the background object region 601 is present in the direction in which the face is oriented, the face direction correspondence adjustment process is executed.

On the other hand, when it is determined that the background object region 601 is present in the direction in which the face is oriented in step S1062, the process proceeds to step S1063 (Yes in step S1062). Then, in step S1063, the cutout region setting unit 41 determines a cutout region 702 such that the face region 620 is located at an intersection of the division lines dividing the cutout region 702 based on a three-division method and the cutout region 702 has the largest area in the preliminary image 701.

In this embodiment, when the face direction is the left direction, the cutout region 702 is determined so that the face region 620 is located at the intersection among four intersections of the division lines. On the other hand, when the face direction is the right direction, the cutout region 702 is determined so that the face region 620 is located at the left intersection among the four intersections of the division lines. In this way, the space can be formed in the direction in which the face is oriented by determining the cutout region 702 so that the face region 620 is located at the intersection of the division lines in the opposite direction to the direction in which the face is oriented. Accordingly, it is possible to generate a main image with a well-balanced composition.

Next, in step S1064, it is determined whether the background object region 601 is included in the cutout region 702. When it is determined that the background object region 601 is included in the cutout region 702 as the determination result of step S1064, the process proceeds to step S1065 (No in step S1064).

Next, in step S1065, the cutout region 702 is determined in the preliminary image 701 so that the face region 620 is located at another intersection of the division lines. Two intersections are present in the right and left division lines based on both the golden ratio division and the three-division method. Accordingly, for example, when the cutout region 702 is set such that the face is located at the upper intersection in step S1063, the cutout region 702 is set such that the face is located at the lower intersection in step S1065.

Figure 36B:
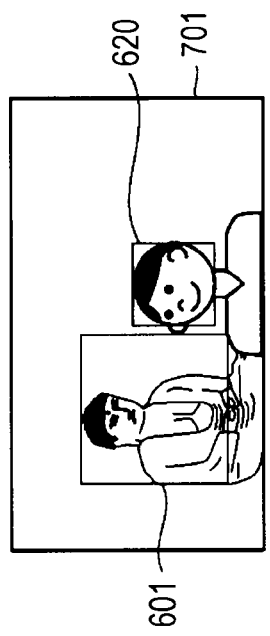

Then, in step S1064, it is determined again whether the background object region 601 is included in the cutout region 702. When it is determined that the background object region 601 is included in the cutout region 702 as the determination result of step S1064, the process proceeds to step S1066 (Yes in step S1064). FIG. 36B shows the cutout region 702 determined in this way. Since the face direction of the face shown in FIG. 36B is the "left direction", the cutout region 702 is determined so that the face is located at the right intersection. A three-division method is used as the division method. However, the golden ratio may be used for the division.

Figure 36C:
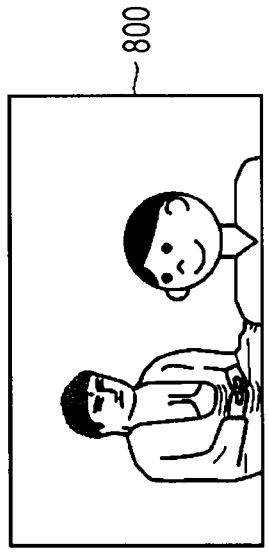
Figure 36D:
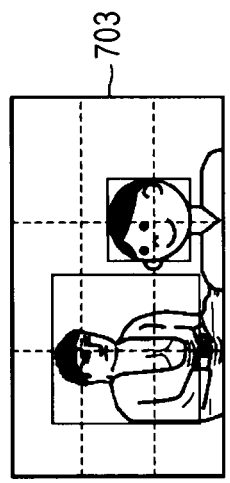

Next, in step S1066, the cutout region 703 shown in FIG. 36C is generated by cutting out the cutout region 702 from the preliminary image. Then, in step S1067, a main image 800 shown in FIG. 31D is generated by expanding the cutout region 703 so as to have the same size as the main image. Since the face direction is the left direction, the main image has a composition in which the face is located at the right intersection and a space is formed on the left side.

2-3-7. Expansion Process Based on Golden Ratio

Next, an expansion process based on a golden ratio will be described. The expansion process based on the golden ratio is a process of generating a main image in which a ratio between the length of a face region detected as the face of the user and a distance from the lower end of the face region to the lower end of the image frame of the main image is the golden ratio. The expansion process based on the golden ratio is executed by the cutout region setting unit 41, the image cutout unit 43, and the expansion processing unit 44.

Figure 38B:
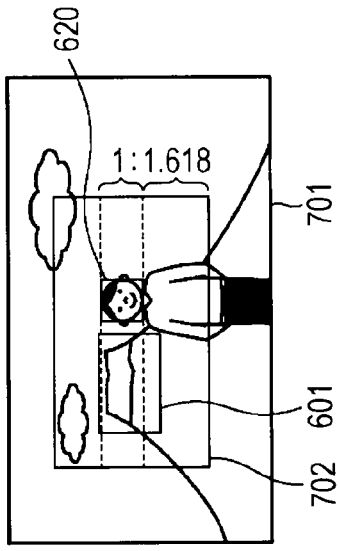
FIGS. 38A to 38D are diagrams illustrating an expansion process based on the golden ratio.
Figure 38D:
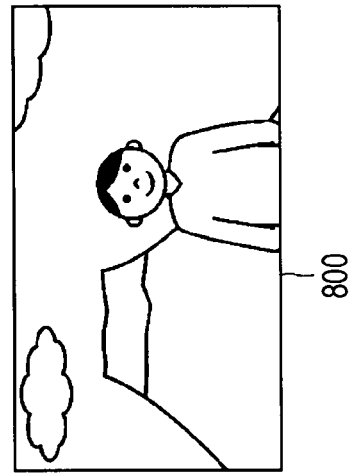
Figure 38A:
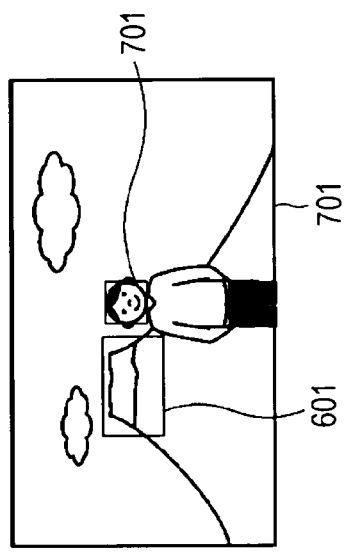

FIG. 38A shows a preliminary image 701 generated through the self-photographing. In the preliminary image 701, the summit of Mount Fuji is detected as a background object region 601. The face of the user is detected as a face region 620. In step S1071, the length of the face region is first acquired in the preliminary image 701. The length of the face region can be acquired by referring to the face region information which is stored in association with the face region at the time of generating the preliminary image and indicates the size of the face region.

Figure 38C:
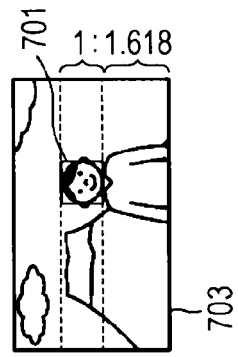
Figure 39:
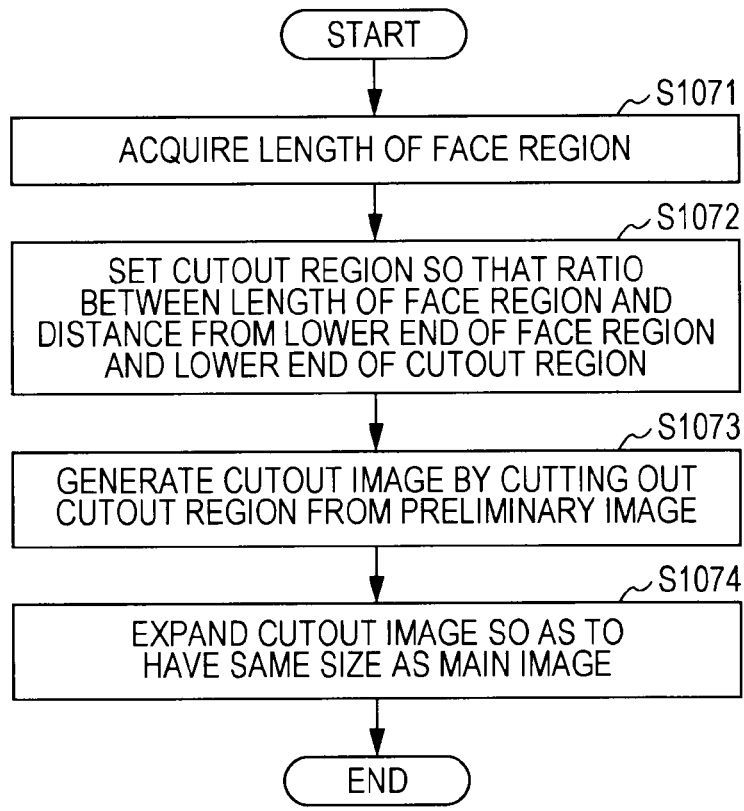
FIG. 39 is a flowchart illustrating the flow of the expansion process based on the golden ratio.

In step S1072, a cutout region 702 is set such that the background object region 601 is included in the cutout region 702 and the ratio between the length of the face region 620 and the distance between the lower end of the face region 620 to the lower end of the cutout region 702 is a golden ratio (1:1.618), as shown in FIG. 38B. Next, in step S1073, a cutout image 703 shown in FIG. 38C is generated by cutting out the cutout region 702 from the preliminary image 701. In the cutout image 703, the ratio between the length of the face region 620 and the distance from the lower end of the face region 620 to the lower end of the cutout image 703 is the golden ratio. Then, in step S1074, a main image 800 shown in FIG. 38D is generated by expanding the cutout image 703 so as to have the same size as the main image.

In the expansion process based on the golden ratio, it is considered that the body of the user is located from the lower end of the face region 620 to the lower end (that is, below the face region 620) of the main image 800. The ratio between the face and the body becomes the golden ratio by executing the expansion process so that the ratio between the length of the face region 620 and the distance from the lower end of the face region 620 to the lower end of the main image 800 is the golden ratio, as shown in the main image 800 shown in FIG. 38D. In this way, it is possible to generate the main image with the composition provoking a sense of beauty.

The above-described various processes of the image processing may not be all executed, but only one or a plurality of processes may be executed. Further, when the plurality of processes of the image processing are executed, the processes may be executed in any order.

3. SECOND EMBODIMENT

3-1. Configurations of Image Processing Apparatus and Imaging Apparatus

Figure 40:
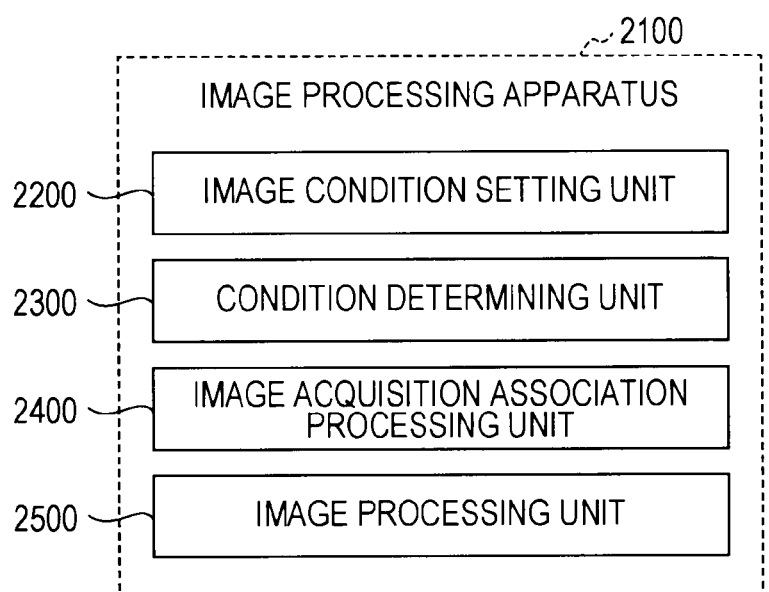
FIG. 40 is a block diagram illustrating the configuration of an image processing apparatus according to a second embodiment of the present technology.
Figure 41:
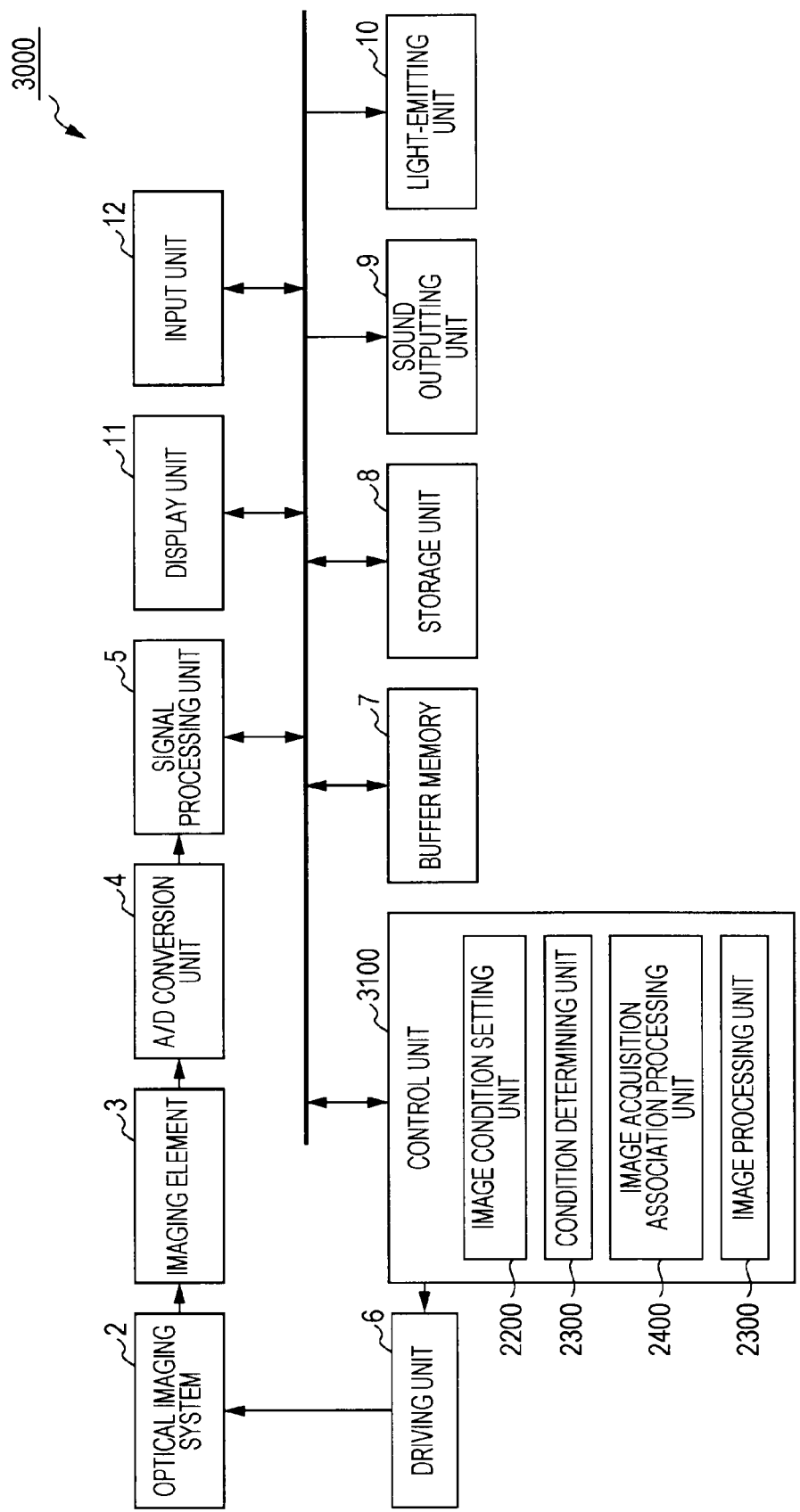
FIG. 41 is a block diagram illustrating the configuration of the imaging apparatus.

Next, a second embodiment of the present technology will be described. FIG. 40 is a block diagram illustrating the configuration of an image processing apparatus 2100 according to the second embodiment. The image processing apparatus 2100 includes an image condition setting unit 2200, a condition determining unit 2300, an image acquisition association processing unit 2400, and an image processing unit 2500. FIG. 41 is a block diagram illustrating the configuration of an imaging apparatus 3000 having the functions of the image processing apparatus 2100.

The imaging apparatus 3000 according to the second embodiment is different from the imaging apparatus of the first embodiment in that a control unit 3100 includes the image condition setting unit 2200, the condition determining unit 2300, the image acquisition association processing unit 2400, and the image processing unit 2500. Since the remaining configuration of the imaging apparatus 3000 is the same as that in the first embodiment, the description thereof will not be repeated.

In the second embodiment, a "preliminary image" is an image which is stored when an image satisfies a condition (hereinafter, referred to as a preliminary composition condition) for a preliminary image before the image processing is executed. A "main image" is an image which is finally obtained by executing the image processing on the preliminary image so that a condition (hereinafter, referred to as a main composition condition) for a main image is satisfied.

The image condition setting unit 2200 sets the main composition condition and the preliminary composition condition. The image condition setting unit 2200 sets the main composition condition based on the position of a primary subject input on the main image condition screen displayed on the monitor 25 by the user, as shown in FIGS. 11A to 12C. Accordingly, the main composition condition indicates the position or the like of the primary subject that the user finally desires.

The main composition condition is set by an X value and a Y value indicating the position (the centroid position of a region determined as the primary subject) of the primary subject when it is assumed that the horizontal direction is the X direction (0 to 100) as a parameter and the vertical direction is the Y direction (0 to 100) as a parameter by setting the upper left of the image frame as a reference. For example, "X=65 and Y=50" or the like is set. The main composition condition may be set so as to have a predetermined width such as "63≤X≤67 and 48≤Y≤52." The range of the parameter is not limited to the values of 0 to 100, but may be set so as to have the larger values or have the smaller values.

Further, a "primary subject" is a subject which the user considers to be valuable and thus the user wants to obtain. The primary subject may be any object as long as the subject can be detected from the inside of the image other than the face of a person by a predetermined detection algorithm. For example, the primary subject is a human body part such as a hand or the like of a person, a whole body, or an object such as an animal, an architectural structure, an automobile, a flower, or a mount. Further, the number of primary subjects may be one or plural.

Not only the position of the primary subject but also the size of the primary subject may be set as the main composition condition. For example, as shown in FIG. 12C, the size of the primary subject can be input within the designation frame of the primary subject and the size of the primary subject designation frame can be changed in accordance with an input value.

Figure 42A:
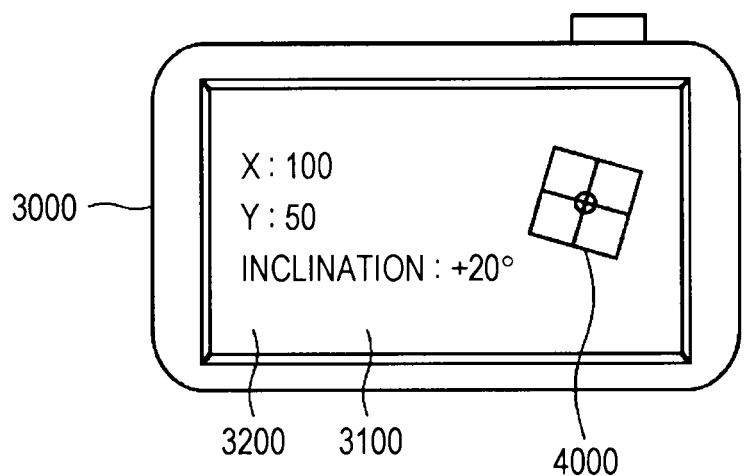
FIGS. 42A and 42B are diagrams illustrating the display of a monitor of the imaging apparatus.
Figure 42B:
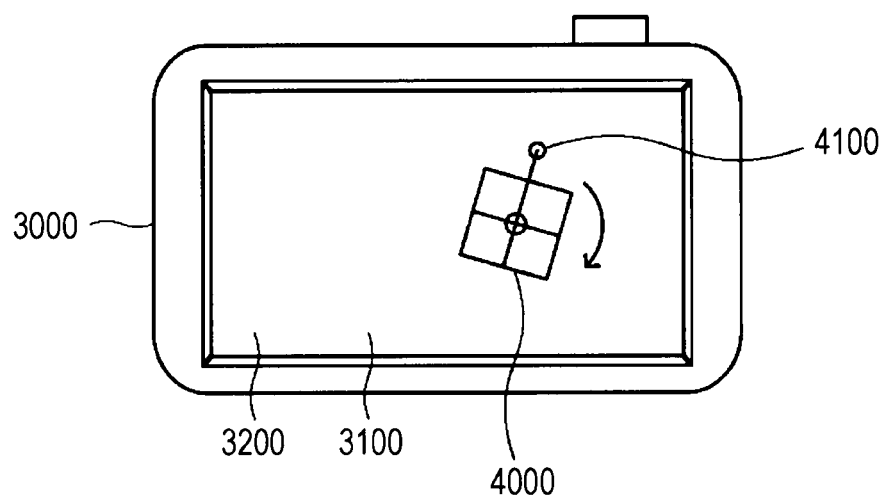

Further, the inclination of the primary subject with respect to the image frame may be set as the main composition condition. As a method of inputting the inclination of the subject by the user, for example, as shown in FIG. 42A, the value of the inclination may be input and a primary subject designation frame 4000 may be rotated in accordance with the value. As shown in FIG. 42B, not only the primary subject designation range 4000 and a rotation handle 4100 configured to operate the rotation of the primary subject designation range 4000 are displayed on a monitor 3200 including a touch panel 3100. Then, the user may input the inclination of the subject by touching the touch panel 3100 to operate the rotation handle 4100.

When the display unit 11 is a monitor including a touch panel, the direction of a finger of a user touching the touch panel may be detected and the direction of the primary subject may be matched with the direction of the finger. Further, the user may input the inclination of the primary subject by executing a so-called multi-touch operation with two or more fingers to rotate the primary subject designation frame. Furthermore, the imaging apparatus 3000 may include an acceleration sensor. The inclination of the primary subject may be input by tilting the imaging apparatus 3000.

An optimum composition may be obtained in accordance with the position, size, direction, and the like of the primary subject detected from an image obtained through the imaging of the imaging unit and the optimum composition may be set as the main composition condition. As a method of obtaining the optimum composition in accordance with the position, size, direction, and the like of the primary subject, for example, a method disclosed in Japanese Unexamined Patent Application Publication No. 2011-29831 or Japanese Unexamined Patent Application Publication No. 2009-100300 may be used.

Further, the "position of a background object" may be set as the main composition condition. When the position of the background object is designated by the same method as the method of designating the position of the primary subject, the image condition setting unit 2200 sets the main composition condition based on the position of the background object.

As the method of designating the background object as the main composition condition, for example, the method described with reference to FIGS. 8A to 8C in the first embodiment can be used in which the user touches the operation surface of the touch panel 26 corresponding to an arbitrary position in the background displayed as the through image 301 with his or her finger, and then the background object is designated by the displayed background object designation frame 302 centering the touch position of the finger.

The background object designation frame 302 can be changed in position, shape, and size. For example, the position of the background object designation frame 302 can be changed by executing a drag operation when the user touches the inside of the background object designation frame 302 with his or her finger. The size of the background object designation frame 302 can be changed by expanding the background object designation frame 302 in a direction of the vicinity thereof by executing a drag operation when the user touches one of the sides of the background object designation frame 302. The size of the background object designation frame 302 can be enlarged or reduced by executing a pinch-out operation or a pin-in operation when the user touches the background object designation frame 302 with two fingers. In this way, the user can execute various operations to accurately designate the background object by arbitrarily adjusting the position, shape, and size of the background object designation frame 302.

The background object may be designated by inputting a value indicating the position of the background object, as in the input of the primary subject. The main composition condition for the background object may be set by the coordinates or may be set as a range of a predetermined area.

The image condition setting unit 2200 determines a preliminary composition condition based on the main composition condition. The preliminary composition condition is set as a condition looser than the main composition condition.

For example, when the main composition condition is set to the position "X=65 and Y=50" of the primary subject, the preliminary composition condition is set to the value of a predetermined width so as to include the main composition condition, like the position "60≤V≤70 and 45≤Y≤55" of the primary subject. As described in detail later, when an image obtained through imaging satisfies the preliminary composition condition, the captured image is acquired as the preliminary image through the process of the image acquisition association processing unit 2400. Accordingly, the preliminary can be easily acquired by setting the preliminary composition condition as the condition looser than the main composition condition, as described above.

The range of the above-described preliminary composition condition is just an example given to facilitate the description thereof. The range of the above-described preliminary composition condition is not limited to the value. When the main composition condition is "X=65 and Y=50", the width of the preliminary composition condition such as "55≤X≤75 and 40≤Y≤50" may be increased. Alternatively, the width of the preliminary composition condition such as "62≤X≤67 and 48≤Y≤52" may be increased.

For example, when the composition condition is set to have a predetermined width such as "63≤X≤67 and 48≤Y≤52", the preliminary composition condition may be set to the value of a predetermined width such as "60≤X≤70 and 45≤Y≤55" so as to include the main composition condition.

The preliminary composition condition may not necessarily be set as the range centering the value as the main composition condition. For example, when "X=0 and Y=50" is set, the X value of the preliminary composition condition may be set to the upper limit value such as "X≤10" or to the lower limit value.

When the inclusion of the background object in a predetermined range is set as the main composition condition, inclusion of the background object in a range larger than the predetermined range is set as the preliminary composition condition. Thus, since it is not necessary to accurately match the background object at a target position in imaging, the imaging can be easily be executed.

The preliminary composition condition may be set based on a predetermined template prepared in advance. Alternatively, the preliminary composition condition may be set to have a width of values including the main composition condition of the preliminary composition condition and may be automatically set based on the width.

The preliminary composition condition may be set as a condition looser than the main composition condition by setting the preliminary composition condition less than the main composition condition. For example, when the main composition condition include not only the position of the primary subject but also the size and the inclination of the primary subject, the preliminary composition condition may include only the position of the primary subject, only the inclination of the primary subject, or only the size and the inclination of the primary subject. Further, the preliminary composition condition may be set by excluding the condition for the background object of the main composition condition.

The condition determining unit 2300 determines whether the captured image obtained through the imaging satisfies the preliminary composition condition. The determination result of the condition determining unit 2300 is supplied to the image acquisition association processing unit 2400.

The image acquisition association processing unit 2400 executes a process associated with the acquisition of the preliminary image. The image acquisition association processing unit 2400 corresponds to a processing unit of claims. When the preliminary image is acquired, the imaging apparatus 3000 can automatically acquire the preliminary image (so-called auto-release) or the user can manually obtain the preliminary image (so-called manual release).

In a case of the auto-release, the image acquisition association processing unit 2400 stores the captured image as the preliminary image in the buffer memory 7 or the storage unit 8, when the condition determining unit 2300 determines that the captured image satisfies the preliminary composition condition. Further, the image stored when the condition determining unit 2300 determines the captured image satisfies the preliminary composition condition may be the captured image itself determined to satisfy the preliminary composition condition or may be a frame image acquired in a predetermined period before and after the captured image determined to satisfy the preliminary composition condition. When the image acquisition association processing unit 2400 executes the process, the preliminary image is automatically acquired based on the determination result of the condition determining unit 2300.

On the other hand, in a case of the manual release, the image acquisition association processing unit 2400 notifies the user that the user executes a shutter operation at a timing at which the condition determining unit 2300 determines that the captured image satisfies the preliminary composition condition. The user can be notified, for example, by emitting light from an LED or outputting a sound when the imaging apparatus 3000 includes the LED or/and a speaker, as shown in FIGS. 20A to 20C. When the user executes a release operation after the notification, the captured image is stored as a preliminary image in the buffer memory 7 or the storage unit 8.

The user executes the shutter operation after the notification, but the image acquisition association processing unit 2400 may invalidate the shutter operation so that the preliminary image is not acquired, when the condition determining unit 2300 determines that the captured image does not satisfy the preliminary composition condition at the time of executing the shutter operation. To execute this process, it is necessary for the condition determining unit 2300 to determine whether the preliminary composition condition is satisfied once until the image acquisition association processing unit 2400 acquires the preliminary image, even after the condition determining unit 2300 to determine that the preliminary composition condition is satisfied. When the preliminary image is not acquired, the user may be notified of the fact that the preliminary is not acquired, for example, by emitting light from an LED or outputting a sound.

The image processing unit 2500 generates a main image by executing image processing, such as a trimming process, on the preliminary image based on the main composition condition. The image processing described in the first embodiment may be executed as the image processing executed to generate the main image.

Figure 43C:
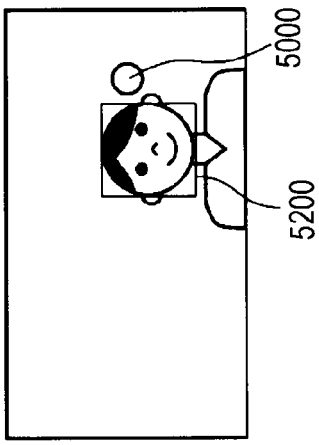
FIGS. 43A to 43F are diagrams illustrating a trimming process.
Figure 43F:
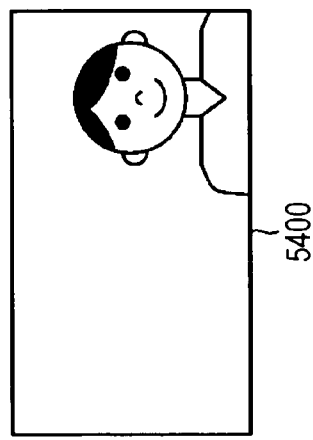
Figure 43B:
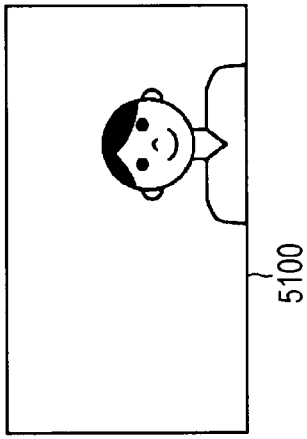
Figure 43E:
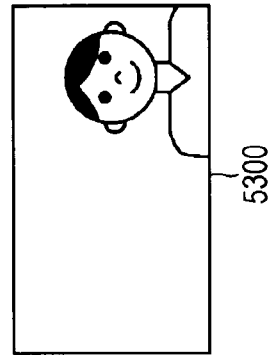
Figure 43A:
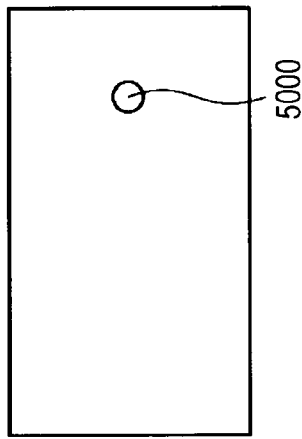

A trimming process of matching the position of the primary subject to the position of the main composition condition is executed, for example, as shown in FIGS. 43A to 43F. FIG. 43A shows a position 5000 of the primary subject that the user desires as the main composition condition designated by the user. FIG. 43B shows a preliminary image 5100 acquired when the preliminary composition condition is satisfied. FIG. 43C shows a case where the main composition condition overlaps the preliminary image 5100. As shown in FIG. 43C, the position 5000 of the primary subject as the main composition condition is deviated from a face 5200 as the primary subject.

Figure 43D:
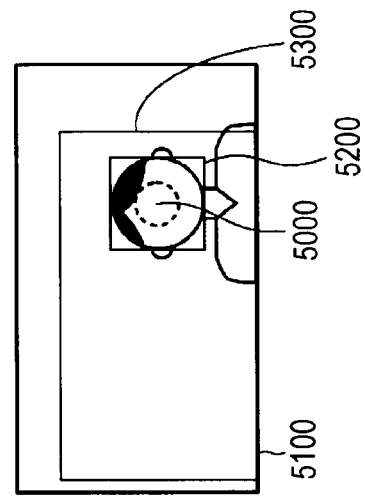

In the preliminary image 5100, a trimming range 5300 is determined so that the position 5000 of the primary subject as the main composition condition matches with the face 5200, as shown in FIG. 43D. The aspect ratio of the trimming range 5300 is identical with the aspect ratio of the preliminary image 5100. When the preliminary image 5100 is cut as the trimming range 5300, the trimming range 5300 is shown in FIG. 43E. Then, when the cut trimming range 5300 is expanded so as to have the same size as the preliminary image 5100, as shown in FIG. 43F, a main image 5400 in which the face matches with the main composition condition can be generated.

A main image located at the position at which the background object is designated by the user can be generated by the same method.

The process of matching the size of the primary subject to the main composition condition can be realized by executing the same process as the background object size adjustment process described in the first embodiment on the primary subject.

The process of matching the inclination of the primary subject with respect to the image frame can be realized by executing the inclination correction process described in the first embodiment.

When not only the position of the primary subject but also the size and the inclination of the primary subject are set as the main composition condition, the main image may be generated by executing the plurality of processes of the above-described image processing.

3-2. Processes of Imaging Processing Apparatus

Figure 44:
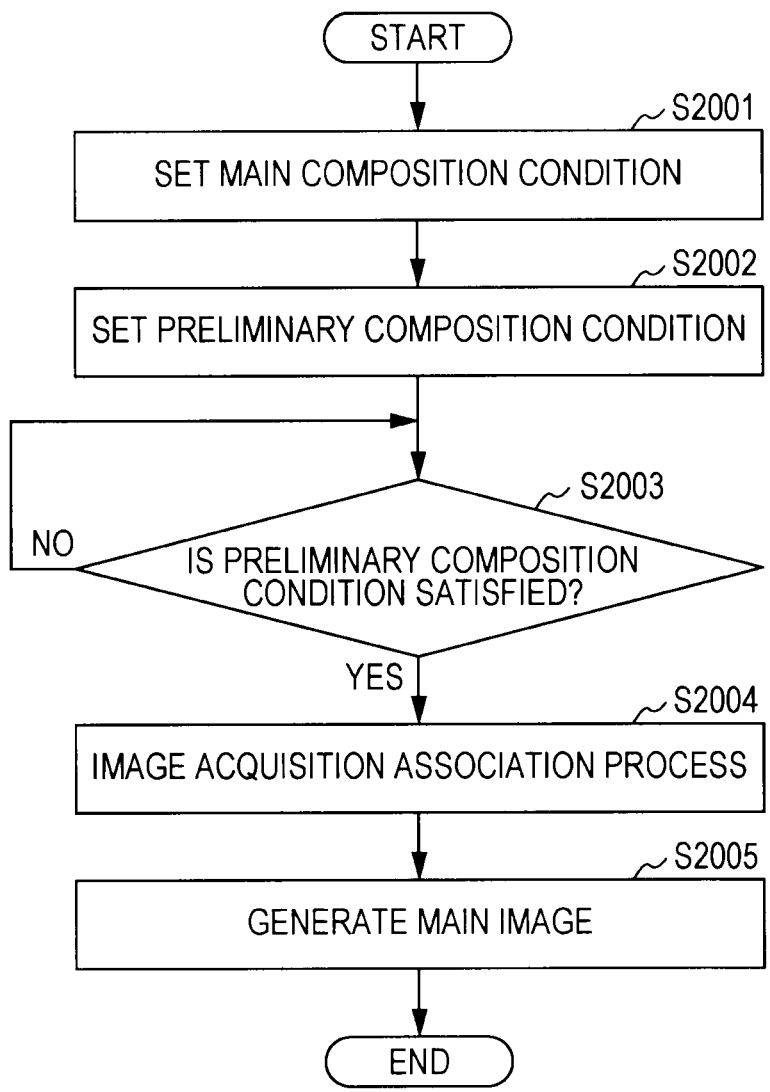
FIG. 44 is a flowchart illustrating the flow of processes executed by an imaging processing apparatus.

Next, processes of the second embodiment will be described with reference to the flowchart of FIG. 44. In step S2001, the image condition setting unit 2200 first sets the main composition condition. As described above, the main composition condition set based on the input of the user or the like. Next, in step S2002, the image condition setting unit 2200 sets the preliminary composition condition based on the main composition condition. The set main composition condition is supplied to the image processing unit 2500 and the preliminary composition condition is supplied to the condition determining unit 2300.

Next, in step S2003, the condition determining unit 2300 determines whether the captured image satisfies the preliminary composition condition. When the preliminary composition condition is not satisfied, the determination of step S2003 is repeated until the preliminary composition condition is satisfied (No in step S2003). Further, when the captured image does not satisfy the preliminary composition condition, as described above, the user may be notified of a guide notification, for example, by emitting light from an LED or outputting a sound.

When it is determined that the captured image satisfies the preliminary composition condition in step S2003, the process proceeds to step S2004 (Yes in step S2003). Then, in step S2004, the image acquisition association processing unit 2400 executes an image acquisition association process. The image acquisition association process is a process of acquiring the preliminary image by storing the captured image as the preliminary image in the storage unit 8 or the like in the case of the auto-release. Further, in the case of the manual release, the image acquisition association process is a process of prompting the user to acquire the preliminary image by a notification and a process of acquiring the captured image as the preliminary image in the storage unit 8 or the like when the user executes the release operation.

After the preliminary image is acquired, the image processing unit 2500 generates a main image in step S2005 by processing the preliminary image so that the main composition condition is satisfied.

In this way, the image processing apparatus 2100 according to this embodiment executes the processes. In this embodiment, the image is acquired when the preliminary composition condition looser than the main composition condition as the condition for the final image is satisfied. Therefore, the user may not execute the imaging so as to accurately match the main composition condition. Therefore, the user can easily execute the imaging. Further, since the preliminary image acquired through the imaging finally matches the main composition condition through the image processing, the user can obtain the image with the desired composition.

This embodiment can be applied to "self-photographing" in which the user faces the lens of the imaging apparatus 3000 toward the user himself or herself to image the user as a subject. In this case, a primary subject is the face, bust shot, the whole body of the user himself or herself. In the self-photographing, the user may not generally execute imaging while viewing the through image. However, when this embodiment is applied, the user can obtain an image in which the user himself or herself is included in a desired composition and the main composition condition is satisfied, even when the user does not view the through image. Further, since the preliminary composition condition is set to be looser than the main composition condition, the user can acquire the image in which the preliminary composition condition is satisfied even when the user does not view the through image.

This embodiment is not limited to the self-photographing. A considerable effect can be obtained even when the user may not view a through image. For example, as such imaging, so-called high-angle imaging can be executed in which the user extends his or her arm and raises the imaging apparatus 3000 to image a subject. Further, so-called low-angle imaging can be executed in which the user remains the imaging apparatus 3000 at a low position such as his or her feet to image a subject. In the imaging, even in a case where the user may not view a through image, the user can obtain a main image in which the main composition condition is satisfied when not viewing the through image. Further, since the preliminary composition condition is set to be looser than the main composition condition, the user can easily obtain an image in which the preliminary composition condition is satisfied even when the user does not view a through image.

The embodiments of the present technology may be realized as follows.

(1) An image processing apparatus generates a main image as an image satisfying a main composition condition indicating a condition regarding a predetermined composition. The image processing apparatus includes: a condition determining unit that determines whether a captured image obtained through imaging of an imaging unit satisfies a preliminary composition condition which is based on the main composition condition; a processing unit that executes a process of obtaining a preliminary image as an image satisfying the preliminary composition condition in accordance with the determination result of the condition determining unit; and an image processing unit that generates the main image by processing the preliminary image obtained through the process based on the main composition condition.

(2) In the image processing apparatus described in (1), the preliminary composition condition is simpler than the main composition condition.

(3) In the image processing apparatus described in (1) or (2), the process is a process of storing the captured image as the preliminary image when the condition determining unit determines that the preliminary composition condition is satisfied.

(4) In the image processing apparatus described in any one of (1) to (3), a range of a parameter set as the preliminary composition condition is larger than a range of a parameter set as the main composition condition.

(5) In the image processing apparatus described in any one of (1) to (4), the number of conditions set as the main composition condition is greater than the number of conditions set as the preliminary composition condition.

(6) In the image processing apparatus described in any one of (1) to (5), the main composition condition is a condition in which a predetermined condition is added to the preliminary image condition.

(7) In the image processing apparatus described in any one of (1) to (6), the main composition condition includes inclusion of a subject in a first range as a condition and the preliminary composition condition includes inclusion of the subject in a second range larger than the first range as a condition.

(8) In the image processing apparatus described in any one of (1) to (7), the main composition condition includes inclusion of a background object in a third range as a condition and the preliminary composition condition includes inclusion of the background object in a fourth range larger than the third range as a condition.

(9) In the image processing apparatus described in any one of (1) to (8), the main composition condition is a condition to which a condition of including the background object in the main image is added.

(10) In the image processing apparatus described in any one of (1) to (9), the process is a process of notifying a user that the preliminary condition is satisfied, when the condition determining unit determines that the preliminary condition is satisfied.

(11) In the image processing apparatus described in any one of (1) to (10), the image processing unit executes a trimming process on the preliminary image so that a position of a subject satisfies the main composition condition, when the position of the subject is set as the main composition condition.

(12) An image processing method of generating a main image as an image satisfying a main composition condition indicating a regarding a predetermined composition includes: determining whether a captured image obtained through imaging of an imaging unit satisfies a preliminary composition condition which is based on the main composition condition; executing a process of obtaining a preliminary image as an image satisfying the preliminary composition condition in accordance with the determination result; and generating the main image by processing the preliminary image obtained through the process based on the main composition condition.

(13) An image processing program causes a computer to execute an image processing method of generating a main image as an image satisfying a main composition condition indicating a condition regarding a predetermined composition, the image processing method including determining whether a captured image obtained through imaging of an imaging unit satisfies a preliminary composition condition which is based on the main composition condition, executing a process of obtaining a preliminary image as an image satisfying the preliminary composition condition in accordance with the determination result, and generating the main image by processing the preliminary image obtained through the process based on the main composition condition.

(14) An imaging apparatus includes: a lens that is installed on one surface of a casing; an imaging element that receives light via the lens and converts the light into an image signal; and a display unit that is installed on the other surface on the rear side of the one surface of the casing on which the lens is installed and displays an image in accordance with the image signal. The imaging apparatus generates a main image satisfying a main composition condition indicating a condition regarding a predetermined composition from a captured image obtained by the imaging element. The imaging apparatus further includes: a condition determining unit that determines whether the captured image satisfies a preliminary composition condition which is based on the main composition condition; a processing unit that executes a process of obtaining a preliminary image as an image satisfying the preliminary composition condition in accordance with the determination result of the condition determining unit; and an image processing unit that generates the main image by processing the preliminary image obtained through the process of the processing unit based on the main composition condition.

The present disclosure contains subject matter related to that disclosed in Japanese Priority Patent Application JP 2011-078928 filed in the Japan Patent Office on Mar. 31, 2011 and Japanese Priority Patent Application JP 2011-252502 filed in the Japan Patent Office on Nov. 18, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus which generates a main image as an image satisfying a main composition condition indicating a condition regarding a predetermined composition, comprising:
a condition determining unit that determines whether a captured image obtained through imaging of an imaging unit satisfies a preliminary composition condition which is based on the main composition condition;
a processing unit that executes a process of obtaining a preliminary image as an image satisfying the preliminary composition condition in accordance with the determination result of the condition determining unit;
an image processing unit that generates the main image by processing the preliminary image obtained through the process based on the main composition condition; and
wherein the image processing unit executes a trimming process on the preliminary image so that a position of a subject satisfies the main composition condition, when the position of the subject is set as the main composition condition.

2. The image processing apparatus according to claim 1, wherein the preliminary composition condition is simpler than the main composition condition.

3. The image processing apparatus according to claim 2, wherein the process is a process of storing the captured image as the preliminary image when the condition determining unit determines that the preliminary composition condition is satisfied.

4. The image processing apparatus according to claim 2, wherein a range of a parameter set as the preliminary composition condition is larger than a range of a parameter set as the main composition condition.

5. The image processing apparatus according to claim 2, wherein a number of conditions set as the main composition condition is greater than the number of conditions set as the preliminary composition condition.

6. The image processing apparatus according to claim 4, wherein the main composition condition is a condition in which a predetermined condition is added to the preliminary image condition.

7. The image processing apparatus according to claim 2, wherein the main composition condition includes inclusion of a subject in a first range as a condition and the preliminary composition condition includes inclusion of the subject in a second range larger than the first range as a condition.

8. The image processing apparatus according to claim 2, wherein the main composition condition includes inclusion of a background object in a third range as a condition and the preliminary composition condition includes inclusion of the background object in a fourth range larger than the third range as a condition.

9. The image processing apparatus according to claim 6, wherein the main composition condition is a condition to which a condition of including the background object in the main image is added.

10. The image processing apparatus according to claim 1, wherein the process is a process of notifying a user that the preliminary condition is satisfied, when the condition determining unit determines that the preliminary condition is satisfied.

11. An image processing method of generating a main image as an image satisfying a main composition condition indicating a regarding a predetermined composition, comprising:
determining whether a captured image obtained through imaging of an imaging unit satisfies a preliminary composition condition which is based on the main composition condition;
executing a process of obtaining a preliminary image as an image satisfying the preliminary composition condition in accordance with the determination result;
generating the main image by processing the preliminary image obtained through the process based on the main composition condition; and
executing, by an image processing unit, a trimming process on the preliminary image so that a position of a subject satisfies the main composition condition, when the position of the subject is set as the main composition condition.

12. A non-transitory computer readable medium storing an image processing program causing a computer to execute an image processing method of generating a main image as an image satisfying a main composition condition indicating a condition regarding a predetermined composition, the image processing method including
determining whether a captured image obtained through imaging of an imaging unit satisfies a preliminary composition condition which is based on the main composition condition,
executing a process of obtaining a preliminary image as an image satisfying the preliminary composition condition in accordance with the determination result,
generating the main image by processing the preliminary image obtained through the process based on the main composition condition; and
executing a trimming process on the preliminary image so that a position of a subject satisfies the main composition condition, when the position of the subject is set as the main composition condition.

13. An imaging apparatus comprising: a lens that is installed on one surface of a casing;
an imaging element that receives light via the lens and converts the light into an image signal; and a display unit that is installed on the other surface on the rear side of the one surface of the casing on which the lens is installed and displays an image in accordance with the image signal, wherein the imaging apparatus generates a main image satisfying a main composition condition indicating a condition regarding a predetermined composition from a captured image obtained by the imaging element, and wherein the imaging apparatus further comprises: a condition determining unit that determines whether the captured image satisfies a preliminary composition condition which is based on the main composition condition;

a processing unit that executes a process of obtaining a preliminary image as an image satisfying the preliminary composition condition in accordance with the determination result of the condition determining unit;

an image processing unit that generates the main image by processing the preliminary image obtained through the process of the processing unit based on the main composition condition; and wherein the image processing unit executes a trimming process on the preliminary image so that a position of a subject satisfies the main composition condition, when the position of the subject is set as the main composition condition.

* * * * *